US012722738B2

(12) United States Patent
Komada et al.

(10) Patent No.: US 12,722,738 B2
(45) Date of Patent: Sep. 1, 2026

(54) ROTATIONAL-POSITION SENSOR UNIT, HUMAN-POWERED VEHICLE CONTROLLER, AND HUMAN-POWERED VEHICLE SYSTEM

(71) Applicant: SHIMANO INC., Sakai City (JP)

(72) Inventors: Yasuyuki Komada, Sakai City (JP); Yusuke Oda, Sakai City (JP); Koichi Kajiki, Sakai City (JP); Kazuki Into, Sakai City (JP); Tomohiro Takahashi, Sakai City (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 19/048,999

(22) Filed: Feb. 10, 2025

(65) Prior Publication Data

US 2026/0233806 A1 Aug. 13, 2026

(51) Int. Cl.
*B62M 9/122* (2010.01)
*G01D 5/12* (2006.01)

(52) U.S. Cl.
CPC ............... *B62M 9/122* (2013.01); *G01D 5/12* (2013.01)

(58) Field of Classification Search
CPC ................................ B62M 9/122; G01D 5/12
See application file for complete search history.

(56) References Cited

U.S. PATENT DOCUMENTS 3,676,765 A * 7/1972 Westcott ............... G01P 3/4802 310/168
3,721,968 A * 3/1973 Gee ....................... G01P 3/4802 340/870.42
3,898,563 A * 8/1975 Erisman ................... B62J 50/22 324/174
4,541,500 A * 9/1985 Gelhard ................... B62M 6/50 180/205.2
4,630,712 A * 12/1986 Hoseley .................... F16N 7/38 184/15.3
5,027,303 A * 6/1991 Witte ..................... B62J 45/421 482/901
5,254,044 A * 10/1993 Anderson ............. B62M 25/08 474/70
5,571,056 A * 11/1996 Gilbert ................... B62M 9/128 280/238
6,012,538 A * 1/2000 Sonobe .................... B62M 6/45 180/65.6
6,158,322 A * 12/2000 Ornberg ............... A01G 23/091 83/72
6,162,140 A * 12/2000 Fukuda .................. B62M 25/08 474/81
6,676,549 B1 * 1/2004 Fukuda .................. B62J 45/412 474/82
6,851,497 B1 * 2/2005 Yoshiie .................... B62M 6/50 180/206.4

(Continued)

FOREIGN PATENT DOCUMENTS

| | | |
|---|---|---|
| DE | 102020131486 | 6/2022 |
| JP | 2000-177674 | 6/2000 |
| TW | M498720 U | 4/2015 |

*Primary Examiner* — Henry Y Liu

(74) *Attorney, Agent, or Firm* — MORI & WARD, LLP

(57) ABSTRACT

A rotational-position sensor unit comprises sensor circuitry configured to detect at least one of: at least one reference sprocket tooth of a sprocket of a human-powered vehicle; and a space provided between adjacent two teeth including the at least one reference sprocket tooth.

21 Claims, 60 Drawing Sheets

(56) References Cited

U.S. PATENT DOCUMENTS

| | | | | |
|---|---|---|---|---|
| 6,857,975 | B2 * | 2/2005 | Kitamura | B62M 25/08 474/70 |
| 7,722,490 | B2 * | 5/2010 | Tay | F16H 9/08 474/83 |
| 8,628,439 | B2 * | 1/2014 | Tay | F16H 9/00 474/83 |
| 8,998,756 | B2 * | 4/2015 | Ichida | B62K 23/06 474/81 |
| 9,272,751 | B2 * | 3/2016 | Searles | B62M 6/50 |
| 10,155,567 | B2 * | 12/2018 | Sato | B62M 25/08 |
| 10,654,542 | B2 * | 5/2020 | Takayama | B62M 25/08 |
| 11,505,264 | B2 * | 11/2022 | Ueno | B62D 55/12 |
| 2001/0011809 | A1 * | 8/2001 | Fukuda | B62M 9/122 280/11.36 |
| 2008/0058138 | A1 * | 3/2008 | Tay | F16H 9/00 474/83 |
| 2009/0319203 | A1 * | 12/2009 | Kalliomaki | A61B 5/221 73/862.391 |
| 2012/0109436 | A1 * | 5/2012 | Saida | B60L 15/2054 701/22 |
| 2013/0311020 | A1 * | 11/2013 | Searles | B62M 6/50 701/22 |
| 2016/0096589 | A1 * | 4/2016 | Sato | B62M 9/122 474/70 |
| 2022/0135154 | A1 * | 5/2022 | Ueno | B60Q 9/00 702/34 |
| 2025/0282447 | A1 * | 9/2025 | Caillaud | F16H 57/027 |
| 2025/0313303 | A1 * | 10/2025 | Van Druten | B62M 11/18 |

* cited by examiner

S11C
S11
S11C
S10B
S10B
S11B (S11D)
S11B (S11D)
S10B
S11C
S11B (S11D)
S10B
CH
S10
S11B (S11D)
S11C
52A
52
S10A
50
S10B
S10B
S11A
S11C
S11B (S11D)
S11B (S11D)
S10B
S11C
A1
S10B
S11C
S11B (S11D)
S10B
S11C
S11B (S11D)
S10B
S11C
S10B
S11B (S11D)
S11B (S11D)
S11C
S10B
S10B
S11B (S11R)
S11C

| SPROCKET | SHIFT | OPERATING TIME [sec] |
|---|---|---|
| S1 | UP | TU1 |
| | DOWN | - |
| S2 | UP | TU2 |
| | DOWN | TD2 |
| S3 | UP | TU3 |
| | DOWN | TD3 |
| S4 | UP | TU4 |
| | DOWN | TD4 |
| S5 | UP | TU5 |
| | DOWN | TD5 |
| S6 | UP | TU6 |
| | DOWN | TD6 |
| S7 | UP | TU7 |
| | DOWN | TD7 |
| S8 | UP | TU8 |
| | DOWN | TD8 |
| S9 | UP | TU9 |
| | DOWN | TD9 |
| S10 | UP | TU10 |
| | DOWN | TD10 |
| S11 | UP | - |
| | DOWN | TD11 |

*FIG. 22*

| SPROCKET | SHIFT | REFERENCE ROTATIONAL POSITION [degree] | | | |
|---|---|---|---|---|---|
| S1 | UP | PU11 | PU12 | PU13 | PU14 |
| | DOWN | - | - | - | - |
| S2 | UP | PU21 | PU22 | PU23 | PU24 |
| | DOWN | PD21 | PD22 | PD23 | PD24 |
| S3 | UP | PU31 | PU32 | PU33 | PU34 |
| | DOWN | PD31 | PD32 | PD33 | PD34 |
| S4 | UP | PU41 | PU42 | PU43 | PU44 |
| | DOWN | PD41 | PD42 | - | - |
| S5 | UP | PU51 | PU52 | PU53 | PU54 |
| | DOWN | PD51 | PD52 | - | - |
| S6 | UP | PU61 | PU62 | - | - |
| | DOWN | PD61 | PD62 | - | - |
| S7 | UP | PU71 | PU72 | - | - |
| | DOWN | PD71 | PD72 | - | - |
| S8 | UP | PU81 | - | - | - |
| | DOWN | PD81 | PD82 | - | - |
| S9 | UP | PU91 | - | - | - |
| | DOWN | PD91 | - | - | - |
| S10 | UP | PU101 | - | - | - |
| | DOWN | PD101 | - | - | - |
| S11 | UP | - | - | - | - |
| | DOWN | PD111 | - | - | - |

ROTATIONAL-POSITION SENSOR UNIT, HUMAN-POWERED VEHICLE CONTROLLER, AND HUMAN-POWERED VEHICLE SYSTEM

BACKGROUND

Technical Field

The present invention relates to a rotational-position sensor unit, a human-powered vehicle controller, and a human-powered vehicle system.

Background Information

A human-powered vehicle includes a sprocket assembly. The human-powered vehicle includes a human-powered vehicle component. The human-powered vehicle component can be configured to be controlled based on information relating to the rotation of the sprocket assembly. It is preferable to obtain the information relating to the rotation of the sprocket assembly with a comparatively simple structure. It is preferable to control the human-powered vehicle using an output of a sensor having a comparatively simple structure.

SUMMARY

In accordance with a first aspect of the present invention, a rotational-position sensor unit comprises sensor circuitry configured to detect at least one of: at least one reference sprocket tooth of a sprocket of a human-powered vehicle; and a space provided between adjacent two teeth including the at least one reference sprocket tooth.

With the rotational-position sensor unit according to the first aspect, the sensor circuitry enables information relating to the rotation of the sprocket to be obtained using the at least one reference sprocket tooth and/or the space. Thus, it is possible to obtain the information relating to the rotation of the sprocket with a comparatively simple structure.

In accordance with a second aspect of the present invention, the rotational-position sensor unit according to the first aspect is configured so that the at least one reference sprocket tooth includes at least two reference sprocket teeth of the sprocket. The sensor circuitry is configured to detect the at least two reference sprocket teeth.

With the rotational-position sensor unit according to the second aspect, the sensor circuitry enables information relating to the rotation of the sprocket to be obtained using the at least one two reference sprocket teeth. Thus, it is possible to reliably obtain the information relating to the rotation of the sprocket with a comparatively simple structure.

In accordance with a third aspect of the present invention, the rotational-position sensor unit according to the first or second aspect is configured so that the sensor circuitry has a detection area. The sensor circuitry is configured to detect whether at least one of the at least one reference sprocket tooth is in the detection area.

With the rotational-position sensor unit according to the third aspect, the sensor circuitry reliably enables the information relating to the rotation of the sprocket to be obtained using the at least one reference sprocket tooth and the detection area. Thus, it is possible to reliably obtain the information relating to the rotation of the sprocket based on the detection result of the sensor circuitry with a comparatively simple structure.

In accordance with a fourth aspect of the present invention, the rotational-position sensor unit according to the third aspect is configured so that the sensor circuitry is configured to output a detection result indicating that the at least one reference sprocket tooth is in the detection area.

With the rotational-position sensor unit according to the fourth aspect, it is possible to more reliably obtain the information relating to the rotation of the sprocket based on the detection result of the sensor circuitry with a comparatively simple structure.

In accordance with a fifth aspect of the present invention, the rotational-position sensor unit according to the third or fourth aspect is configured so that the sensor circuitry is configured to output a detection result indicating that none of the at least one reference sprocket tooth is in the detection area.

With the rotational-position sensor unit according to the fifth aspect, it is possible to more reliably obtain the information relating to the rotation of the sprocket based on the detection result of the sensor circuitry with a comparatively simple structure.

In accordance with a sixth aspect of the present invention, the rotational-position sensor unit according to any one of the third to fifth aspects is configured so that the sensor circuitry is configured to be disposed in a position in which the at least one reference sprocket tooth passes through the detection area.

With the rotational-position sensor unit according to the sixth aspect, it is possible to more reliably obtain the information relating to the rotation of the sprocket based on the detection result of the sensor circuitry with a comparatively simple structure.

In accordance with a seventh aspect of the present invention, the rotational-position sensor unit according to any one of the first to sixth aspects is configured so that the sensor circuitry includes a magnetic sensor configured to detect a change in a magnetic field caused by motion of the at least one reference sprocket tooth.

With the rotational-position sensor unit according to the seventh aspect, it is possible to reduce the influence of mud and/or dust adhered to the at least one reference sprocket tooth when the sensor circuitry detects the at least one reference sprocket tooth.

In accordance with an eighth aspect of the present invention, the rotational-position sensor unit according to any one of the first to seventh aspects is configured so that the sprocket includes a plurality of sprocket teeth including the at least one reference sprocket tooth and at least one sprocket tooth. The at least one reference sprocket tooth has a first character causing the sensor circuitry to output a first detection result. At least one of the at least one sprocket tooth has a second character which is different from the first character and which causes the sensor circuitry to output a second detection result different from the first detection result.

With the rotational-position sensor unit according to the eighth aspect, it is possible to more reliably obtain the information relating to the rotation of the sprocket based on the first character and the second character.

In accordance with a ninth aspect of the present invention, the rotational-position sensor unit according to the eighth aspect is configured so that the first character includes one of: an opening so that the first character is different from the second character of the at least one sprocket tooth; and an opening and a first member provided in the opening so that the first character is different from the second character of the at least one sprocket tooth.

With the rotational-position sensor unit according to the ninth aspect, it is possible to realize the first character using a comparatively simple structure such as the opening.

In accordance with a tenth aspect of the present invention, the rotational-position sensor unit according to the ninth aspect is configured so that the first member is made of a non-metallic material.

With the rotational-position sensor unit according to the tenth aspect, it is possible to realize the first character using a comparatively simple structure such as the first member.

In accordance with an eleventh aspect of the present invention, the rotational-position sensor unit according to any one of the first to tenth aspects further comprises amplifier circuitry configured to amplify an output of the sensor circuitry.

With the rotational-position sensor unit according to the eleventh aspect, it is possible to reliably utilize the output of the sensor circuitry.

In accordance with a twelfth aspect of the present invention, the rotational-position sensor unit according to any one of the first to eleventh aspects is configured so that the sensor circuitry is configured to be mounted to a vehicle body of the human-powered vehicle.

With the rotational-position sensor unit according to the twelfth aspect, it is possible to arrange the sensor circuitry near the sprocket.

In accordance with a thirteenth aspect of the present invention, a human-powered vehicle controller comprises electronic controller circuitry configured to control a human-powered vehicle based on a detection result of sensor circuitry of a rotational-position sensor unit configured to detect at least one of: at least one reference sprocket tooth of a sprocket of the human-powered vehicle; and a space provided between adjacent two teeth including the at least one reference sprocket tooth.

With the human-powered vehicle controller according to the thirteenth aspect, it is possible to control the human-powered vehicle using the detection result of the sensor circuitry having a comparatively simple structure.

In accordance with a fourteenth aspect of the present invention, the rotational-position sensor unit according to the thirteenth aspect is configured so that the electronic controller circuitry is configured to calculate a rotational position of the sprocket based on the detection result of the sensor circuitry.

With the human-powered vehicle controller according to the fourteenth aspect, it is possible to accurately control the human-powered vehicle using the rotational position of the sprocket.

In accordance with a fifteenth aspect of the present invention, the rotational-position sensor unit according to the thirteenth or fourteenth aspect is configured so that the electronic controller circuitry is configured to control a gear changer of the human-powered vehicle based on the detection result of the sensor circuitry.

With the human-powered vehicle controller according to the fifteenth aspect, it is possible to accurately control the gear changer using the rotational position of the sprocket.

In accordance with a sixteenth aspect of the present invention, the rotational-position sensor unit according to the fifteenth aspect is configured so that the electronic controller circuitry is configured to store an operating time for which the gear changer shifts a chain between a sprocket and a neighboring sprocket, the sprocket being adjacent to the neighboring sprocket without another sprocket between the sprocket and the neighboring sprocket. The electronic controller circuitry is configured to calculate a shift timing at which the gear changer starts to shift the chain based on: the operating time stored in the electronic controller circuitry; and the detection result obtained from the sensor circuitry when an operation signal is inputted to actuate the gear changer from an operating device to the electronic controller circuitry.

With the human-powered vehicle controller according to the sixteenth aspect, it is possible to adjust the timing of execution of gear shifting based on the shifting time calculated by the electronic controller circuitry.

In accordance with a seventeenth aspect of the present invention, the rotational-position sensor unit according to the sixteenth aspect is configured so that the electronic controller circuitry is configured to control the gear changer to start to shift the chain at the shift timing.

With the human-powered vehicle controller according to the seventeenth aspect, it is possible to accurately control the start timing of gear changing using the shift timing.

In accordance with an eighteenth aspect of the present invention, a human-powered vehicle system comprises a rotational-position sensor unit and the human-powered vehicle controller according to any one of the thirteenth to seventeenth aspects. The rotational-position sensor unit comprises sensor circuitry configured to detect at least one reference sprocket tooth of a sprocket of a human-powered vehicle.

With the human-powered vehicle system according to the eighteenth aspect, it is possible to control the human-powered vehicle using the detection result of the sensor circuitry having a comparatively simple structure.

In accordance with a nineteenth aspect of the present invention, a human-powered vehicle system comprises the rotational-position sensor unit according to any one of the first to twelfth aspects and electronic controller circuitry. The electronic controller circuitry is configured to control the human-powered vehicle based on a detection result of the rotational-position sensor unit.

With human-powered vehicle system according to the nineteenth aspect, control the human-powered vehicle using the detection result of the sensor circuitry having a comparatively simple structure.

In accordance with a twentieth aspect of the present invention, a rotational-position sensor unit comprises sensor circuitry configured to detect a reference shape of a reference portion of at least one of a sprocket and a lock member. The reference shape of the reference portion is different from a shape of another portion of the at least one of the sprocket and the lock member.

With the rotational-position sensor unit according to the twentieth aspect, it is possible to obtain information relating to the rotation of the sprocket based on the detection result of the sensor circuitry with a comparatively simple structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 22 shows an example of a list of operating times for the sprocket assembly illustrated in FIG. 9.

FIG. 23 shows an example of a list of reference rotational positions for the sprocket assembly illustrated in FIG. 9.

DESCRIPTION OF THE EMBODIMENTS

Figure 1:
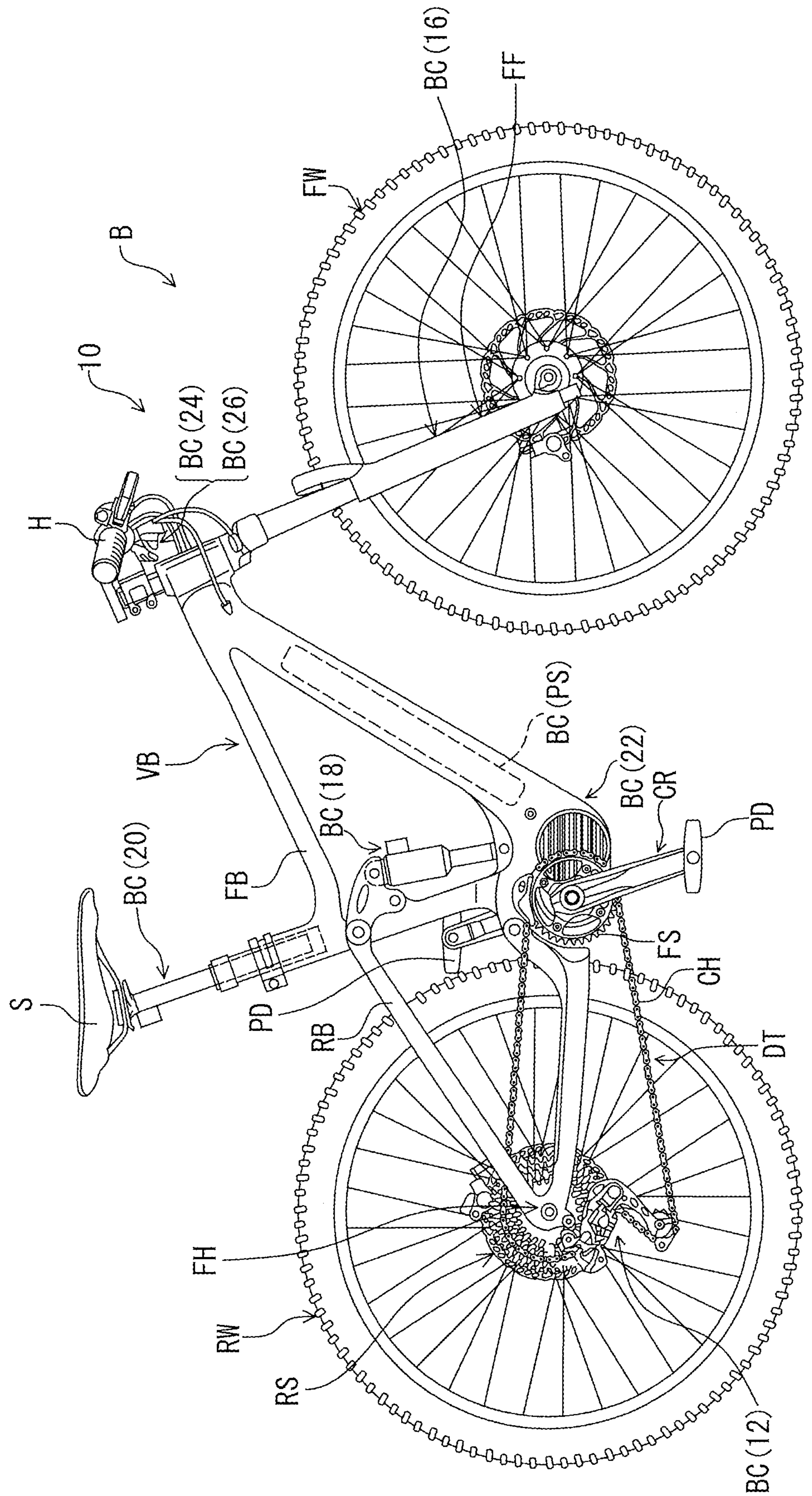
FIG. 1 is a side elevational view of a human-powered vehicle including a human-powered vehicle system in accordance with one of embodiments.

The embodiments will now be described with reference to the accompanying drawings, wherein like reference numerals designate corresponding or identical elements throughout the various drawings.

Referring initially to FIG. 1, a human-powered vehicle B includes a human-powered vehicle system 10 in accordance with one of embodiments. The human-powered vehicle system 10 includes at least one human-powered vehicle component BC. In the present embodiment, the human-powered vehicle B is illustrated as an e-bike that uses a driving force of an electric motor in addition to a human driving force for propulsion. However, the human-powered vehicle system 10 can be applied to any other type of human-powered vehicles such as, for example, a mountain bike, a cyclocross bicycle, a gravel bike, a city bike, a cargo bike, and a recumbent bike.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

As seen in FIG. 1, the human-powered vehicle B includes a vehicle body VB, a wheel FW, and a wheel RW. The wheel FW is rotatably coupled to the vehicle body VB. The wheel RW is rotatably coupled to the vehicle body VB. The vehicle body VB is supported by the wheels FW and RW. The wheel FW can also be referred to as a front wheel FW. The wheel RW can also be referred to as a rear wheel RW.

The vehicle body VB includes a front frame body FB, a rear frame body RB, a handlebar H, and a front fork FF. The rear frame body RB includes a swing arm. The rear frame body RB is movably coupled to the front frame body FB. The rear frame body RB is pivotally coupled to the front frame body FB. The front fork FF is pivotally coupled to the front frame body FB. The handlebar H is coupled to the front fork FF to be pivotable relative to the front frame body FB along with the front fork FF.

The human-powered vehicle B further includes a drivetrain DT. Here, for example, the drivetrain DT is a chain-drive type and includes a crank CR, at least one front sprocket FS, sprocket assembly RS, a chain CH, and pedals PD. The crank CR is rotatably coupled to the vehicle body VB. The at least one front sprocket FS is coupled to the crank CR to rotate relative to the vehicle body VB along with the crank CR. The sprocket assembly RS are provided on a hub assembly FH of the wheel RW. The chain CH is configured to be engaged with one of the at least one front sprocket FS and one of the sprocket assembly RS. The pedals PD are coupled to the crank CR. A human driving force is applied to the pedals PD by a rider such that the driving force is transmitted to the wheel RW via the at least one front sprocket FS, the chain CH, and the sprocket assembly RS. While the drivetrain DT is illustrated as a chain-drive type of drivetrain, the drivetrain DT can be selected from any type of drivetrain and can be a belt-drive type or a shaft-drive type.

In the present application, the following directional terms "front," "rear," "forward," "rearward," "left," "right," "transverse," "upward" and "downward" as well as any other similar directional terms refer to those directions which are determined based on the user who is in the user's standard position in the human-powered vehicle B while the user faces toward a handlebar or steering. Examples of the user's standard position include a saddle and a seat. Accordingly, these terms, as utilized to describe the human-powered vehicle system 10, the human-powered vehicle component BC, or other components, should be interpreted relative to the human-powered vehicle B equipped with the human-powered vehicle system 10, the human-powered vehicle component BC, or other components as used in an upright riding position on a horizontal surface.

As seen in FIG. 1, the at least one human-powered vehicle component BC includes a gear changer 12, a suspension 16, a suspension 18, an adjustable seatpost 20, and an assist drive unit 22. Namely, the human-powered vehicle system 10 includes the gear changer 12, the suspension 16, the suspension 18, the adjustable seatpost 20, and an assist drive unit 22. The gear changer 12 is configured to be mounted to the vehicle body VB. The suspension 16 is configured to be mounted to the vehicle body VB. The suspension 18 is configured to be mounted to the vehicle body VB. The adjustable seatpost 20 is configured to be mounted to the vehicle body VB. The assist drive unit 22 is configured to be mounted to the vehicle body VB.

As seen in FIG. 1, the gear changer 12 is configured to change a gear ratio of the human-powered vehicle B. The gear ratio is a ratio of a rotational speed of the sprocket assembly RS to a rotational speed of the at least one front sprocket FS. The gear changer 12 has at least two gear stages having at least two gear ratios, respectively. The gear changer 12 is configured to change the current gear ratio among the at least two gear ratios. The gear changer 12 is configured to change a current gear stage among the at least two gear stages. For example, the gear changer 12 is configured to shift the chain CH relative to the sprocket assembly RS. In the present embodiment, the gear changer 12 includes a derailleur. However, the gear changer 12 can include another type of gear changer if needed or desired. Examples of the gear changer 12 include a rear derailleur, a front derailleur, and an internal-gear hub.

Figure 2:
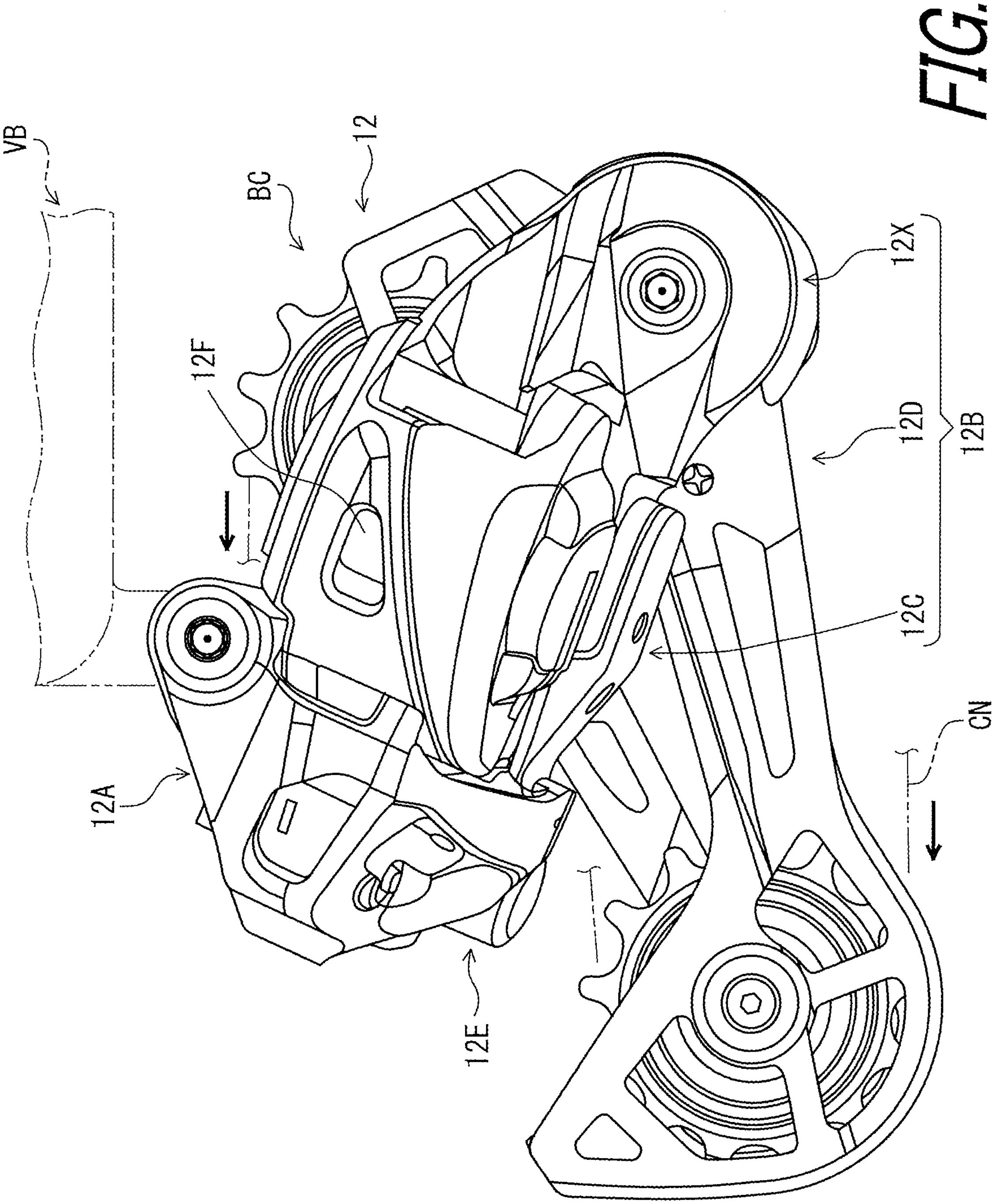
FIG. 2 is a side elevational view of one of at least two human-powered vehicle components illustrated in FIG. 1.

As seen in FIG. 2, the gear changer 12 further comprises a base member 12A and a movable structure 12B. The base member 12A is mountable to the vehicle body VB. The movable structure 12B is movable relative to the base member 12A. For example, the movable structure 12B includes a linkage 12C, a chain guide 12D, and a movable member 12X. The chain guide 12D is contactable with the chain CH. The linkage 12C movably couples the base member 12A and the movable member 12X. The chain guide 12D is pivotally coupled to the movable member 12X.

The gear changer 12 comprises an electric actuator 12E. The electric actuator 12E is configured to generate an actuation force. The electric actuator 12E is coupled to at least one of the base member 12A and the movable structure 12B to move the movable structure 12B relative to the base member 12A. For example, the electric actuator 12E includes an electric motor and an actuator driver. The actuator driver is electrically connected to the electric motor to control the electric motor. The electric actuator 12E is at least partially provided to at least one of the base member 12A, the movable structure 12B, the linkage 12C, the chain guide 12D, and the movable member 12X. The electric actuator 12E can be configured to be controlled based on a control signal transmitted from another device or to be automatically controlled based on information relating to the human-powered vehicle B.

As seen in FIG. 1, the suspension 16 is configured to absorb or damp shocks or vibrations generated by riding on rough terrain. The suspension 16 is installed in the front fork FF. The suspension 16 and the front fork FF constitute a suspension fork. The suspension 16 is configured to absorb or damp shocks or vibrations transmitted from at least one of the wheels FW and RW.

Figure 3:
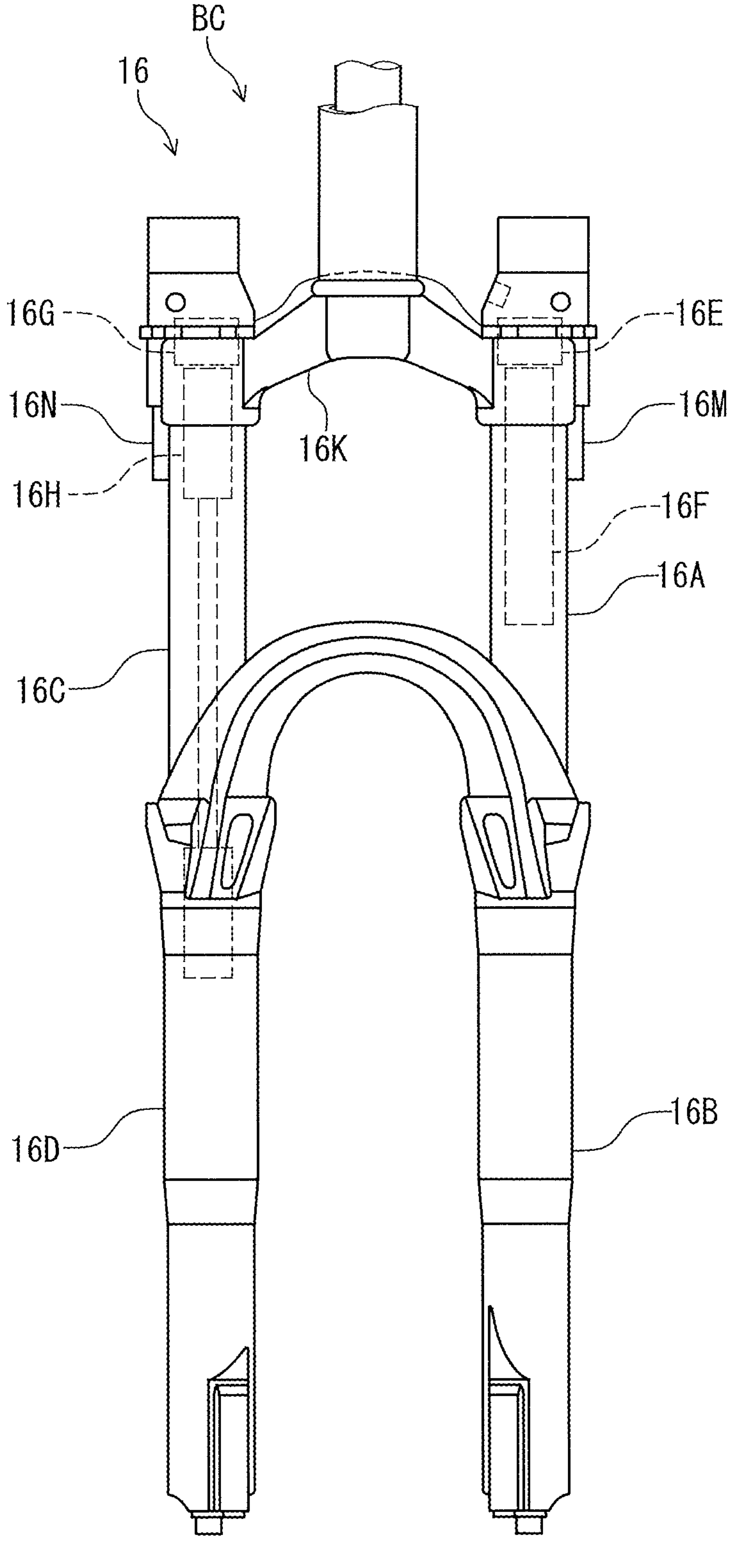
FIG. 3 is a side elevational view of another of the at least two human-powered vehicle components illustrated in FIG. 1.

As seen in FIG. 3, the suspension 16 includes a first longitudinal member 16A and a second longitudinal member 16B. The first longitudinal member 16A and the second longitudinal member 16B are relatively movable. The suspension 16 includes a crown 16K. The first longitudinal member 16A is coupled to the crown 16K. The wheel FW is rotatably coupled to the second longitudinal member 16B. For example, the first longitudinal member 16A and the second longitudinal member 16B define a fluid chamber filled with a fluid such as oil.

The suspension 16 includes a third longitudinal member 16C and a fourth longitudinal member 16D. The third longitudinal member 16C and the fourth longitudinal member 16D are relatively movable. The third longitudinal member 16C is coupled to the crown 16K. The wheel FW is rotatably coupled to the fourth longitudinal member 16D. For example, the third longitudinal member 16C and the fourth longitudinal member 16D define an air chamber filled with air.

The suspension 16 comprises an electric actuator 16E. The electric actuator 16E is configured to generate an actuation force. For example, the electric actuator 16E includes an electric motor and an actuator driver. The actuator driver is electrically connected to the electric motor to control the electric motor.

The suspension 16 includes a state changing structure 16F configured to change the state of the suspension 16 between a first state and a second state. The electric actuator 16E is configured to actuate the state changing structure 16F to change the state of the suspension 16 between the first state and the second state. For example, the state changing structure 16F includes a valve unit. The electric actuator 16E is coupled to the state changing structure 16F. The electric actuator 16E is configured to actuate the state changing structure 16F to change the state of the suspension 16 between the first state and the second state.

For example, the state changing structure 16F is configured to allow the first longitudinal member 16A and the second longitudinal member 16B to relatively move under a first damping property in the first state. The state changing structure 16F is configured to allow the first longitudinal member 16A and the second longitudinal member 16B to relatively move under a second damping property in the second state. The second damping property is different from the first damping property.

The suspension 16 comprises an electric actuator 16G. The electric actuator 16G is configured to generate an actuation force. For example, the electric actuator 16G includes an electric motor and an actuator driver. The actuator driver is electrically connected to the electric motor to control the electric motor.

The suspension 16 includes a state changing structure 16H configured to change the state of the suspension 16 between a third state and a fourth state. The electric actuator 16E is configured to actuate the state changing structure 16H to change the state of the suspension 16 between the third state and the fourth state. For example, the state changing structure 16H includes a valve unit. The electric actuator 16G is coupled to the state changing structure 16H. The electric actuator 16G is configured to actuate the state changing structure 16H to change the state of the suspension 16 between the first state and the second state.

For example, the state changing structure 16H is configured to allow the third longitudinal member 16C and the fourth longitudinal member 16D to relatively move within a first stroke in the third state. The state changing structure 16H is configured to allow the third longitudinal member 16C and the fourth longitudinal member 16D to relatively move within a second stroke in the fourth state. The second stroke is different from the first stroke. One of the first stroke and the second stroke can be zero.

In the present embodiment, the suspension 16 includes the electric actuator 16E, the state changing structure 16F, the electric actuator 16G, and the state changing structure 16H. However, the electric actuator 16E and the state changing structure 16F can be omitted from the suspension 16 if needed or desired. The electric actuator 16G and the state changing structure 16H can be omitted from the suspension 16 if needed or desired. Furthermore, the suspension 16 can include another type of a state changing structure other than the state changing structures 16F and 16H if needed or desired.

As seen in FIG. 1, the suspension 18 is configured to absorb or damp shocks or vibrations generated by riding on rough terrain. The suspension 18 is coupled to the front frame body FB and the rear frame body RB. The suspension 18 is configured to absorb or damp shocks or vibrations transmitted from at least one of the wheels FW and RW.

Figure 4:
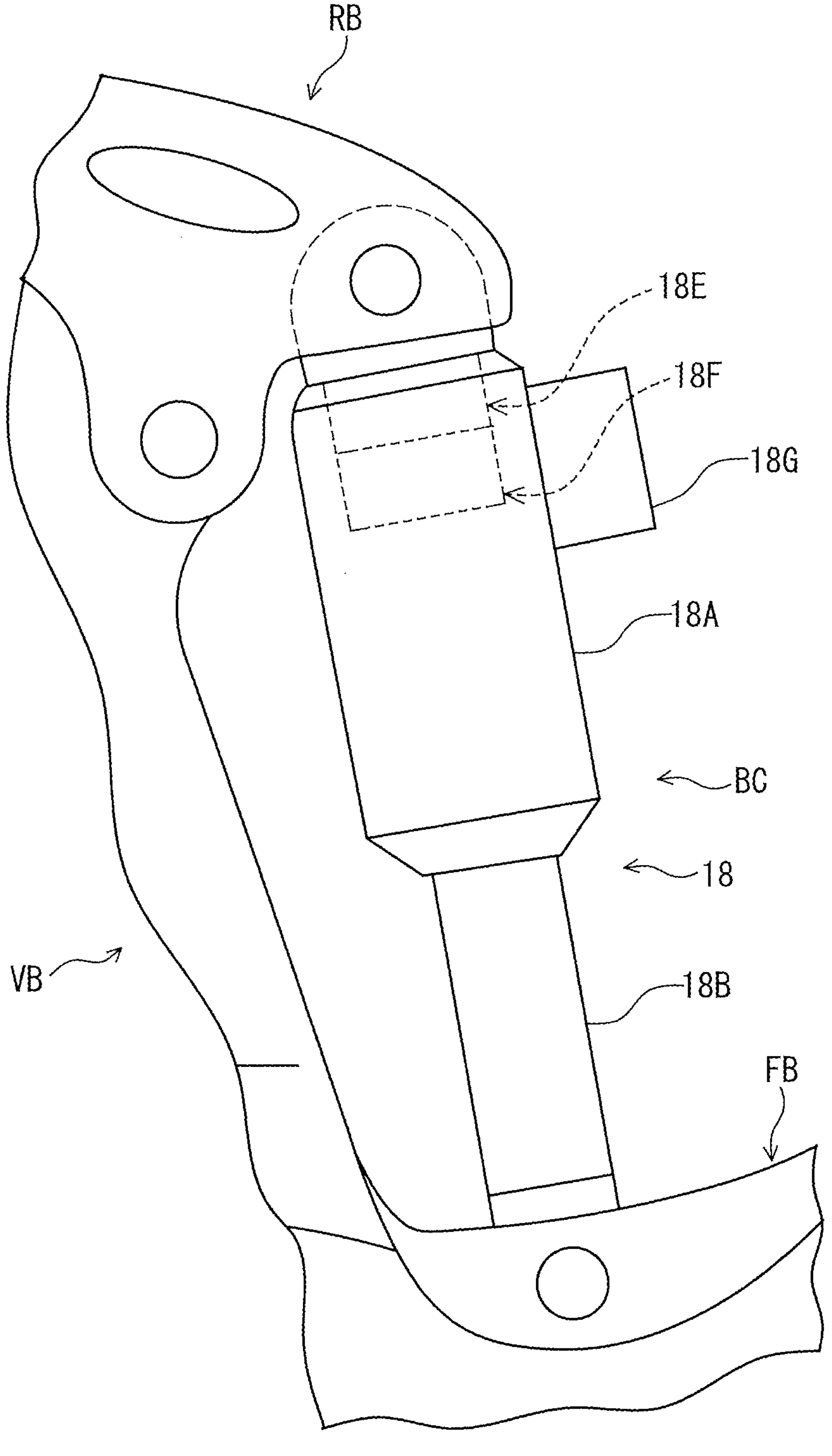
FIG. 4 is a side elevational view of another of the at least two human-powered vehicle components illustrated in FIG. 1.

As seen in FIG. 4, the suspension 18 includes a first longitudinal member 18A and a second longitudinal member 18B. The first longitudinal member 18A and the second longitudinal member 18B are relatively movable. The first longitudinal member 18A and the second longitudinal member 18B define an air chamber or a fluid chamber. The first longitudinal member 18A is pivotally coupled to the rear frame body RB. The second longitudinal member 18B is pivotally coupled to the front frame body FB.

The suspension 18 comprises an electric actuator 18E. The electric actuator 18E is configured to generate an actuation force. For example, the electric actuator 18E includes an electric motor and an actuator driver. The actuator driver is electrically connected to the electric motor to control the electric motor.

The suspension 18 includes a state changing structure 18F configured to change the state of the suspension 18 between a first state and a second state. The electric actuator 18E is configured to actuate the state changing structure 18F to change the state of the suspension 18 between the first state and the second state. For example, the state changing structure 18F includes a valve unit. The electric actuator 18E is coupled to the state changing structure 18F. The electric actuator 18E is configured to actuate the state changing structure 18F to change the state of the suspension 18 between the first state and the second state.

The state changing structure 18F is configured to allow the first longitudinal member 18A and the second longitudinal member 18B to relatively move within a first stroke or under a first damping property in the first state. The state changing structure 18F is configured to allow the first longitudinal member 18A and the second longitudinal member 18B to relatively move within a second stroke or under a second damping property in the second state.

As seen in FIG. 1, the adjustable seatpost 20 is configured to change a height of the saddle S relative to the vehicle body VB. The adjustable seatpost 20 has an adjustable state and a locked state. The adjustable seatpost 20 allows the user to change the height of the saddle S in the adjustable state. The adjustable seatpost 20 is locked to maintain the height of the saddle S in the locked state. The adjustable seatpost 20 is configured to change the state of the adjustable seatpost 20 between the adjustable state and the locked state.

Figure 5:
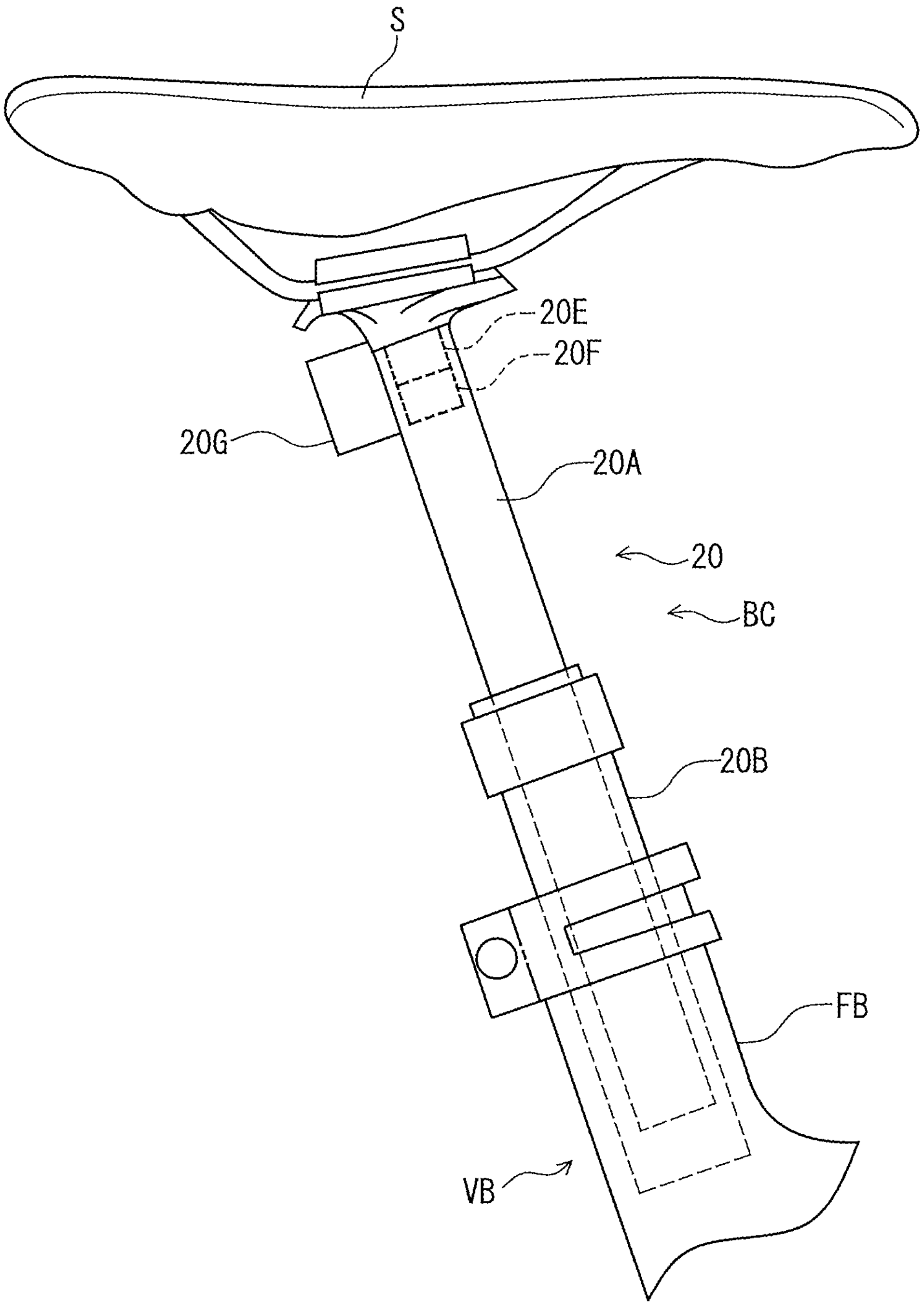
FIG. 5 is a side elevational view of another of the at least two human-powered vehicle components illustrated in FIG. 1.

As seen in FIG. 5, the adjustable seatpost 20 includes a first longitudinal member 20A and a second longitudinal member 20B. The first longitudinal member 20A and the second longitudinal member 20B are relatively movable. The saddle S is coupled to the first longitudinal member 20A. The second longitudinal member 20B is coupled to the vehicle body VB.

The adjustable seatpost 20 comprises an electric actuator 20E. The electric actuator 20E is configured to generate an actuation force. For example, the electric actuator 20E includes an electric motor and an actuator driver. The actuator driver is electrically connected to the electric motor to control the electric motor.

The adjustable seatpost 20 includes a state changing structure 20F configured to change the state of the adjustable seatpost 20 between the adjustable state and the locked state. The electric actuator 20E is configured to actuate the state changing structure 20F to change the state of the adjustable seatpost 20 between the adjustable state and the locked state. For example, the state changing structure 20F includes a valve unit. The electric actuator 20E is coupled to the state changing structure 20F. The electric actuator 20E is configured to actuate the state changing structure 20F to change the state of the adjustable seatpost 20 between the adjustable state and the locked state.

The state changing structure 20F is configured to allow the first longitudinal member 20A and the second longitudinal member 20B to relatively move in the adjustable state. The state changing structure 20F is configured to restrict the first longitudinal member 20A and the second longitudinal member 20B from moving relatively in the locked state.

As seen in FIG. 1, the assist drive unit 22 is configured to assist propulsion of the human-powered vehicle B. The assist drive unit 22 is configured to change an assist ratio depending on a human power applied to the human-powered vehicle B. For example, the assist drive unit 22 is configured to change the assist ratio depending on pedaling torque applied to the crank CR.

Figure 6:
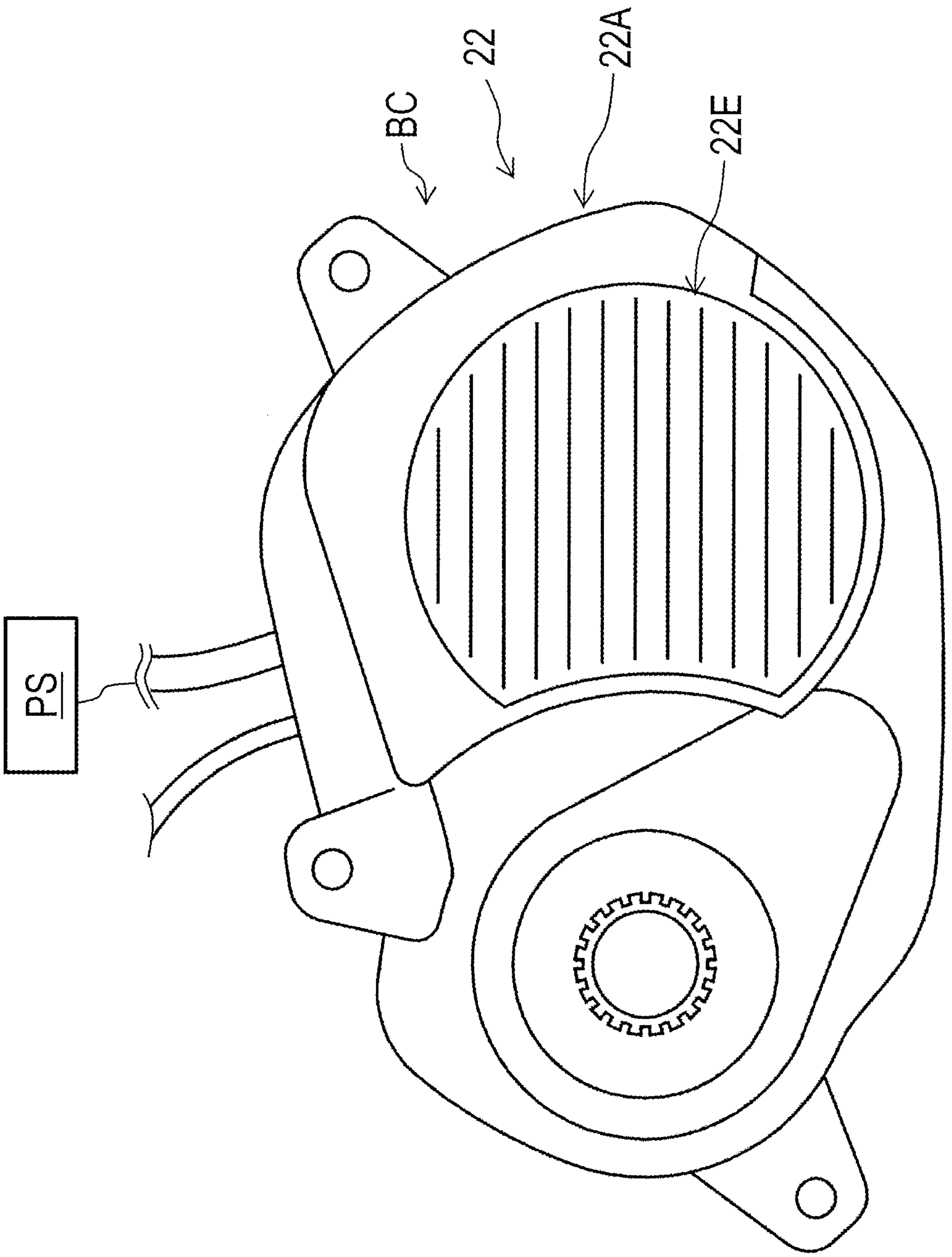
FIG. 6 is a side elevational view of another of the at least two human-powered vehicle components illustrated in FIG. 1.

As seen in FIG. 6, the assist drive unit 22 comprises a housing 22A and an electric actuator 22E. The electric actuator 22E is at least partially provided in the housing 22A. The electric actuator 22E is configured to generate an actuation force. For example, the electric actuator 22E includes an electric motor and an actuator driver. The actuator driver is electrically connected to the electric motor to control the electric motor. The electric actuator 22E is configured to apply the actuation force to the human-powered vehicle B to assist propulsion of the human-powered vehicle B.

Figure 7:
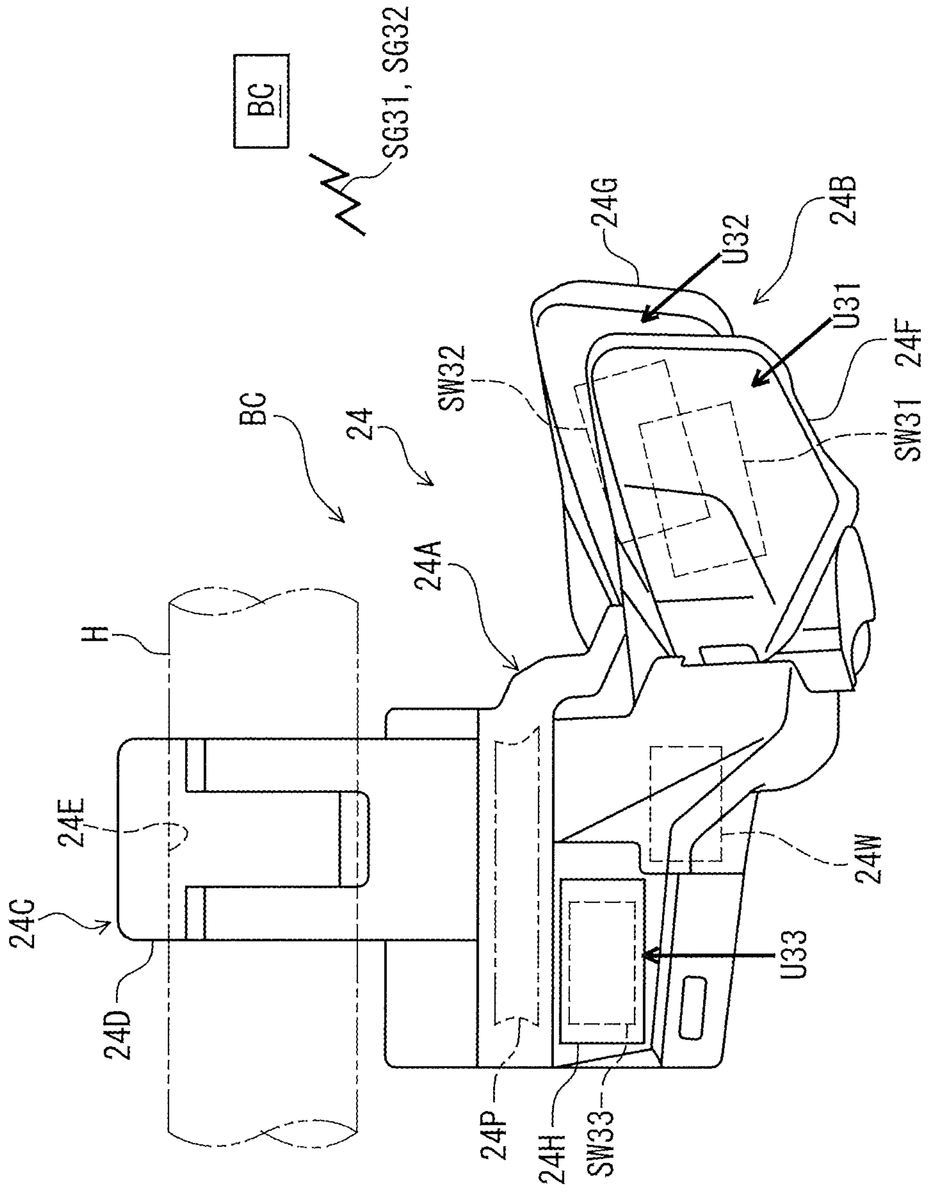
FIG. 7 is a side elevational view of another of the at least two human-powered vehicle components illustrated in FIG. 1.

As seen in FIG. 7, the at least one human-powered vehicle component BC includes an operating device 24. The operating device 24 is configured to be mounted to the handlebar H. The operating device 24 is configured to receive at least one user input U31, U32, and/or U33. The operating device 24 is configured to operate another of the at least one human-powered vehicle component BC in response to the at least one user input U31, U32, and/or U33. For example, the operating device 24 is configured to operate at least one of the gear changer 12, the suspension 16, the suspension 18, the adjustable seatpost 20, and the assist drive unit 22 (see e.g., FIG. 1) in response to the at least one user input U31, U32, and/or U33.

The operating device 24 includes a housing 24A, a user interface 24B, and a mounting portion 24C. The housing 24A is configured to be mounted to the vehicle body VB of the human-powered vehicle B. The user interface 24B is configured to be operated by the user to control at least one of the at least one human-powered vehicle component BC while the human-powered vehicle B is running. The mounting portion 24C is configured to couple the housing 24A and the vehicle body VB. The mounting portion 24C is configured to couple the housing 24A and the handlebar H of the vehicle body VB. For example, the mounting portion 24C includes a clamp 24D and a clamp fastener. The clamp 24D includes a clamp opening 24E through which the handlebar H is to extend. The clamp fastener is configured to fasten the clamp 24D to the handlebar H.

The user interface 24B includes a switch SW31 configured to be activated in response to the user input U31. The user interface 24B includes a user operating member 24F. The user operating member 24F is movably coupled to the housing 24A. The user operating member 24F is movable relative to the housing 24A in response to the user input U31. The user operating member 24F is configured to transmit the motion of the user operating member 24F to the switch SW31.

The user interface 24B includes a switch SW32 configured to be activated in response to the user input U32. The user interface 24B includes a user operating member 24G. The user operating member 24G is movably coupled to the housing 24A. The user operating member 24G is movable relative to the housing 24A in response to the user input U32. The user operating member 24G is configured to transmit the motion of the user operating member 24G to the switch SW32.

The user interface 24B includes a switch SW33 configured to be activated in response to the user input U33. The user interface 24B includes a user operating member 24H. The user operating member 24H is movably coupled to the housing 24A. The user operating member 24H is movable relative to the housing 24A in response to the user input U33. The user operating member 24H is configured to transmit the motion of the user operating member 24H to the switch SW33.

The operating device 24 includes communicator circuitry 24W. For example, the communicator circuitry 24W is configured to transmit an operation signal SG31 in response to the user input U31. The communicator circuitry 24W is configured to transmit an operation signal SG32 in response to the user input U32. The communicator circuitry 24W can include at least one of wireless communicator circuitry and weird communicator circuitry. The communicator circuitry 24W can be configured to wirelessly transmit the operation signal SG31 or SG32 in response to the user inputs U31 or U32. The communicator circuitry 24W can be configured to transmit the operation signal SG31 or SG32 via an electric cable in response to the user inputs U31 or U32. The operating device 24 can include an electric power source 24P configured to supply electricity to the communicator circuitry 24W. The operating device 24 can be configured to be powered by another electric power source.

Figure 8:
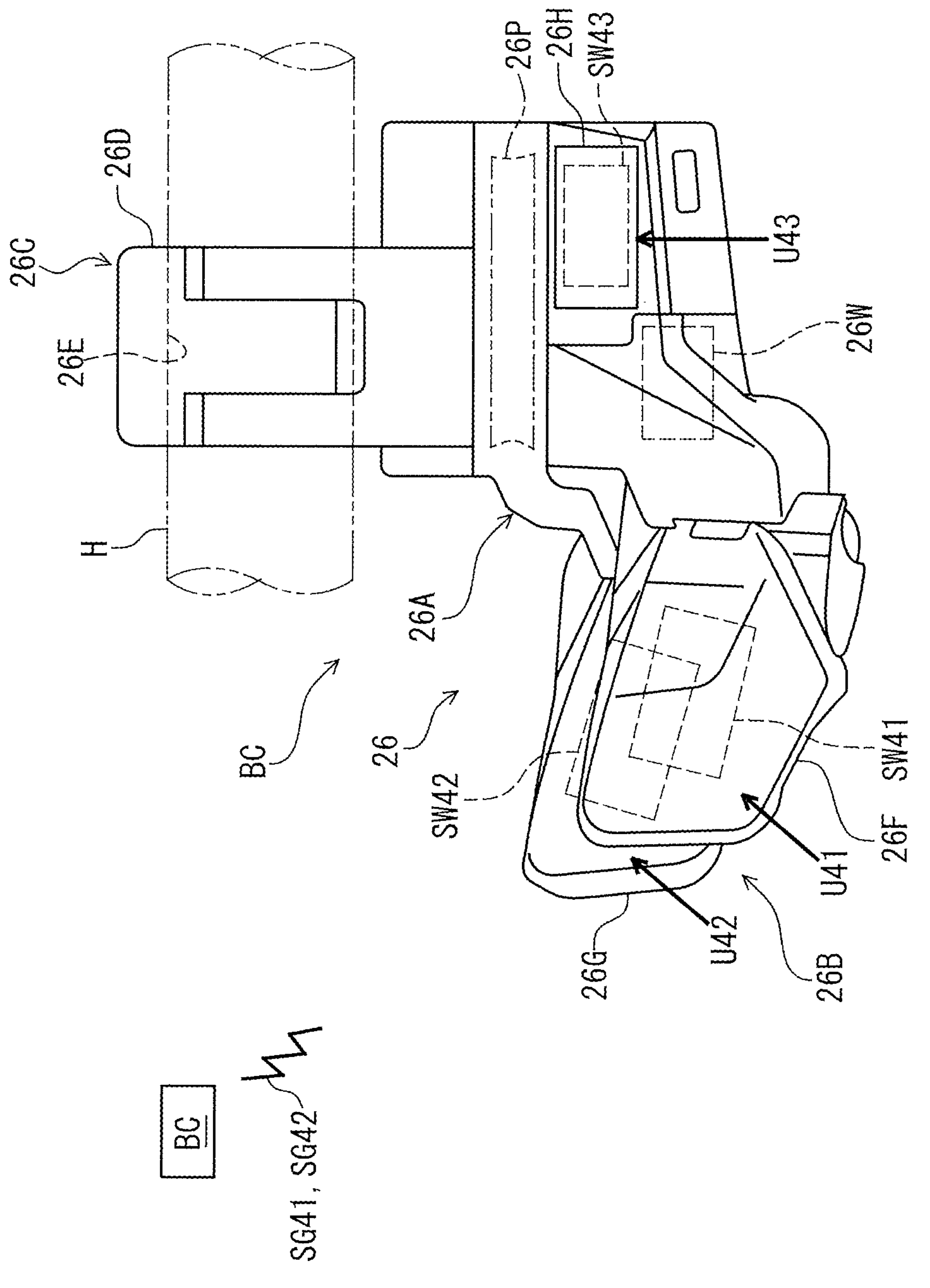
FIG. 8 is a side elevational view of another of the at least two human-powered vehicle components illustrated in FIG. 1.

As seen in FIG. 8, the at least one human-powered vehicle component BC includes an operating device 26. The operating device 26 is configured to be mounted to the handlebar H. The operating device 26 is configured to receive at least one user input U41, U42, and/or U43. The operating device 26 is configured to operate another of the at least one human-powered vehicle component BC in response to the at least one user input U41, U42, and/or U43. For example, the operating device 26 is configured to operate at least one of the gear changer 12, the suspension 16, the suspension 18, the adjustable seatpost 20, and the assist drive unit 22 (see e.g., FIG. 1) in response to the at least one user input U41, U42, and/or U43.

The operating device 26 includes a housing 26A, a user interface 26B, and a mounting portion 26C. The housing 26A is configured to be mounted to the vehicle body VB of the human-powered vehicle B. The user interface 26B is configured to be operated by the user to control at least one of the at least one human-powered vehicle component BC while the human-powered vehicle B is running. The mounting portion 26C is configured to couple the housing 26A and the vehicle body VB. The mounting portion 26C is configured to couple the housing 26A and the handlebar H of the vehicle body VB. For example, the mounting portion 26C includes a clamp 26D and a clamp fastener. The clamp 26D includes a clamp opening 26E through which the handlebar H is to extend. The clamp fastener is configured to fasten the clamp 26D to the handlebar H.

The user interface 26B includes a switch SW41 configured to be activated in response to the user input U41. The user interface 26B includes a user operating member 26F. The user operating member 26F is movably coupled to the housing 26A. The user operating member 26F is movable relative to the housing 26A in response to the user input U41. The user operating member 26F is configured to transmit the motion of the user operating member 26F to the switch SW41.

The user interface 26B includes a switch SW42 configured to be activated in response to the user input U42. The user interface 26B includes a user operating member 26G. The user operating member 26G is movably coupled to the housing 26A. The user operating member 26G is movable relative to the housing 26A in response to the user input U42. The user operating member 26G is configured to transmit the motion of the user operating member 26G to the switch SW42.

The user interface 26B includes a switch SW43 configured to be activated in response to the user input U43. The user interface 26B includes a user operating member 26H. The user operating member 26H is movably coupled to the housing 26A. The user operating member 26H is movable relative to the housing 26A in response to the user input U43. The user operating member 26H is configured to transmit the motion of the user operating member 26H to the switch SW43.

The operating device 26 includes communicator circuitry 26W. For example, the communicator circuitry 26W is configured to transmit an operation signal SG41 in response to the user input U41. The communicator circuitry 26W is configured to transmit an operation signal SG42 in response to the user input U42. The communicator circuitry 26W can include at least one of wireless communicator circuitry and weird communicator circuitry. The communicator circuitry 26W can be configured to wirelessly transmit the operation signal SG41 or SG42 in response to the user inputs U41 or U42. The communicator circuitry 26W can be configured to transmit the operation signal SG41 or SG42 via an electric cable in response to the user inputs U41 or U42. The operating device 26 can include an electric power source 26P configured to supply electricity to the communicator circuitry 26W. The operating device 26 can be configured to be powered by another electric power source.

The at least one human-powered vehicle component BC includes an electric power source PS. The electric power source PS is configured to supply electricity to at least one of the at least one human-powered vehicle component BC. In the present embodiment, the electric power source PS is configured to be mounted to the vehicle body VB. The electric power source PS includes a battery such as a primary battery or a secondary battery. At least one of the at least one human-powered vehicle component BC can include its own electric power source. The electric power source PS can include electronic controller circuitry configured to control another human-powered vehicle component of the human-powered vehicle B.

As seen in FIG. 2, for example, the gear changer 12 can include an electric power source 12F configured to supply electricity to the electric actuator 12E. As seen in FIG. 3, the suspension 16 can include electric power source 16M configured to supply electricity to the electric actuator 16E. The suspension 16 can include electric power source 16N configured to supply electricity to the electric actuator 16G. As seen in FIG. 4, the suspension 18 can include electric power source 18G configured to supply electricity to the electric actuator 18E. As seen in FIG. 5, the adjustable seatpost 20 can include electric power source 20G configured to supply electricity to the electric actuator 20E.

Figure 9:
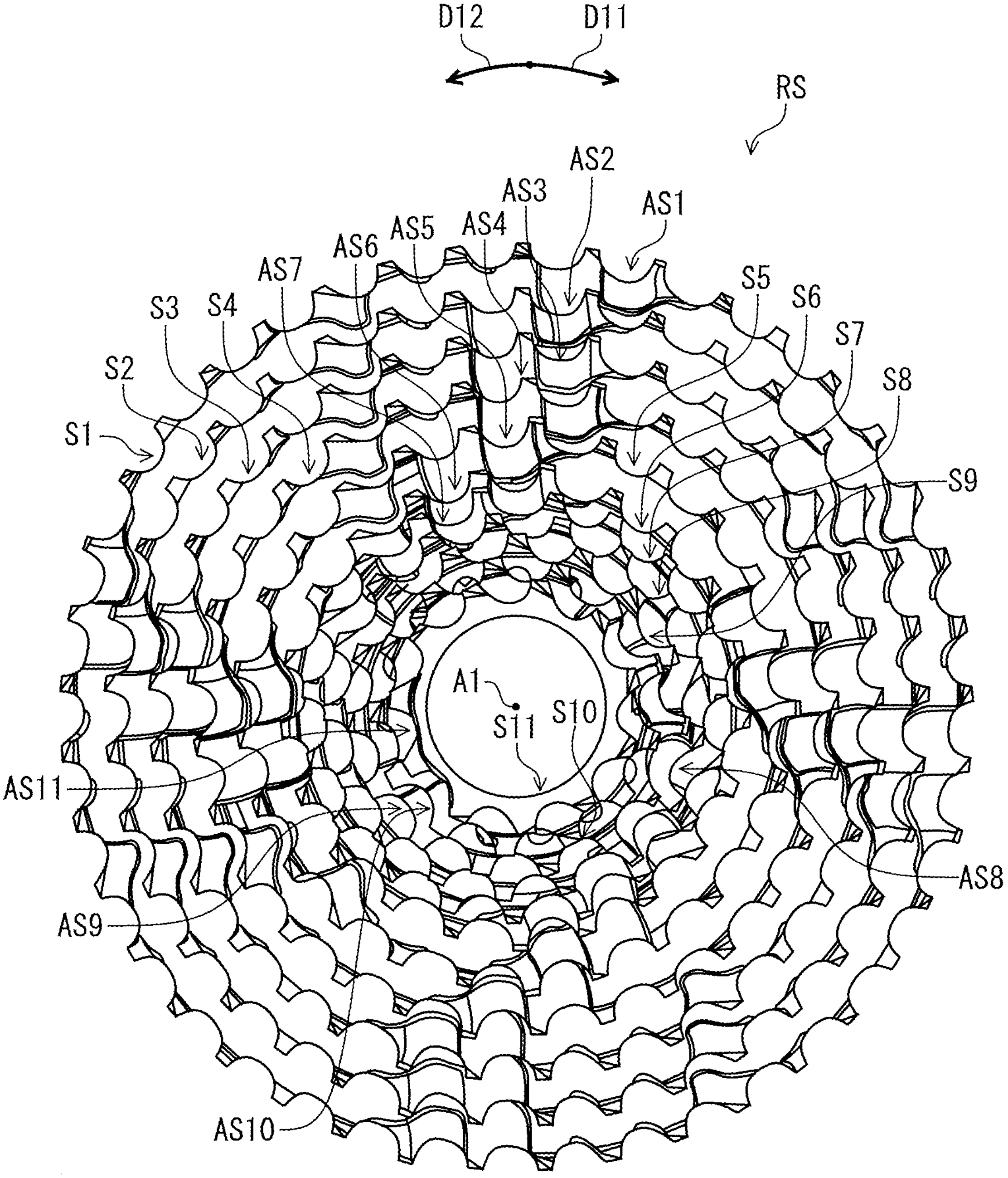
FIG. 9 is a side elevational view of a sprocket assembly of the human-powered vehicle illustrated in FIG. 1.

As seen in FIG. 9, the sprocket assembly RS has a rotational axis A1 and is rotatable about the rotational axis A1 in a rotational driving direction D11 (see e.g., FIG. 9) during pedaling. The sprocket assembly RS includes sprockets S1 to S11. The sprocket S1 has the largest outer diameter in the sprocket assembly RS. The sprocket S11 has the smallest outer diameter in the sprocket assembly RS.

Figure 10:
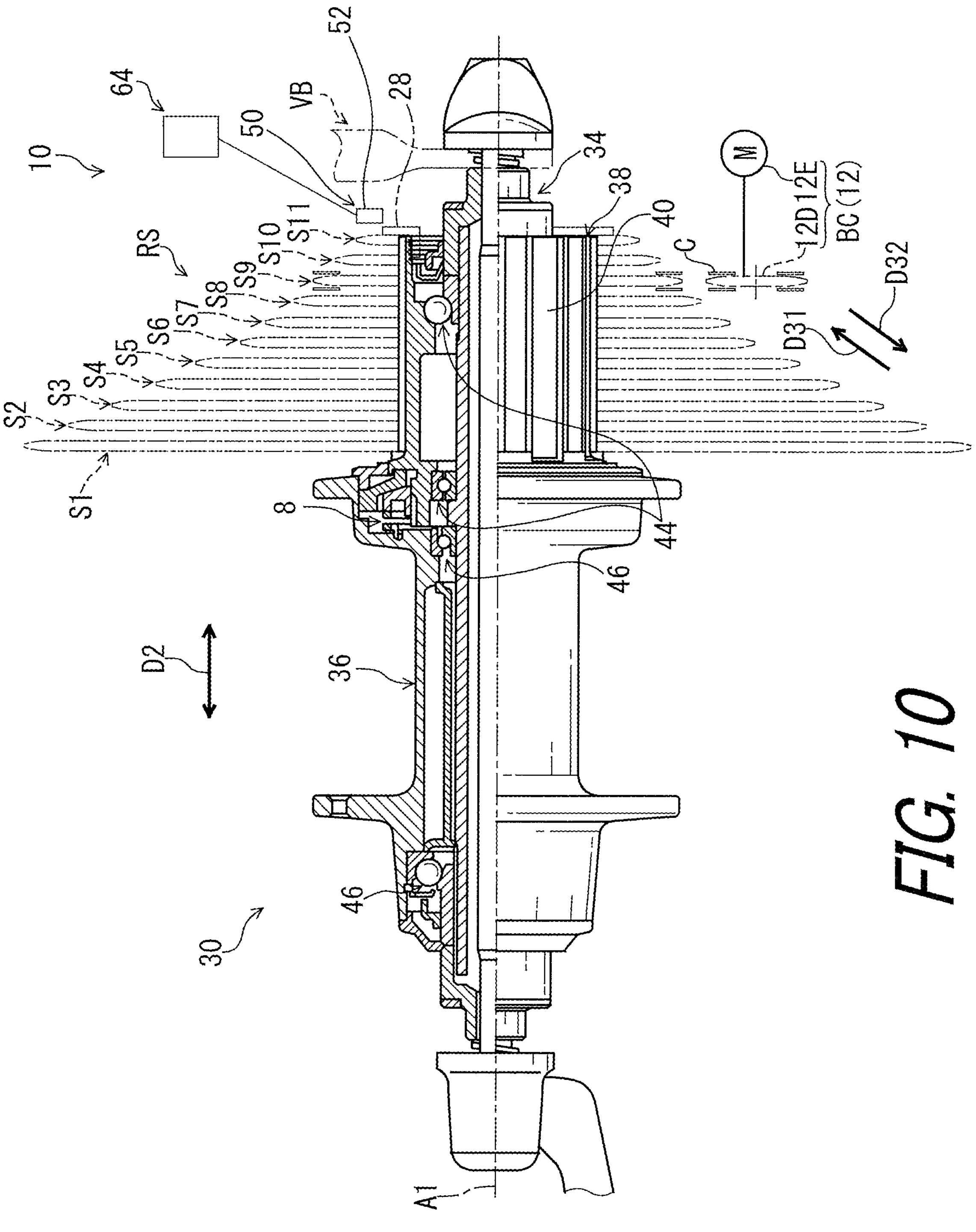
FIG. 10 is a side elevational view of another of the at least two human-powered vehicle components illustrated in FIG. 1.

As seen in FIG. 10, the sprockets S1 to S11 are arranged in an axial direction D2 defined along the rotational axis A1. The at least one human-powered vehicle component BC includes a hub assembly 30. The sprockets S1 to S11 are mounted on the hub assembly 30. The sprocket assembly RS includes a lock member 28. The lock member 28 is configured to fasten the sprockets S1 to S11 to the hub assembly 30. The lock member 28 is configured to be coupled to the hub assembly 30. The sprocket S1 is provided in the axially innermost position in the axial direction D2 in the sprocket assembly RS. The sprocket S11 is provided in the axially outermost position in the axial direction D2 in the sprocket assembly RS. The sprocket S1 corresponds to a low gear. The sprocket S11 corresponds to a top gear.

The hub assembly 30 includes an axle member 34, a hub shell 36, and a sprocket support body 38. The axle member 34 is configured to be mounted to the vehicle body VB and extends in the axial direction D2. The hub shell 36 is configured to be rotatably mounted on the axle member 34 about the rotational axis A1. A rim (not shown) is connected to the hub shell 36 via spokes (not shown). The sprocket support body 38 is configured to rotate along with the sprocket assembly RS and is provided radially outward of the axle member 34. The sprocket assembly RS is configured to be rotatably supported by the sprocket support body 38. In the present embodiment, the sprocket support body 38 has a cylindrical shape extending in the axial direction D2. The sprocket support body 38 includes an outer splined part 40 configured to engage with an inner splined portion of the sprocket assembly RS.

The hub assembly 30 further includes first bearing assemblies 44, second bearing assemblies 46, and a ratchet structure 48. The first bearing assemblies 44 are configured to rotatably support the sprocket support body 38 on the axle member 34. The second bearing assemblies 46 are configured to rotatably support the hub shell 36 on the axle member 34.

The ratchet structure 48 serves as a one-way clutch to transmit a driving force from the sprocket support body 38 to the hub shell 36. The ratchet structure 48 is configured to restrict the sprocket support body 38 from rotating relative to the hub shell 36 in the rotational driving direction D11 (FIG. 9). The ratchet structure 48 is configured to allow the sprocket support body 38 to rotate relative to the hub shell 36 in a reverse direction D12 (FIG. 9) opposite to the rotational driving direction D11.

The sprocket assembly RS, the sprocket support body 38, and the hub shell 36 are configured to integrally rotate relative to the axle member 34 in the rotational driving direction D11 (FIG. 9) during pedaling. Thus, the pedaling torque is transmitted from the sprocket assembly RS to the hub shell 36 via the sprocket support body 38 and the ratchet structure 48 during pedaling. The sprocket assembly RS and the sprocket support body 38 are configured to relatively rotate in the reverse direction D12 (FIG. 9) with respect to the axle member 34 and the hub shell 36 not to transmit force from the hub shell 36 to the sprocket assembly RS during coasting. Thus, the rotation of the hub shell 36 is not transmitted from the hub shell 36 to the sprocket support body 38 and the sprocket assembly RS during coasting. Since the hub assembly 30 includes structures known in the human-powered vehicle field, they will not be described and/or illustrated in detail here for the sake of brevity.

Upshifting occurs when the chain CH is shifted by the gear changer 12 from a larger sprocket to a neighboring smaller sprocket in an upshifting direction D31. Downshifting occurs when the chain CH is shifted by the gear changer 12 from a small sprocket to a neighboring larger sprocket in a downshifting direction D32.

As seen in FIG. 9, the sprockets S1 to S11 have a shift assist structure configured to assist a shifting motion of the chain CH. In the present embodiment, the sprockets S1 to S11 have the shift assist structures AS1 to AS11, respectively.

Figure 11:
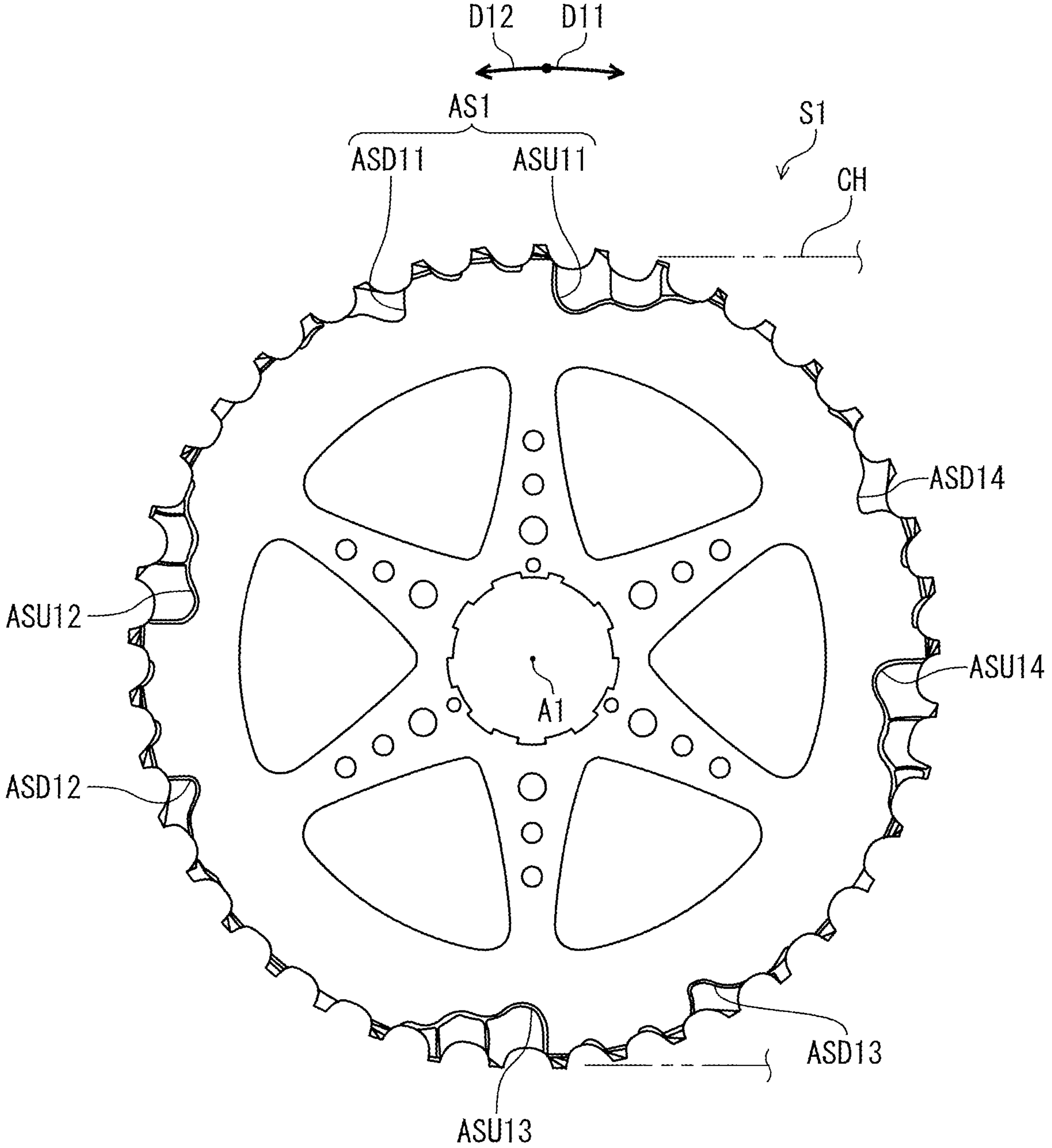
FIG. 11 is a side elevational view of a sprocket of the sprocket assembly illustrated in FIG. 9.

As seen in FIG. 11, the shift assist structure AS1 of the sprocket S1 includes at least one shift assist recess. In the present embodiment, the shift assist structure AS1 includes upshift assist recesses ASU11 to ASU14 and downshift assist recesses ASD11 to ASD14 as the at least one shift assist recess. The upshift assist recesses ASU11 to ASU14 are configured to assist an upshifting motion of the chain CH. The downshift assist recesses ASD11 to ASD14 are configured to assist a downshifting motion of the chain CH. More specifically, the upshift assist recesses ASU11 to ASU14 are configured to reduce interference between the sprocket S1 and the chain CH in the upshifting motion of the chain CH. The downshift assist recesses ASD11 to ASD14 are configured to reduce interference between the sprocket S1 and the chain CH in the downshifting motion of the chain CH.

Figure 12:
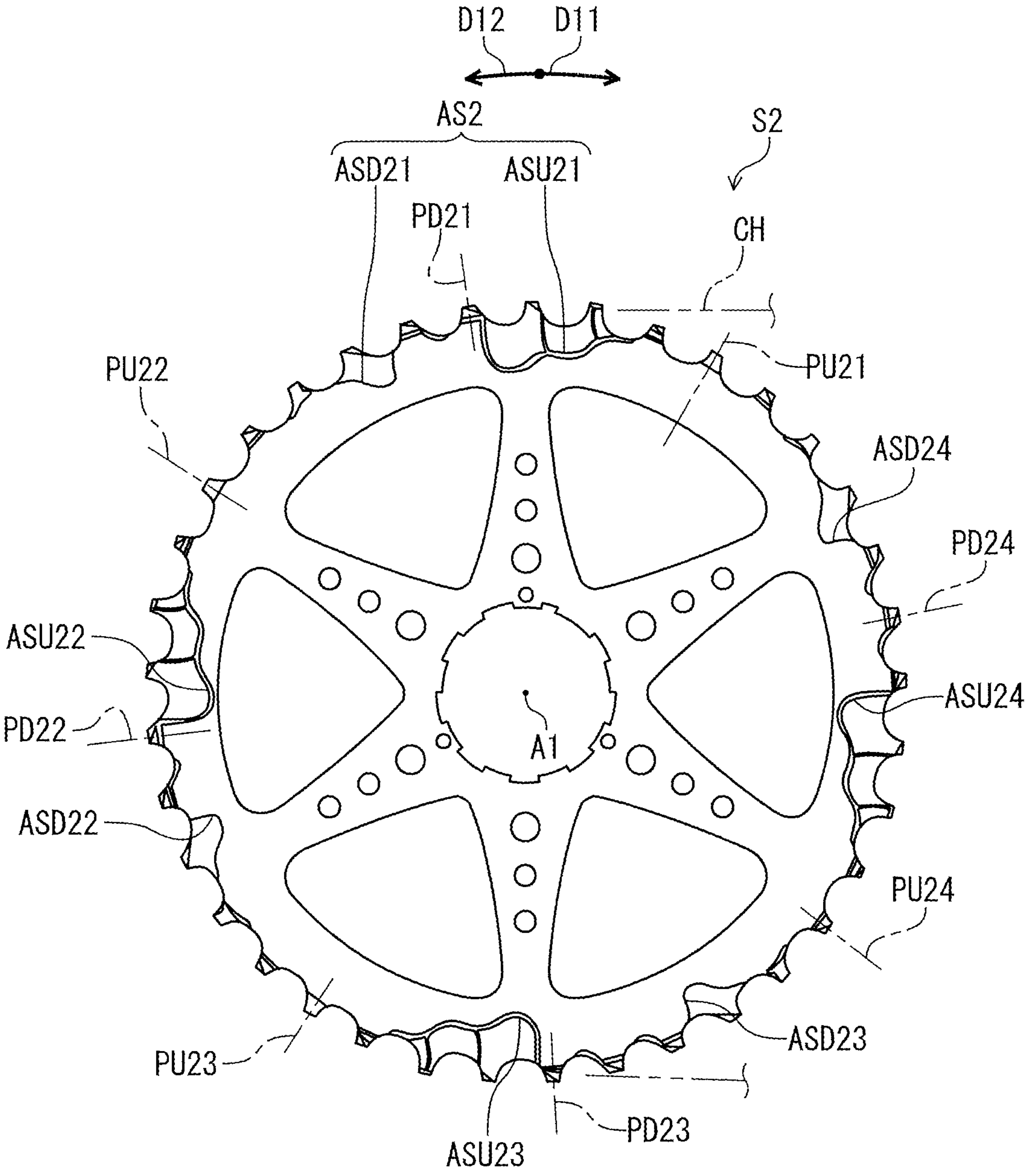
FIG. 12 is a side elevational view of a sprocket of the sprocket assembly illustrated in FIG. 9.

As seen in FIG. 12, the shift assist structure AS2 of the sprocket S2 includes at least one shift assist recess. In the present embodiment, the shift assist structure AS2 includes upshift assist recesses ASU21 to ASU24 and downshift assist recesses ASD21 to ASD24 as the at least one shift assist recess. The upshift assist recesses ASU21 to ASU24 are configured to assist an upshifting motion of the chain CH. The downshift assist recesses ASD21 to ASD24 are configured to assist a downshifting motion of the chain CH. More specifically, the upshift assist recesses ASU21 to ASU24 are configured to reduce interference between the sprocket S2 and the chain CH in the upshifting motion of the chain CH. The downshift assist recesses ASD21 to ASD24 are configured to reduce interference between the sprocket S2 and the chain CH in the downshifting motion of the chain CH.

Figure 13:
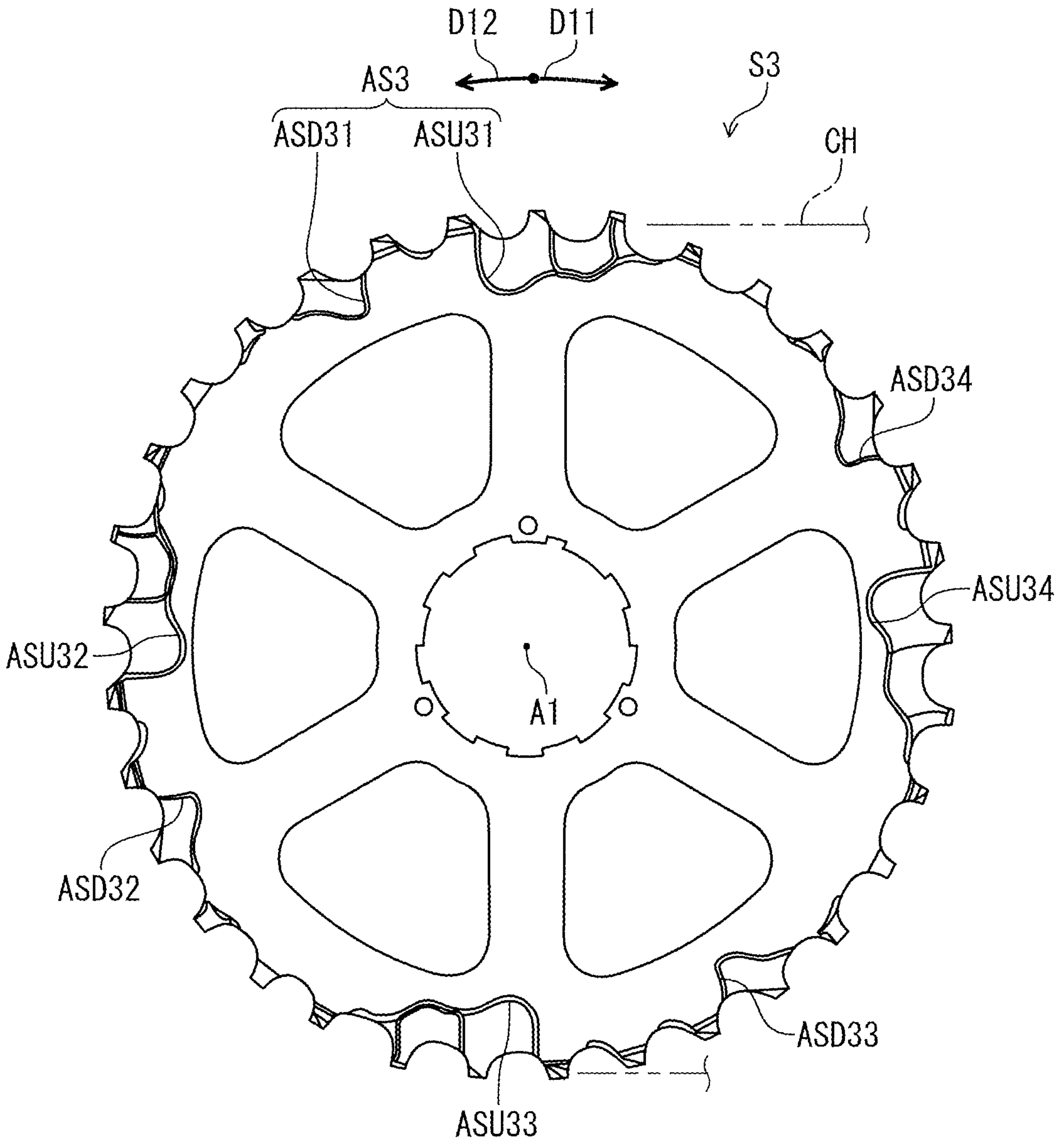
FIG. 13 is a side elevational view of a sprocket of the sprocket assembly illustrated in FIG. 9.

As seen in FIG. 13, the shift assist structure AS3 of the sprocket S3 includes at least one shift assist recess. In the present embodiment, the shift assist structure AS3 includes upshift assist recesses ASU31 to ASU34 and downshift assist recesses ASD31 to ASD34 as the at least one shift assist recess. The upshift assist recesses ASU31 to ASU34 are configured to assist an upshifting motion of the chain CH. The downshift assist recesses ASD31 to ASD34 are configured to assist a downshifting motion of the chain CH. More specifically, the upshift assist recesses ASU31 to ASU34 are configured to reduce interference between the sprocket S3 and the chain CH in the upshifting motion of the chain CH. The downshift assist recesses ASD31 to ASD34 are configured to reduce interference between the sprocket S3 and the chain CH in the downshifting motion of the chain CH.

Each of the shift assist structures AS1 to AS3 can include at least one shift assist tooth and/or at least one shift assist gap instead of or in addition to the at least one shift assist recess. The shift assist gap is free from an additional tooth configured to engage with the chain CH.

As well as the shift assist structures AS1 to AS3 of the sprockets S1 to S3, each of the shift assist structures AS4 to AS11 (FIG. 9) includes at least one shift assist recess. Since they have substantially the same structure as the shift assist structures AS1 to AS3, they will not be described and/or illustrated in detail here for the sake of brevity.

Figure 14:
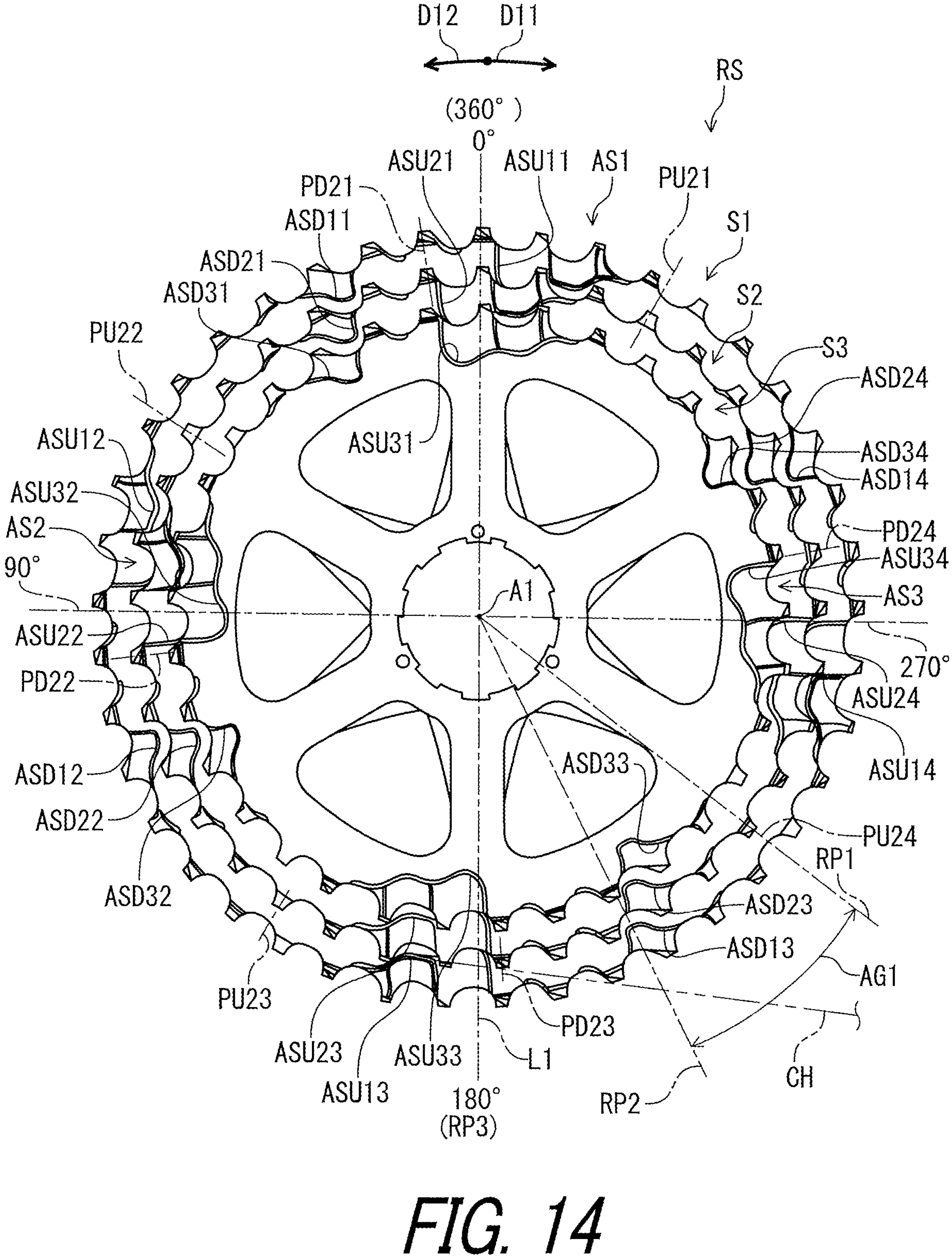
FIG. 14 is a side elevational view of a sprocket of the sprocket assembly illustrated in FIG. 9.

In FIG. 14, the sprockets S4 to S11 are omitted from the sprocket assembly RS for the purpose of illustration. Each of the upshift assist recesses ASU21 to ASU24 has a preferable upshift timing (a preferable rotational position) at which the gear changer 12 shifts the chain CH from the sprocket S2 to the sprocket S3. Similarly, each of the downshift assist recesses ASD11 to ASD14 has a preferable downshift timing (a preferable rotational position) at which the gear changer 12 shifts the chain CH from the sprocket S2 to the sprocket S1. The preferable upshift timing at which the gear changer 12 shifts the chain CH from the sprocket S2 to the sprocket S3 is defined based on the upshift assist recesses ASU21 to ASU24 of the sprocket S2. The preferable downshift timing at which the gear changer 12 shifts the chain CH from the sprocket S2 to the sprocket S1 is defined based on the downshift assist recesses ASD11 to ASD14 of the sprocket S1.

Shifting the chain CH at the preferable upshift timing reduces shock caused by interference between the chain CH and the sprocket S2 during upshifting. Shifting the chain CH at the preferable downshift timing reduces shock caused by interference between the chain CH and the sprocket S1 during downshifting.

Figure 15:
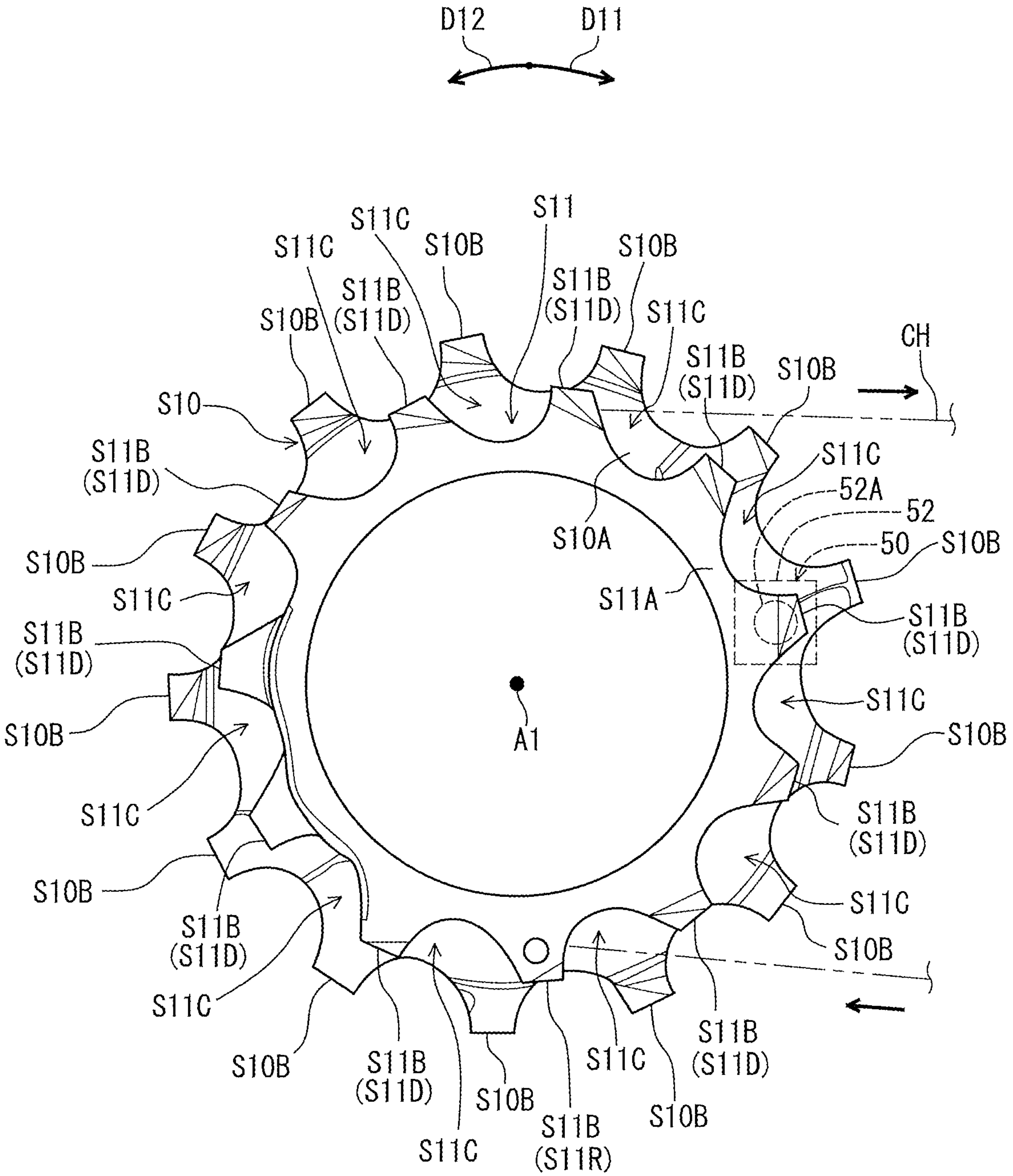
FIG. 15 is a side elevational view of sprockets of the sprocket assembly illustrated in FIG. 9.

As seen in FIG. 15, the sprocket S11 includes a plurality of sprocket teeth S11B. The sprocket S11 includes a sprocket body S11A. The sprocket support body S11A has an annular shape and extends circumferentially about the rotational axis A1. The plurality of sprocket teeth S11B extends radially outwardly from the sprocket body S11A. The plurality of sprocket teeth S11B is configured to be engaged with the chain CH.

The plurality of sprocket teeth S11B includes at least one reference sprocket tooth S11R and at least one sprocket tooth S11D. In the present embodiment, the total number of the sprocket teeth S11B is 11. The plurality of sprocket teeth S11B includes the reference sprocket tooth S11R and at least two sprocket teeth S11D. The total number of the at least one reference sprocket tooth S11R is not limited to one. The total number of the at least one sprocket tooth S11D is not limited to 10. The total number of the sprocket teeth S11B is not limited to 11.

The sprocket S11 includes at least one space S11C. The space S11C is defined circumferentially between adjacent two teeth of the plurality of sprocket teeth S11B. The outer diameter of the sprocket S11 is defined by the plurality of sprocket teeth S11B.

The sprocket S10 includes a sprocket body S10A and a plurality of sprocket teeth S10B. The sprocket support body S10A has an annular shape and extends circumferentially about the rotational axis A1. The plurality of sprocket teeth S10B extends radially outwardly from the sprocket body S10A. The plurality of sprocket teeth S10B is configured to be engaged with the chain CH. The outer diameter of the sprocket S10 is defined by the plurality of sprocket teeth S10B. The outer diameter of the sprocket S11 is smaller than the outer diameter of the sprocket S10. The total number of the sprocket teeth S10B is 13. The total number of the sprocket teeth S11B is less than the total number of the sprocket teeth S10B.

To shorten the time lag between a timing at which the chain CH is pressed against the sprocket S1 to S11 in the shifting motion and a timing at which the chain CH reaches corresponding one of the shift assist structure AS1 to AS11, the human-powered vehicle system 10 is configured to adjust a timing at which the gear changer 12 shifts the chain CH based on a rotational position of the sprocket assembly RS. In the present application, the rotational position of the sprocket assembly RS can be described as an angle in the rotational driving direction D11.

As seen in FIG. 15, the human-powered vehicle system 10 comprises a rotational-position sensor unit 50. The rotational-position sensor unit 50 comprises sensor circuitry 52. The sensor circuitry 52 is configured to detect at least one of: the at least one reference sprocket tooth S11R of the sprocket S11 of the human-powered vehicle B; and the space S11C provided between adjacent two teeth including the at least one reference sprocket tooth S11R.

In the present embodiment, the sensor circuitry 52 is configured to detect the at least one reference sprocket tooth S11R of the sprocket S11 of the human-powered vehicle B. The sensor circuitry 52 has a detection area 52A. The sensor circuitry 52 is configured to detect whether at least one of the at least one reference sprocket tooth S11R is in the detection area 52A. The sensor circuitry 52 is configured to be disposed in a position in which the at least one reference sprocket tooth S11R passes through the detection area 52A. The sensor circuitry 52 is configured to output a detection result DR indicating that the at least one reference sprocket tooth S11R is in the detection area 52A. The sensor circuitry 52 is configured to output the detection result DR indicating that none of the at least one reference sprocket tooth S11R is in the detection area 52A.

In the present embodiment, the sensor circuitry 52 includes a magnetic sensor. The magnetic sensor is configured to detect a change in a magnetic field caused by motion of the at least one reference sprocket tooth S11R. The change in the magnetic field indicates that the at least one reference sprocket tooth S11R is at least partially in the detection area 52A or that none of the at least one reference sprocket tooth S11R is in the detection area 52A.

The sprocket S11 is made of a metallic material. The sprocket S11 is made of a magnetic material. The sensor circuitry 52 is configured to detect the magnetic material of the sprocket S11. Alternatively, the sensor circuitry 52 can include another sensor such as a contact sensor, an optical sensor, a thermal sensor, and a camera.

The at least one reference sprocket tooth S11R has a first character. The first character causes the sensor circuitry 52 to output a first detection result DR1. At least one of the at least one sprocket tooth S11D has a second character. The second character is different from the first character. The second character causes the sensor circuitry 52 to output a second detection result DR2 different from the first detection result DR1.

The sensor circuitry 52 is configured to be provided in a region RG in which the chain CH is not disposed when viewed in the axial direction D2 in a state where the sprocket S11 is engaged with the chain CH. For example, the sensor circuitry 52 is configured to be provided between an upper part of the chain CH and a lower part of the chain CH. The region RG is defined between the upper part and the lower part of the chain CH. The region RG is defined on a front side of the rotational axis A1 when viewed in the axial direction D2. The sensor circuitry 52 is configured to be provided between the upper part and the lower part of the chain CH. The sensor circuitry 52 is configured to be provided on a front side of the rotational axis A1 when viewed in the axial direction D2.

Figure 16:
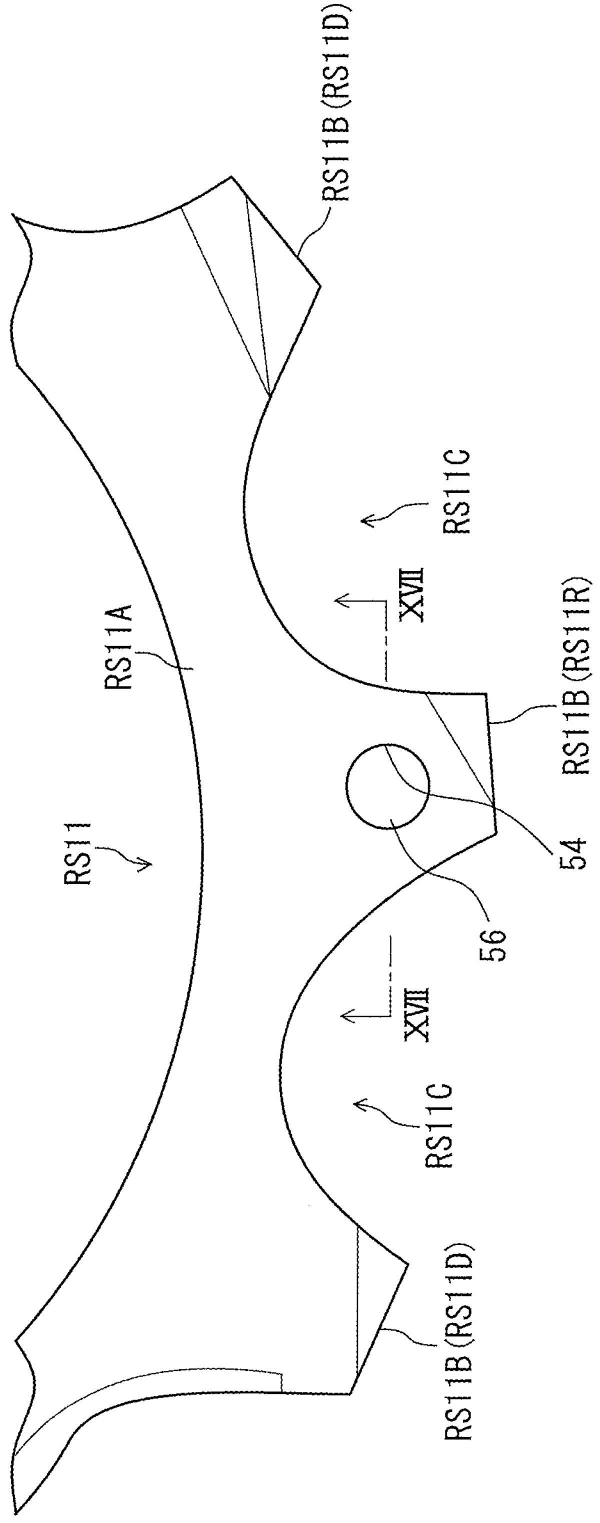
FIG. 16 is an enlarged side elevational view of one of the sprockets illustrated in FIG. 15.

As seen in FIG. 16, the first character includes one of: an opening so that the first character is different from the second character of the at least one sprocket tooth S11D; and an opening and a first member provided in the opening so that the first character is different from the second character of the at least one sprocket tooth S11D. The second character is free of an opening. In the present embodiment, the first character includes an opening 54 and a first member 56 provided in the opening 54. One of the at least one reference sprocket tooth S11R includes the opening 54 and the first member 56.

Figure 17:
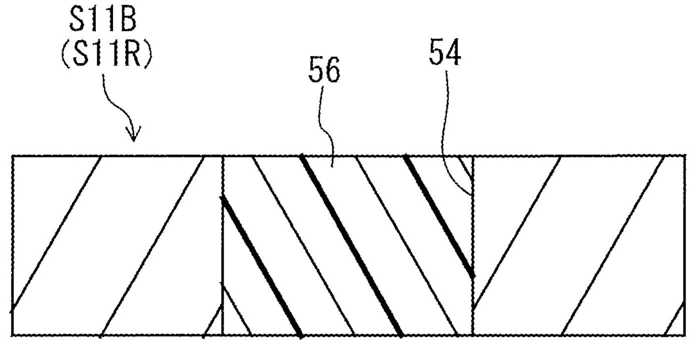
FIG. 17 is a cross-sectional view of the sprocket taken along line XVII-XVII of FIG. 16.

As seen in FIG. 17, the first member 56 is made of a material different from a material of the sprocket S11. The first member 56 is made of a non-metallic material. For example, the first member 56 is made of a resin material. The first member 56 is fitted in the opening 54.

The first character is not limited to the present embodiment. The second character is not limited to the present embodiment. The first character can include physical characteristics (e.g., magnetization).

Namely, the sensor circuitry 52 is configured to detect a reference shape of a reference portion of at least one of the sprocket S11 and the lock member 28. The reference shape of the reference portion is different from a shape of another portion of the at least one of the sprocket S11 and the lock member 28. The reference portion includes the opening 54 of the sprocket S11. The reference shape is defined by the opening 54.

Figure 18:
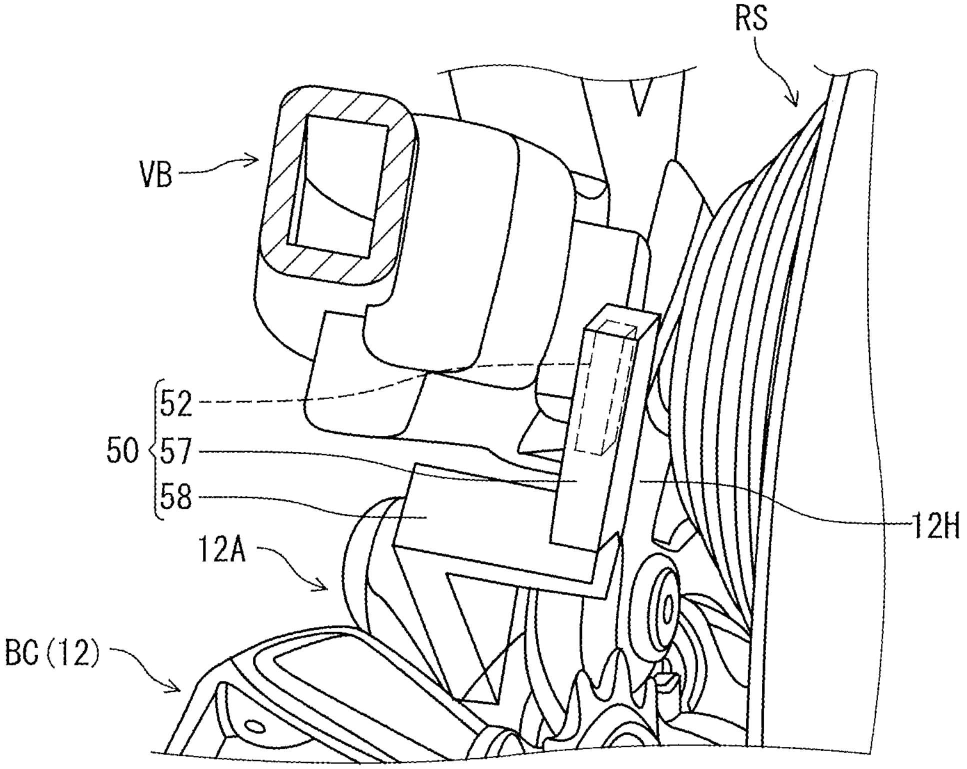
FIG. 18 is a partial perspective view of the human-powered vehicle illustrated in FIG. 1.

As seen in FIG. 18, in the present embodiment, the sensor circuitry 52 is configured to be mounted to the vehicle body VB of the human-powered vehicle B. The sensor circuitry 52 is configured to be mounted to the rear frame body RB of the vehicle body VB. Alternatively, the sensor circuitry 52 can be configured to be mounted to another part of the vehicle body VB or another part of the human-powered vehicle B.

In the present embodiment, the rotational-position sensor unit 50 includes a sensor housing 57. The sensor circuitry 52 is at least partially provided in the sensor housing 57. The sensor housing 57 is configured to be mounted to the vehicle body VB of the human-powered vehicle B. The sensor housing 57 is configured to be coupled to the human-powered vehicle component BC mounted to the vehicle body VB. For example, the sensor housing 57 is configured to be coupled to the base member 12A of the gear changer 12 mounted to the vehicle body VB in a case where the human-powered vehicle component BC includes the gear changer 12. The sensor housing 57 is configured to be coupled to the vehicle body VB via the base member 12A of the gear changer 12 in a case where the human-powered vehicle component BC includes the gear changer 12.

The rotational-position sensor unit 50 includes a coupling member 58. The coupling member 58 is configured to couple the sensor housing 57 and the vehicle body VB. Namely, the coupling member 58 is configured to couple the sensor circuitry 52 and the human-powered vehicle component BC mounted to the vehicle body VB. The coupling member 58 is configured to be coupled to the vehicle body VB via the human-powered vehicle component BC. For example, the coupling member 58 is configured to be coupled to the base member 12A of the gear changer 12 in a case where the human-powered vehicle component BC includes the gear changer 12. The coupling member 58 is configured to be coupled to the vehicle body VB via the base member 12A of the gear changer 12 in a case where the human-powered vehicle component BC includes the gear changer 12. The coupling member 58 can be omitted from the rotational-position sensor unit 50.

Figure 19:
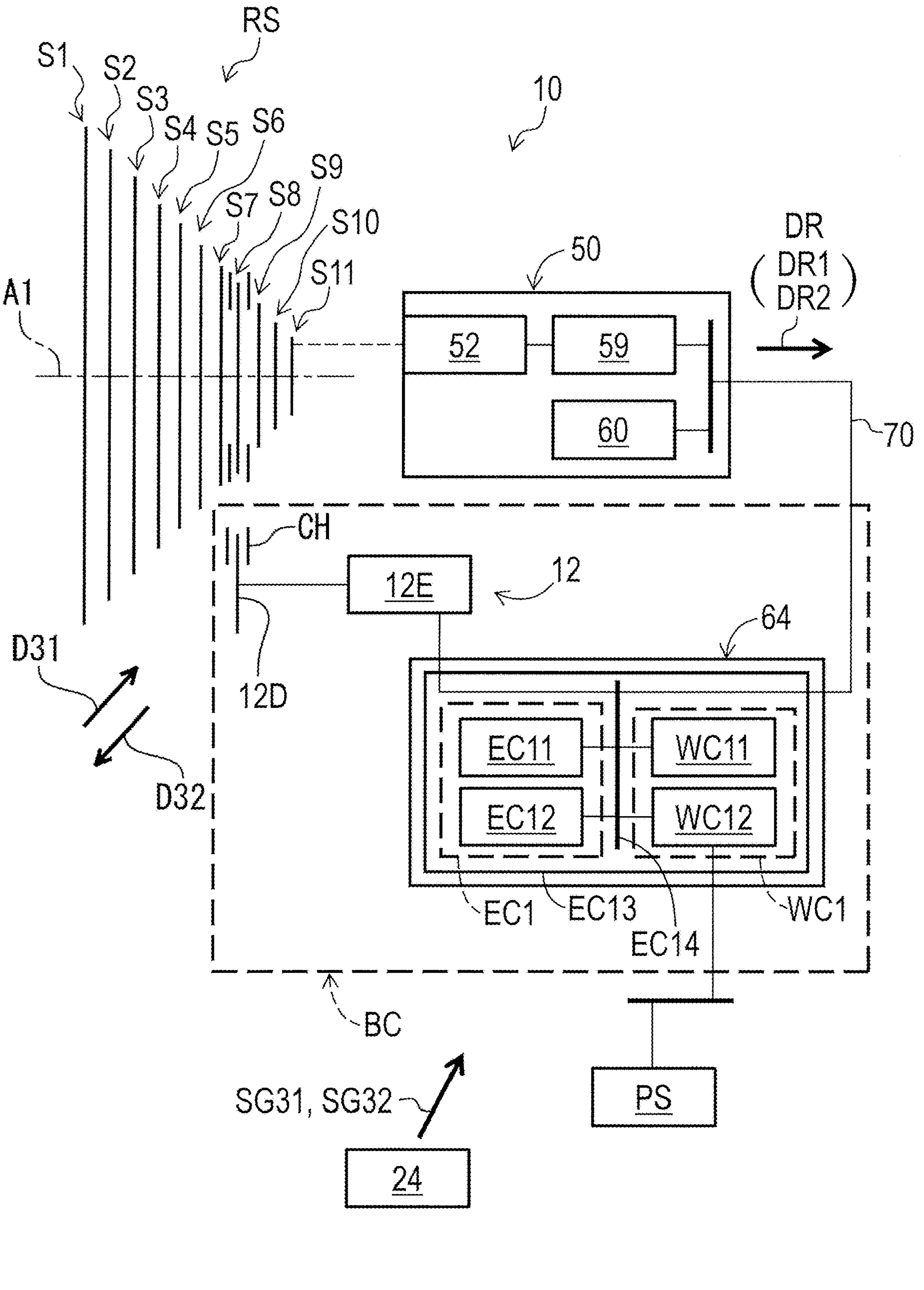
FIG. 19 is a schematic block diagram of the human-powered vehicle system illustrated in FIG. 1.

As seen in FIG. 19, the rotational-position sensor unit 50 further comprises amplifier circuitry 59. The amplifier circuitry 59 is configured to amplify the output of the sensor circuitry 52. The amplifier circuitry 59 is electrically connected to the sensor circuitry 52. The sensor circuitry 52 can include an A/D converter configured to convert an analog output to a digital output.

The rotational-position sensor unit 50 includes an electric power source 60. The electric power source 60 is electrically connected to the sensor circuitry 52 and the amplifier circuitry 59 to supply electricity to the sensor circuitry 52 and the amplifier circuitry 59. The electric power source 60 can be omitted from the rotational-position sensor unit 50 in a case where the rotational-position sensor unit 50 is configured to be powered by an external electric power source.

As seen in FIG. 19, the human-powered vehicle system 10 comprises a human-powered vehicle controller 64. The human-powered vehicle controller 64 is configured to control the gear changer 12 based on the rotational position obtained based on the detection result DR of the rotational-position sensor unit 50. The human-powered vehicle controller 64 is configured to be connected to the sensor circuitry 52 of the rotational-position sensor unit 50.

The human-powered vehicle controller 64 comprises electronic controller circuitry EC1. Namely, the human-powered vehicle system 10 comprises the electronic controller circuitry EC1. The electronic controller circuitry EC1 is configured to be connected to the sensor circuitry 52 of the rotational-position sensor unit 50.

The electronic controller circuitry EC1 includes at least one processor EC11 and at least one memory EC12. The human-powered vehicle controller 64 includes at least one circuit board EC13 and at least one system bus EC14. The electronic controller circuitry EC1 is electrically mounted on the at least one circuit board EC13. The at least one processor EC11 and the at least one memory EC12 are electrically mounted on the at least one circuit board EC13. The at least one processor EC11 is coupled to the at least one memory EC12. The at least one memory EC12 is coupled to the at least one processor EC11. The at least one processor EC11 is electrically connected to the at least one memory EC12 via the at least one circuit board EC13 and the at least one system bus EC14. The at least one memory EC12 is electrically connected to the at least one processor EC11 via the at least one circuit board EC13 and the at least one system bus EC14. For example, the electronic controller circuitry EC1 includes at least one semiconductor. The at least one processor EC11 includes at least one semiconductor. The at least one memory EC12 includes at least one semiconductor.

For example, the at least one processor EC11 includes at least one of a central processing unit (CPU), a micro processing unit (MPU), a graphics processing unit (GPU), and a memory controller. The at least one memory EC12 is electrically connected to the at least one processor EC11. For example, the at least one memory EC12 includes at least one of a volatile memory and a non-volatile memory. Examples of the volatile memory include a random-access memory (RAM) and a dynamic random-access memory (DRAM).

Examples of the non-volatile memory include a read only memory (ROM), an electrically erasable programmable ROM (EEPROM), and a magnetic disc. The at least one memory EC12 includes storage areas each having an address. The at least one processor EC11 is configured to control the at least one memory EC12 to store data in the storage areas of the at least one memory EC12 and reads data from the storage areas of the at least one memory EC12. The at least one processor EC11 can also be referred to as at least one hardware processor EC11, at least one processor circuit EC11, or processor circuitry EC11. The at least one memory EC12 can also be referred to as at least one hardware memory EC12, at least one memory circuit, or memory circuitry EC12. The at least one memory EC12 can also be referred to as a non-transitory computer-readable storage medium EC12. Namely, the electronic controller circuitry EC1 includes the non-transitory computer-readable storage medium EC12.

The electronic controller circuitry EC1 is configured to execute at least one control algorithm of the human-powered vehicle controller 64. For example, the electronic controller circuitry EC1 is programed to execute at least one control algorithm of the human-powered vehicle controller 64. The at least one memory EC12 stores at least one program including at least one computer program code. The at least one program is read into the at least one processor EC11, and thereby the at least one control algorithm of the human-powered vehicle controller 64 is executed based on the at least one program.

The structure of the electronic controller circuitry EC1 is not limited to the above structure. The structure of the electronic controller circuitry EC1 is not limited to the at least one processor EC11 and the at least one memory EC12. The electronic controller circuitry EC1 can be realized by hardware alone or a combination of hardware and software. In the present embodiment, the at least one processor EC11 and the at least one memory EC12 can be separate chips. Alternatively, the at least one processor EC11 and the at least one memory EC12 can be integrated as a single chip such as an application specific integrated circuit (ASIC) or a field programmable gate array (FPGA).

The electronic controller circuitry EC1 can include at least two electronic controller circuits which are separately provided. The at least one control algorithm of the human-powered vehicle controller 64 can be executed by the at least two electronic controller circuits if needed or desired. The electronic controller circuitry EC1 can include at least two processors which are separately provided. The electronic controller circuitry EC1 can include at least two memories which are separately provided. The at least one control algorithm of the human-powered vehicle controller 64 can be executed by the at least two processors if needed or desired. The at least one control algorithm of the human-powered vehicle controller 64 can be stored in the at least two memories if needed or desired. The electronic controller circuitry EC1 can include at least two circuit boards which are separately provided if needed or desired. The electronic controller circuitry EC1 can include at least two system buses which are separately provided if needed or desired.

The human-powered vehicle controller 64 can include communicator circuitry WC1. The communicator circuitry WC1 is configured to transmit the detection result DR of the rotational-position sensor unit 50 to another circuitry. For example, the communicator circuitry WC1 includes wireless communicator circuitry WC11.

The wireless communicator circuitry WC11 is electrically mounted on the at least one circuit board EC13. The wireless communicator circuitry WC11 is configured to wirelessly communicate with other wireless communicator circuitry. For example, the wireless communicator circuitry WC11 includes signal transmitting circuitry, signal receiving circuitry, and antenna circuitry. The signal transmitting circuitry is electrically connected to the antenna circuitry. The signal receiving circuitry is electrically connected to the antenna circuitry. The wireless communicator circuitry WC11 can also be referred to as a wireless communicator WC11 or wireless circuitry WC11.

The wireless communicator circuitry WC11 is configured to transmit wireless signals via the antenna circuitry. The wireless communicator circuitry WC11 is configured to superimpose digital signals on carrier wave using a predetermined communication protocol to wirelessly transmit signals. In the present embodiment, the wireless communicator circuitry WC11 is configured to encrypt signals using a cryptographic key to generate encrypted wireless signals.

The wireless communicator circuitry WC11 is configured to receive wireless signals via the antenna circuitry. In the present embodiment, the wireless communicator circuitry WC11 is configured to decode the wireless signals to recognize signals transmitted from other wireless communicators. The wireless communicator circuitry WC11 is configured to decrypt the wireless signals using the cryptographic key.

The wireless communicator circuitry WC11 includes signal amplifier circuitry. The signal amplifier circuitry is coupled to the signal transmitting circuitry, the signal receiving circuitry, and the antenna circuitry. The signal amplifier circuitry is configured to selectively amplify the signals of the antenna circuitry. The signal amplifier circuitry can be controlled by the electronic controller circuitry EC1. The electronic controller circuitry EC1 can be configured to control the signal amplifier circuitry such that the signal amplifier circuitry operates in a low-power or high-power consumption state.

The communicator circuitry WC1 can includes wired communicator circuitry WC12. The wired communicator circuitry WC12 is electrically connected to the electronic controller circuitry EC1. The wired communicator circuitry WC12 is configured to communicate with other wired communicator circuitry via an electrical cable.

The wired communicator circuitry WC12 is configured to communicate with other wired communicator circuitry using power line communication (PLC) technology. For example, the electrical cable includes a ground line and a voltage line that are detachably connected to a serial bus that is formed by communication interfaces. The wired communicator circuitry WC12 is configured to communicate with other wired communicator circuitry through the voltage line using the PLC technology. For example, the wired communicator circuitry WC12 is configured to be electrically connected to the electric power source PS. Since the PLC technology has been known, it will not be described in detail here for the sake of brevity.

As seen in FIG. 19, the electronic controller circuitry EC1 is electrically connected to the rotational-position sensor unit 50 to receive the detection result DR from the rotational-position sensor unit 50. The electronic controller circuitry EC1 is electrically connected to the sensor circuitry 52 to receive the detection result DR from the sensor circuitry 52. The electronic controller circuitry EC1 is electrically connected to the amplifier circuitry 59 to receive the detection result DR, which is amplified by the amplifier circuitry 59, from the sensor circuitry 52 via the amplifier circuitry 59. For example, the electronic controller circuitry EC1 is electrically connected to the sensor circuitry 52 via an electric cable 70.

Figure 20:
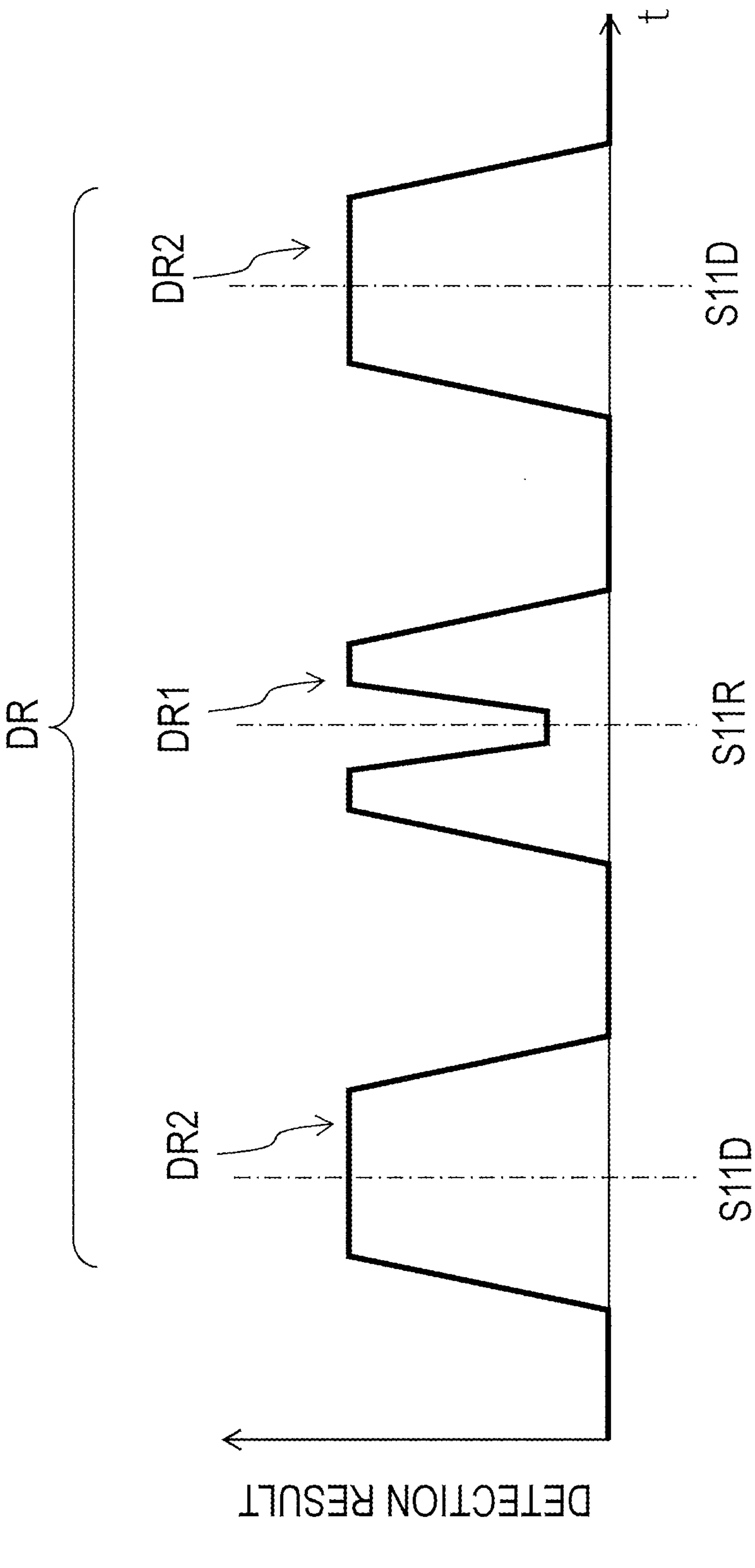
FIG. 20 shows a detection result of a rotational-position sensor unit of the human-powered vehicle system.

As seen in FIG. 20, the detection result DR indicates that the at least one reference sprocket tooth S11R is in the detection area 52A. The detection result DR indicates that none of the at least one reference sprocket tooth S11R is in the detection area 52A. The detection result DR includes a change in a magnetic field caused by motion of the at least one reference sprocket tooth S11R. The detection result DR includes a change in a magnetic field caused by motion of the plurality of sprocket teeth S11B. For example, the change in the magnetic field caused by motion of the plurality of sprocket teeth S11B is expressed with the waveform depicted in FIG. 20. The detection result DR includes the first detection result DR1 and the second detection result DR2. The first detection result DR1 indicating the at least one reference sprocket tooth S11R is different from the second detection result DR2 indicating the at least one sprocket tooth S11D since the at least one reference sprocket tooth S11R includes the opening 54 depicted in FIG. 16.

Figure 21:
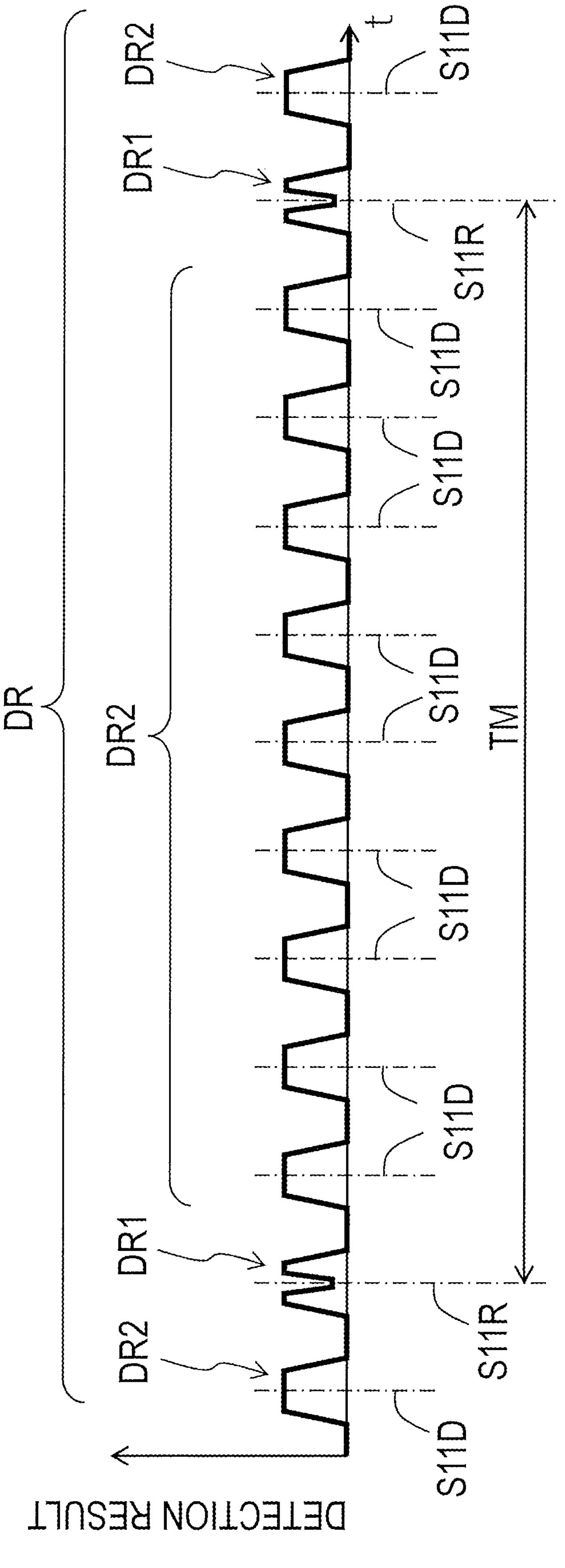
FIG. 21 shows the detection result of the rotational-position sensor unit of the human-powered vehicle system.

As seen in FIG. 21, the electronic controller circuitry EC1 is configured to calculate a rotational position of the sprocket S11 based on the detection result DR of the sensor circuitry 52. The rotational position of the sprocket S11 indicates the rotational position of the sprocket assembly RS. Thus, the electronic controller circuitry EC1 is configured to calculate the rotational position of the sprocket assembly RS based on the detection result DR of the sensor circuitry 52.

The electronic controller circuitry EC1 is configured to calculate the rotational position of the sprocket assembly RS based on the first detection result DR1 and the second detection result DR2. For example, the electronic controller circuitry EC1 is configured to recognize the absolute rotational position of the sprocket S11 based on the first detection result DR1 since the first detection result DR1 has the waveform different from the waveform of the second detection result DR2. Thus, the electronic controller circuitry EC1 is configured to calculate the current rotational position of the sprocket assembly RS based on the absolute rotational position and the second detection result DR2.

The electronic controller circuitry EC1 is configured to recognize a timing at which the at least one reference sprocket tooth S11R is in the detection area 52A (see e.g., FIG. 15). The electronic controller circuitry EC1 is configured to periodically obtain a time TM for which the sprocket S11 rotates by 360 degrees based on the first detection result DR1 and the second detection result DR2.

The electronic controller circuitry EC1 is configured to calculate a current rotational speed of the sprocket assembly RS based on the detection result DR of the sensor circuitry 52. The electronic controller circuitry EC1 is configured to calculate the current rotational speed of the sprocket assembly RS based on the time TM. The electronic controller circuitry EC1 is configured to periodically calculate the current rotational speed of the sprocket assembly RS based on a rotation angle of the sprocket assembly RS per unit time. The electronic controller circuitry EC1 is configured to store the current rotational speed in the at least one memory EC12. The electronic controller circuitry EC1 can be configured to periodically update the current rotational speed stored in the at least one memory EC12. Other rotational speed sensors can be used instead of the rotational-position sensor unit 50 if needed and/or desired.

As seen in FIG. 19, the electronic controller circuitry EC1 is configured to control the human-powered vehicle B based on the detection result DR of the sensor circuitry 52 of the rotational-position sensor unit 50 configured to detect at least one of: the at least one reference sprocket tooth S11R (see e.g., FIG. 15) of the sprocket S11 of the human-powered vehicle B; and a space provided between adjacent two teeth including the at least one reference sprocket tooth S11R. The electronic controller circuitry EC1 is configured to control the human-powered vehicle B based on the detection result DR of the rotational-position sensor unit 50. In the present embodiment, the electronic controller circuitry EC1 is configured to control the gear changer 12 of the human-powered vehicle B based on the detection result DR of the sensor circuitry 52.

The electronic controller circuitry EC1 is configured to store an operating time for which the gear changer 12 shifts the chain CH between a sprocket and a neighboring sprocket. The sprocket is adjacent to the neighboring sprocket without another sprocket between the sprocket and the neighboring sprocket. For example, the electronic controller circuitry EC1 is configured to store the operating time for which the gear changer 12 shifts the chain CH between adjacent two sprockets among the sprockets S1 to S11. The electronic controller circuitry EC1 is configured to store the operating times for which the gear changer 12 shifts the chain guide 12D between adjacent two shift positions among shift positions which respectively correspond to the sprockets S1 to S11.

FIG. 22 shows an example of a list of the operating time. As seen in FIG. 22, the electronic controller circuitry EC1 (FIG. 19) is configured to store the operating times TU1 to TD11 in the at least one memory EC12 (FIG. 19). Namely, the electronic controller circuitry EC1 serves as an operating time memory configured to store an operating time for which the gear changer 12 shifts the chain CH between a sprocket and an additional sprocket of the sprocket assembly RS.

For example, the operating time TU2 is a shift time for which the gear changer 12 shifts the chain guide 12D from a shift position corresponding to the sprocket S2 (FIG. 10) to a shift position corresponding to the sprocket S3 (FIG. 10) during upshifting. The operating time TD2 is a shift time for which the gear changer 12 shifts the chain guide 12D from the shift position corresponding to the sprocket S2 to a shift position corresponding to the sprocket S1 during downshifting.

As seen in FIG. 19, the electronic controller circuitry EC1 is configured to calculate a shift timing at which the gear changer 12 starts to shift the chain CH based on: the operating time stored in the electronic controller circuitry EC1; and the detection result DR obtained from the sensor circuitry 52 when the operation signal SG31 or SG32 is inputted to actuate the gear changer 12 from the operating device 24 to the electronic controller circuitry EC1. The electronic controller circuitry EC1 is configured to obtain the current rotational position of the sprocket assembly RS based on the detection result DR of the rotational-position sensor unit 50 when the operation signal SG31 or SG32 to actuate the gear changer 12 is inputted from the operating device 24 to the human-powered vehicle controller 64.

For example, the operation signal SG31 can also be referred to as an upshifting operation signal SG31. The operation signal SG32 can also be referred to as a downshifting operation signal SG32. the electronic controller circuitry EC1 is configured to obtain the current rotational position of the sprocket assembly RS based on the detection result DR of the rotational-position sensor unit 50 when the upshifting operation signal SG31 to actuate the gear changer 12 is inputted from the operating device 24 to the human-powered vehicle controller 64. The electronic controller circuitry EC1 is configured to obtain the current rotational position of the sprocket assembly RS based on the detection result DR of the rotational-position sensor unit 50 when the downshifting operation signal SG32 to actuate the gear changer 12 is inputted from the operating device 24 to the human-powered vehicle controller 64. Alternatively, the electronic controller circuitry EC1 can be configured to periodically obtain the current rotational position of the sprocket assembly RS based on the detection result DR of the rotational-position sensor unit 50 regardless of the receipt of the operation signal SG31 or SG32 and can be configured to use the current rotational position when the operation signal SG31 or SG32 to actuate the gear changer 12 is inputted from the operating device 24 to the human-powered vehicle controller 64.

As seen in FIG. 19, the electronic controller circuitry EC1 is configured to control the gear changer 12 to start to shift the chain CH at the shift timing. In the present embodiment, the electronic controller circuitry EC1 is configured to store the current rotational position. The electronic controller circuitry EC1 serves as a timing calculator configured to calculate a shift timing at which the gear changer 12 starts to shift the chain CH based on the operating time and the current rotational position of the sprocket assembly RS.

FIG. 23 shows an example of a list of the reference rotational positions. As seen in FIG. 23, the electronic controller circuitry EC1 is configured to store a reference rotational position in which the gear changer 12 completes shifting the chain guide 12D from a current shift position to a target shift position adjacent to the current shift position. In the present embodiment, the electronic controller circuitry EC1 is configured to store at least one reference rotational position for each of the sprockets S1 to S11.

As seen in FIG. 14, the sprocket S2 has reference rotational positions PU21 to PU24 for the upshift assist recesses ASU21 to ASU24, respectively. The sprocket S2 has reference rotational positions PD21 to PD24 for the downshift assist recesses ASD11 to ASD14 of the sprocket S1, respectively. The reference rotational positions PU21 to PU24 are defined based on the positions of the upshift assist recesses ASU21 to ASU24 of the sprocket S2. The reference rotational positions PD21 to PD24 are defined based on the positions of the downshift assist recesses ASD11 to ASD14 of the sprocket S1.

The rotational position is defined on the sprocket assembly RS about the rotational axis A1 from 0 to 360 degrees. A positive direction of the rotational position coincides with the reverse direction D12 opposite to the rotational driving direction D11. The current rotational position can be obtained based on the detection result DR of the rotational-position sensor unit 50 (FIG. 19) based on the reference line L1 extending radially outwardly from the rotational axis A1 to a lower side of the sprocket assembly RS. For example, the rotational position of the sprocket assembly RS shown in FIG. 14 is 180 degrees.

Figure 24:
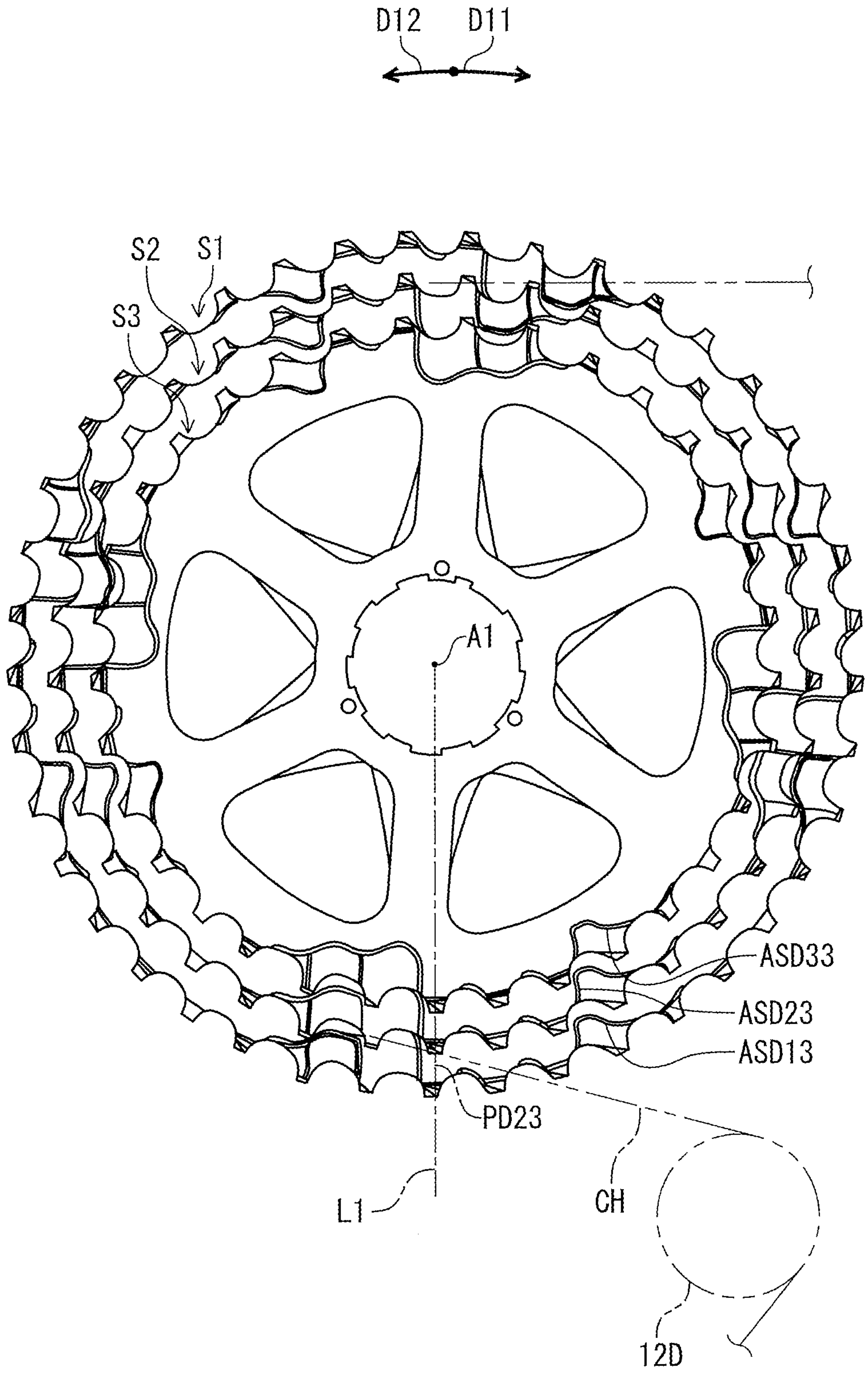
FIG. 24 is a side elevational view of the sprockets of the sprocket assembly illustrated in FIG. 9 for explaining operations of the sprocket assembly and a bicycle chain during downshifting.
Figure 25:
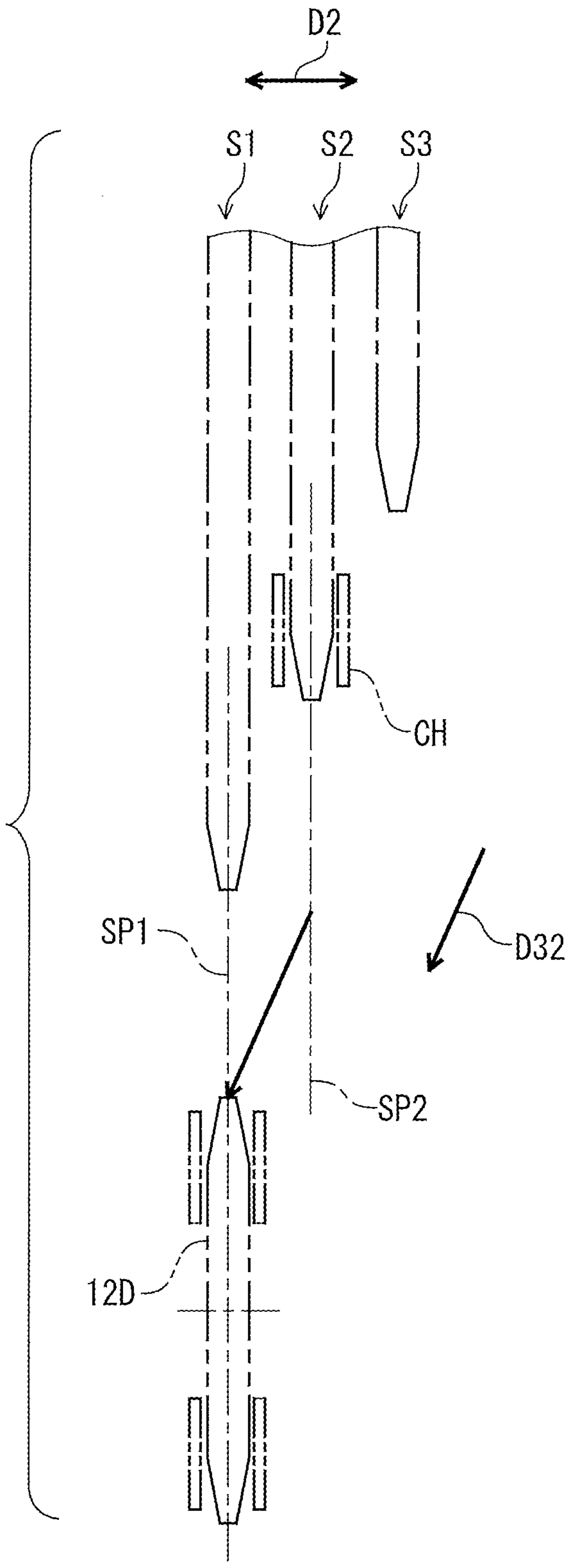
FIG. 25 is a partial rear elevational view of the sprockets of the sprocket assembly illustrated in FIG. 9 for explaining operation of a derailleur during downshifting.

As seen in FIGS. 24 and 25, for example, the gear changer 12 preferably completes shifting the chain guide 12D from a shift position SP2 (FIG. 25) corresponding to the sprocket S2 to a shift position SP1 (FIG. 25) corresponding to the sprocket S1 when or immediately before the reference rotational position PD23 reaches the reference line L1.

Figure 26:
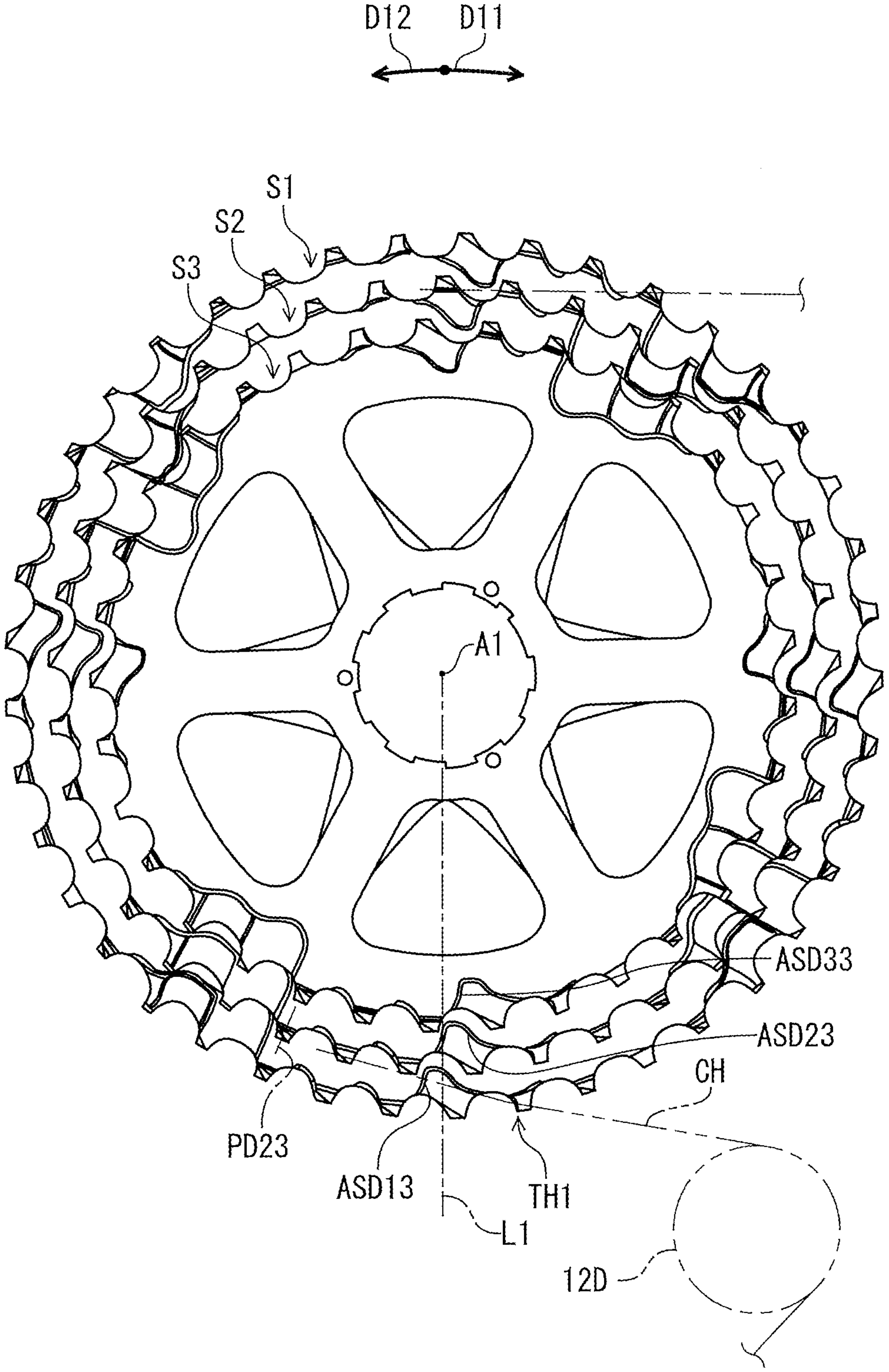
FIG. 26 is a side elevational view of the sprockets of the sprocket assembly illustrated in FIG. 9 for explaining operations of the sprocket assembly and a chain during downshifting.
Figure 27:
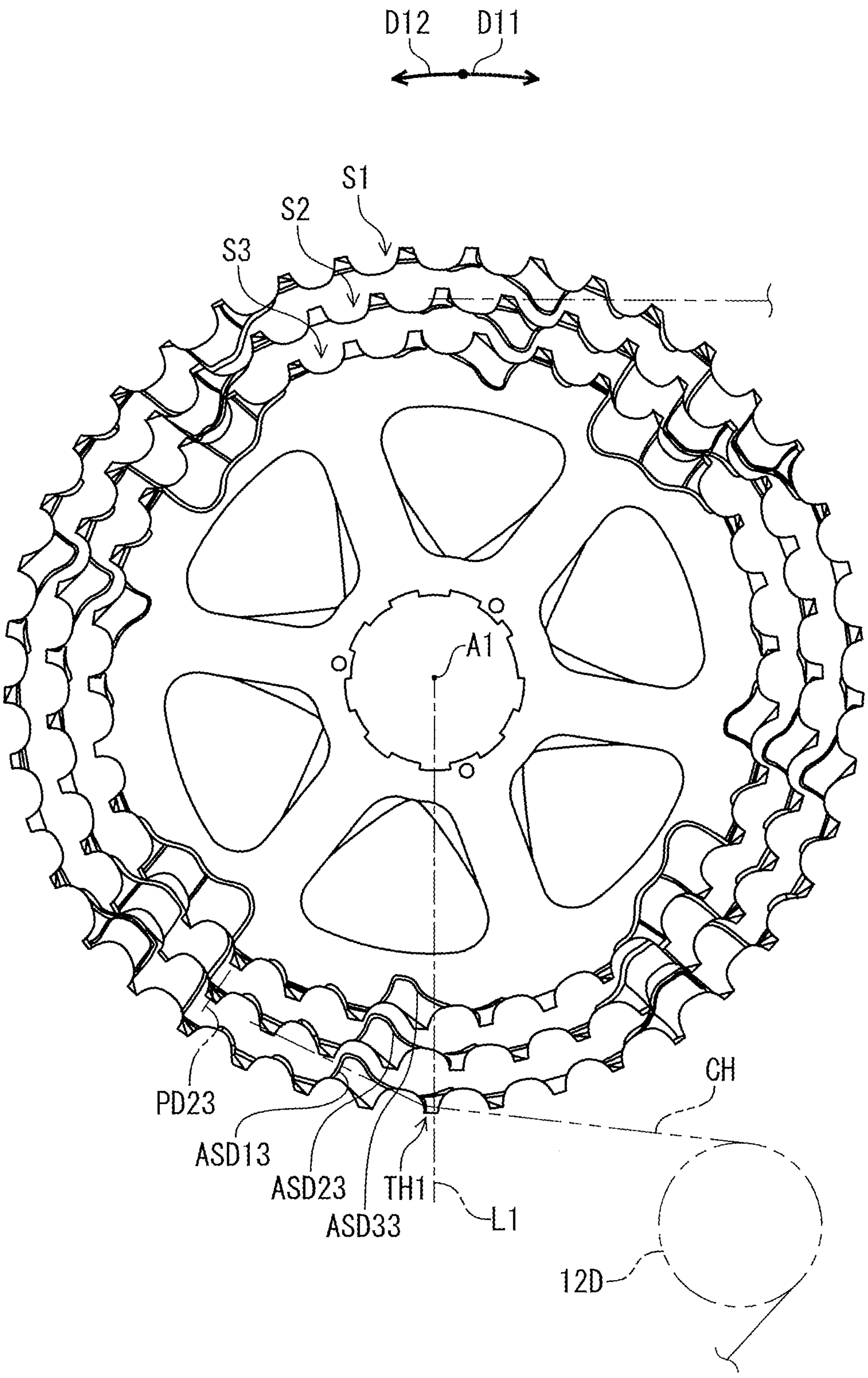
FIG. 27 is a side elevational view of the sprockets of the sprocket assembly illustrated in FIG. 9 for explaining operations of the sprocket assembly and the chain during downshifting.

As seen in FIGS. 26 and 27, for example, a tooth TH1 of the sprocket S1 engages with the chain CH when the sprocket assembly RS further rotates in the rotational driving direction D11. At this time, the downshift assist recesses ASD13 reduces interference between the sprocket S1 and the chain CH.

Figure 28:
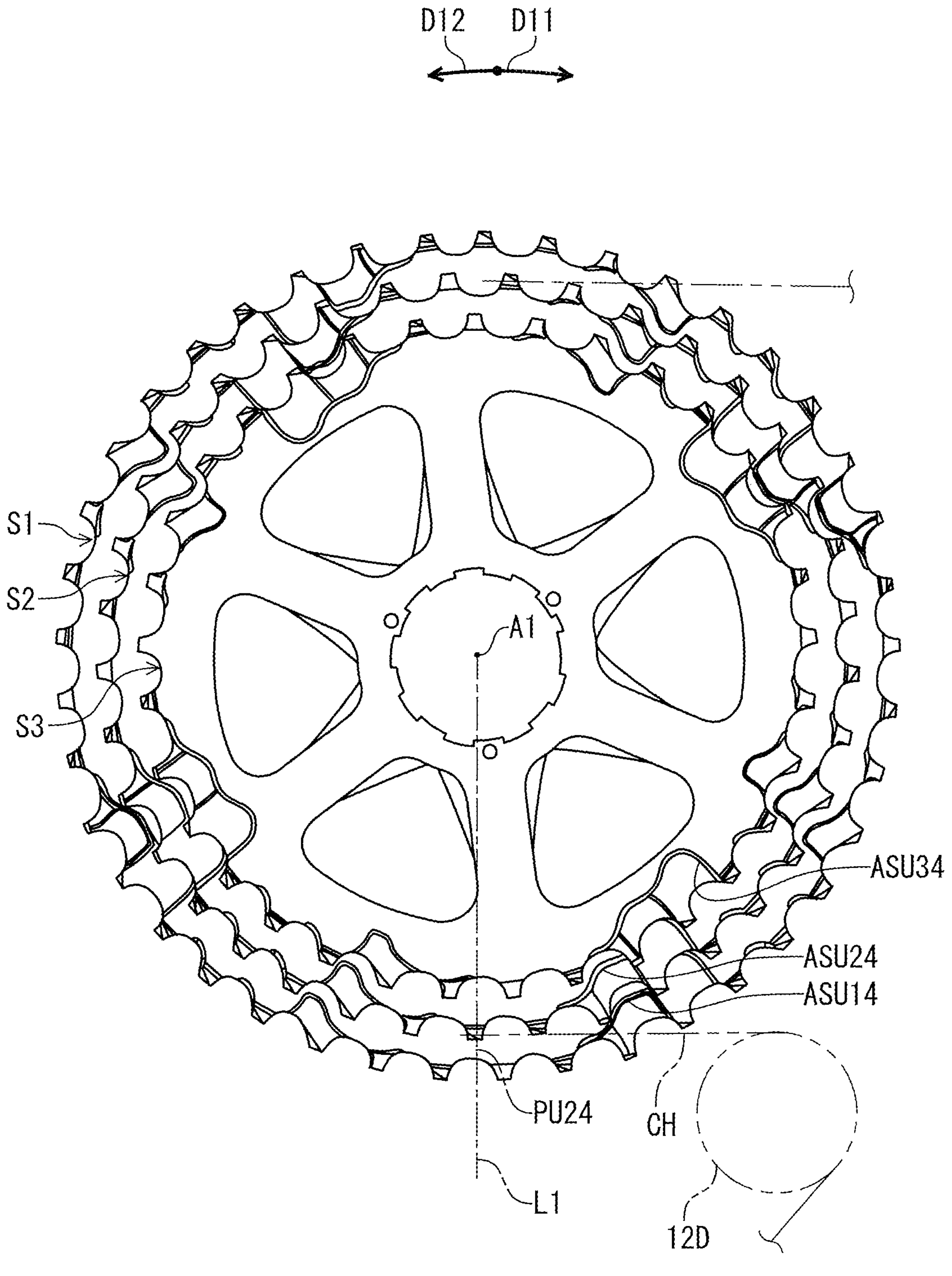
FIG. 28 is a side elevational view of the sprockets of the sprocket assembly illustrated in FIG. 9 for explaining operations of the sprocket assembly and the chain during upshifting.
Figure 29:
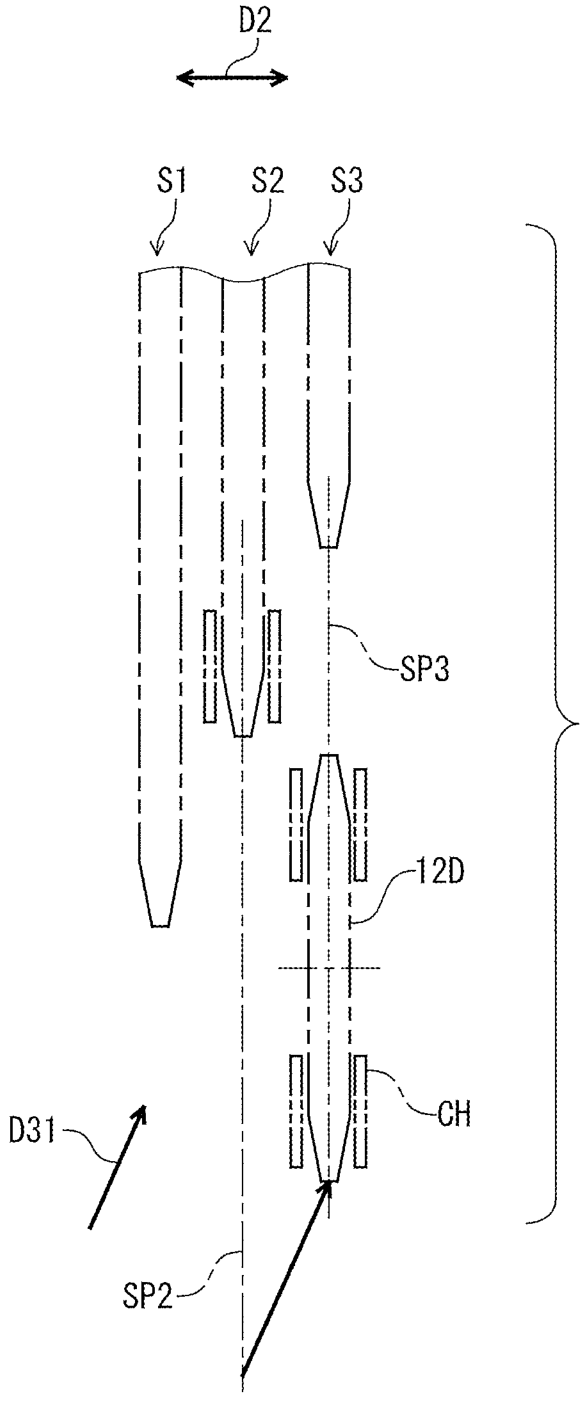
FIG. 29 is a partial rear elevational view of the sprockets of the sprocket assembly illustrated in FIG. 9 for explaining operation of the derailleur during upshifting.

As seen in FIGS. 28 and 29, the gear changer 12 preferably completes shifting the chain guide 12D from the shift position SP2 to a shift position SP3 corresponding to the sprocket S3 when or immediately before the reference rotational position PU24 reaches the reference line L1.

Figure 30:
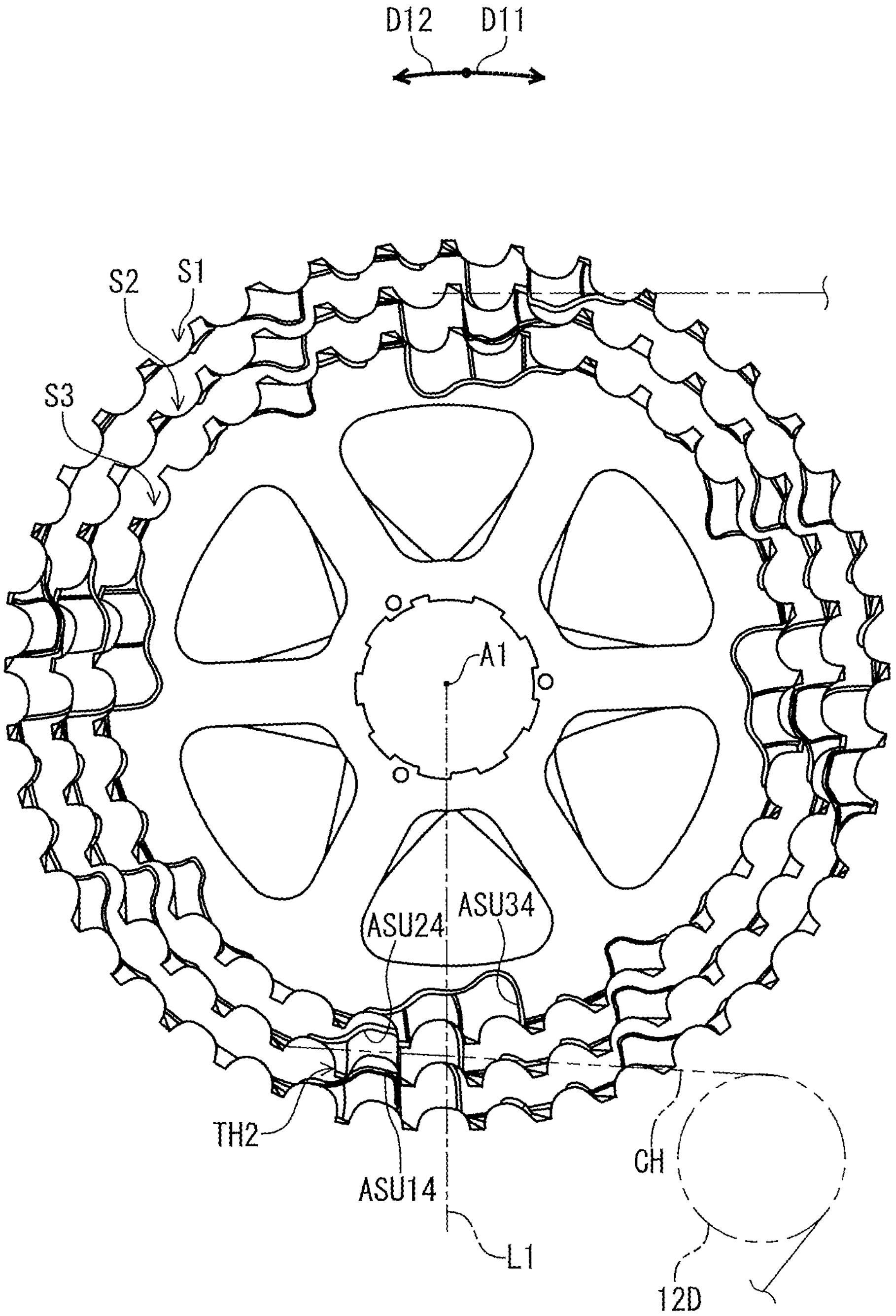
FIG. 30 is a side elevational view of the sprockets of the sprocket assembly illustrated in FIG. 9 for explaining operations of the sprocket assembly and the chain during downshifting.
Figure 31:
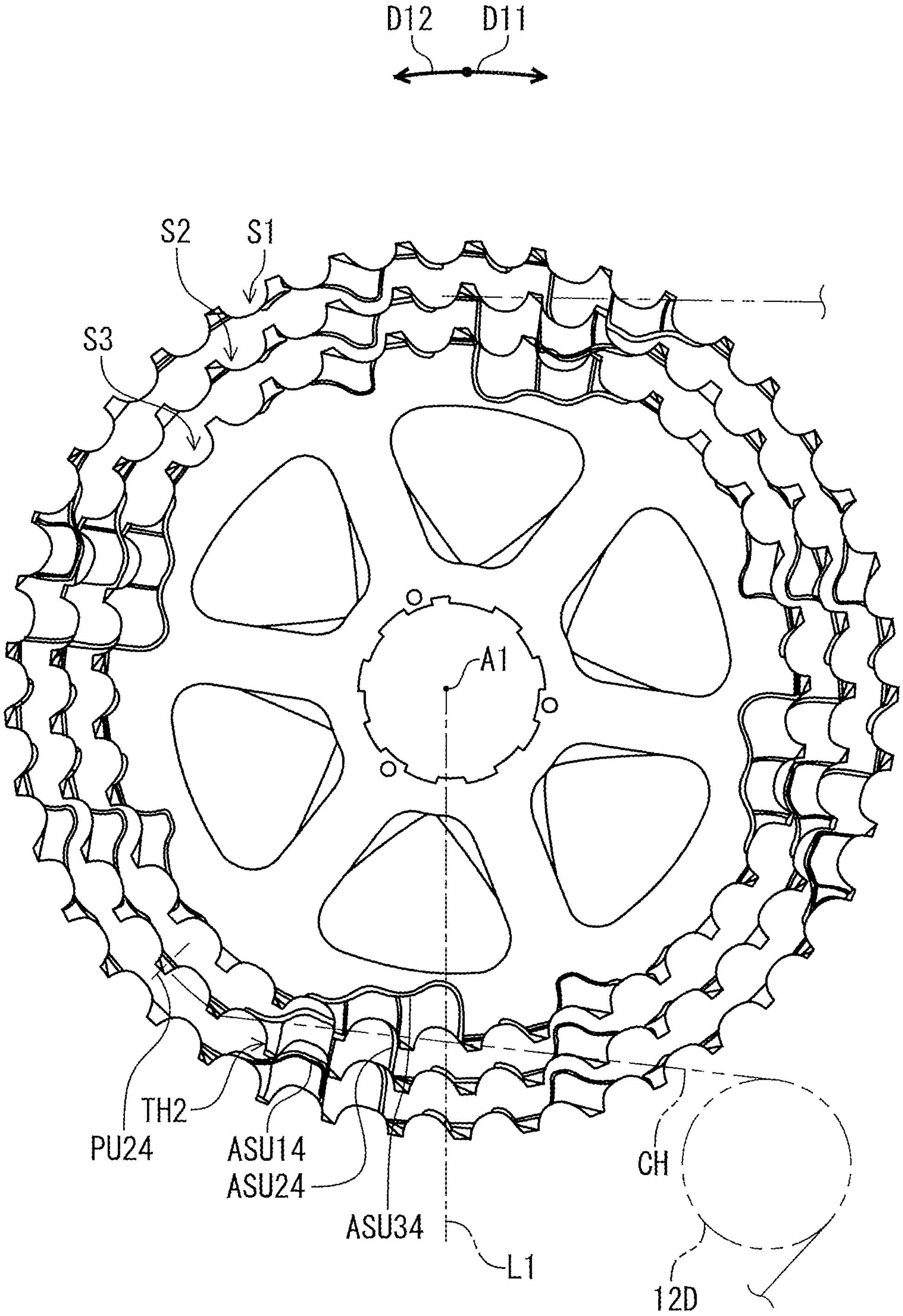
FIG. 31 is a side elevational view of the sprockets of the sprocket assembly illustrated in FIG. 9 for explaining operations of the sprocket assembly and the chain during downshifting.

As seen in FIGS. 30 and 31, for example, a tooth TH2 disengages from the chain CH when the sprocket assembly RS further rotates in the rotational driving direction D11. At this time, the downshift assist recesses ASU24 reduces interference between the sprocket S2 and the chain CH.

As seen in FIG. 19, the electronic controller circuitry EC1 is configured to calculate the shift timing at which the gear changer 12 starts to shift the chain CH based on the operating time (FIG. 22), the current rotational position, the reference rotational position (FIG. 23), and the current rotational speed of the sprocket assembly RS.

More specifically, the electronic controller circuitry EC1 is configured to calculate a rotation angle AG1 of the sprocket assembly RS for the operating time T1 based on the operating time T1 and the current rotational speed RS1 based on the following formula (1).

$$AG1 = T1 \times RS1 \tag{1}$$

The electronic controller circuitry EC1 is configured to select a reference position group including the reference rotational positions from the reference rotational positions stored in the at least one memory EC12 based on the current shift position stored in the at least one memory EC12 and the operation signal SG31 or SG32 inputted from the operating device 24. For example, the electronic controller circuitry EC1 selects a reference position group including the reference rotational positions PU21 to PU24 (FIG. 23) when the upshifting operation signal SG31 is inputted from the operating device 24 in a case where the current shift position is the shift position SP2 (FIG. 25) corresponding to the sprocket S2.

The electronic controller circuitry EC1 is configured to select, as a selected reference rotational position, one of the reference rotational positions from the reference position group which is selected based on the current shift position and the operation signal SG31 or SG32. More specifically, the electronic controller circuitry EC1 is configured to select a reference rotational position which is closest to the current rotational position RP3 (FIG. 14) and which is disposed on a downstream side of the current rotational position RP3 from the reference position group. The current rotational position RP3 is a rotational position of the sprocket assembly RS disposed on the reference line L1 (FIG. 14).

If the upshifting operation signal SG31 is inputted from the operating device 24 when the sprocket assembly RS is disposed at a rotational position illustrated in FIG. 14, the electronic controller circuitry EC1 selects the reference rotational position PU24 as the selected reference rotational position RP1. If the downshifting operation signal SG32 is inputted from the operating device 24 when the sprocket assembly RS is disposed at a rotational position illustrated in FIG. 14, the electronic controller circuitry EC1 selects the reference rotational position PD24 as the selected reference rotational position RP1.

The electronic controller circuitry EC1 is configured to calculate, based on the rotation angle AG1 and the selected reference rotational position RP1, a starting rotational position RP2 (FIG. 14) where the gear changer 12 starts shifting the chain guide 12D from the current shift position to the target shift position adjacent to the current shift position using the following formula (2).

$$RP2 = RP1 - AG1 \tag{2}$$

The electronic controller circuitry EC1 is configured to determine whether the starting rotational position RP2 is equal to or larger than the current rotational position RP3 (FIG. 14). More specifically, the electronic controller circuitry EC1 is configured to determine whether the starting rotational position RP2 is disposed at a position equal to or on a downstream side of the current rotational position RP3

(FIG. 14). In the present embodiment, for example, the current rotational position RP3 is a current rotational position obtained based on the detection result DR of the rotational-position sensor unit 50 when the operation signal SG31 or SG32 to actuate the gear changer 12 is inputted from the operating device 24 to the human-powered vehicle controller 64.

In a case where the electronic controller circuitry EC1 determines that the starting rotational position RP2 is equal to or larger than the current rotational position RP3, the electronic controller circuitry EC1 controls the gear changer 12 to start shifting the chain guide 12D from the current shift position to the adjacent shift position when the sprocket assembly RS reaches the starting rotational position RP2.

In a case where the electronic controller circuitry EC1 determines that the starting rotational position RP2 is smaller than the current rotational position RP3, the electronic controller circuitry EC1 selects the reference rotational position arranged on a downstream side of the selected reference rotational position from the reference position group as the selected reference rotational position. As seen in FIG. 14, for example, the electronic controller circuitry EC1 selects the reference rotational position PD24 arranged on a downstream side of the selected reference rotational position PD23 when the current shift position is a shift position corresponding to the sprocket S2.

The operation of the human-powered vehicle system 10 will be described below referring to FIGS. 14 and 32 to 36.

Figure 32:
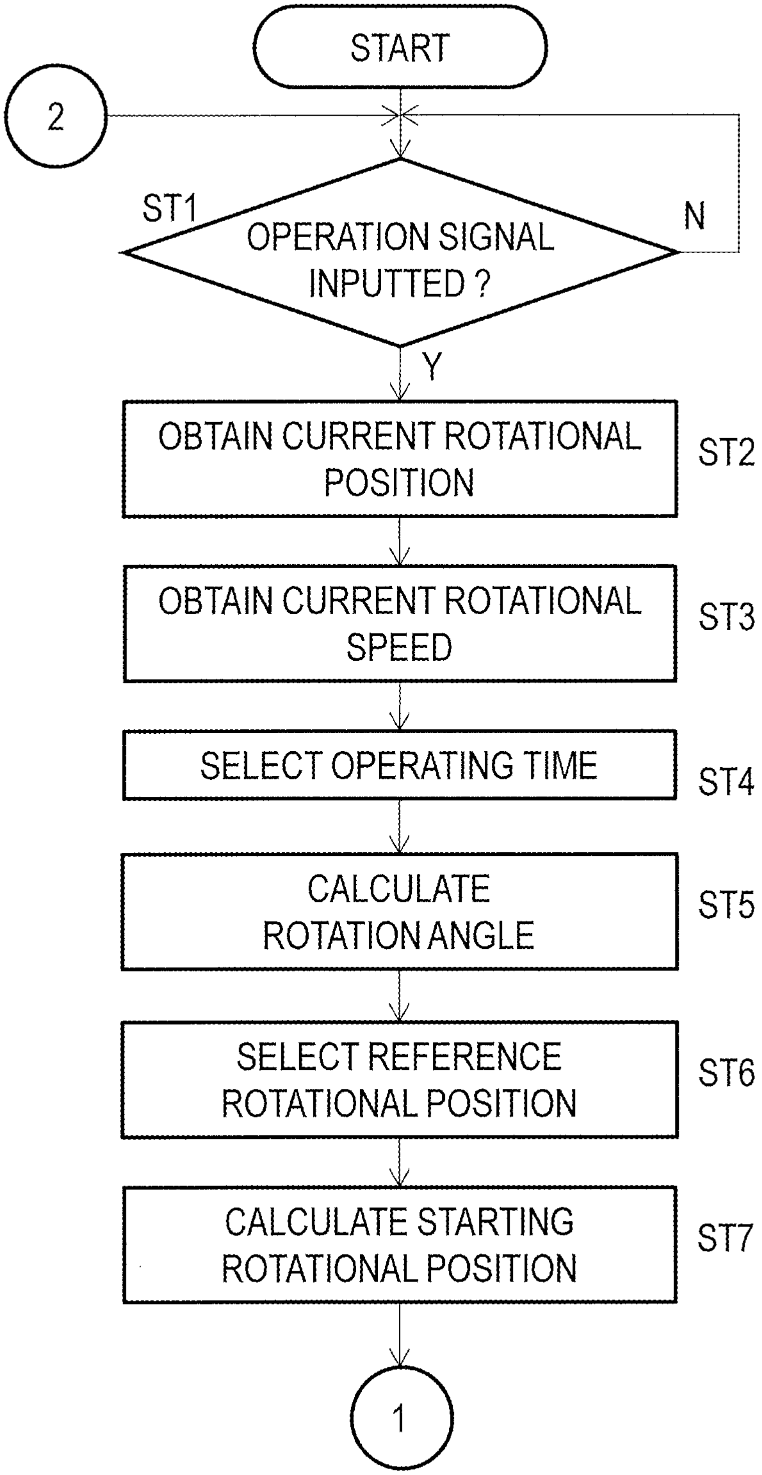
FIG. 32 is a flow chart showing an operation of the human-powered vehicle system illustrated in FIG. 1.

As seen in FIG. 32, in step ST1, it is determined by the electronic controller circuitry EC1 whether the operation signal SG31 or SG32 is inputted from the operating device 24 to the electronic controller circuitry EC1.

In step ST2, the current rotational position is obtained based on the detection result DR of rotational-position sensor unit 50 when the operation signal SG31 or SG32 is inputted from the operating device 24 to the human-powered vehicle controller 64 and is stored in the at least one memory EC12 as the current rotational position RP3.

In step ST3, the current rotational speed is obtained by the electronic controller circuitry EC1. For example, the latest value of the rotational speed stored in the at least one memory EC12 is used as the current rotational speed RS1.

In step ST4, the operating time T1 is selected by the electronic controller circuitry EC1 based on the current shift position stored in the at least one memory EC12 and the operation signal SG31 or SG32 inputted from the operating device 24. For example, in a case where the current shift positon is the shift position SP2 (FIG. 25) corresponding to the sprocket S2 and the operation signal SG31 or SG32 is the downshifting operation signal, the operating time TD2 (FIG. 22) is selected as the operating time T1 by the electronic controller circuitry EC1.

In step ST5, the rotation angle AG1 of the sprocket assembly RS for the operating time T1 is calculated by the electronic controller circuitry EC1 based on the formula (1), the current rotational speed RS1 obtained in step ST3, and the operating time T1 selected in step ST4. For example, when the current rotational speed RS1 is 360 [degree/sec] and the operating time TD2 is 0.0075 [sec], the rotation angle AG1 is calculated as shown in the following formula.

$$AG1 = T1 \times RS1 = 0.075 \times 360 = 27[\text{degree}]$$

In step ST6, the reference rotational position is selected by the electronic controller circuitry EC1 based on the current shift position stored in the at least one memory EC12 and the operation signal SG31 or SG32 inputted from the operating device 24. More specifically, the reference position group including at least one reference rotational position is selected by the electronic controller circuitry EC1 based on the current shift position stored in the at least one memory EC12 and the operation signal SG31 or SG32 inputted from the operating device 24. For example, the electronic controller circuitry EC1 selects a reference position group including the reference rotational positions PU21 to PU24 when the upshifting operation signal SG31 is inputted from the operating device 24 in a case where the current shift position is the shift position SP2 (FIG. 25) corresponding to the sprocket S2.

One of the reference rotational positions is selected as the selected reference rotational position RP1 by the electronic controller circuitry EC1 from the reference position group. In the present embodiment, the electronic controller circuitry EC1 is configured to select the reference rotational position which is closest to the current rotational position RP3 and disposed on a downstream side of the current rotational position RP3 from the reference position group. When the current rotational position RP3 of the sprocket assembly RS is a position shown in FIG. 33, for example, the reference rotational position PU24 is selected by the electronic controller circuitry EC1 from the reference rotational positions PU21 to PU24 of the sprocket S2.

As seen in FIG. 32, in step ST7, the starting rotational position RP2 is calculated by the electronic controller circuitry EC1 based on the rotation angle AG1, the selected reference rotational position RP1, and the formula (2). For example, when the rotation angle AG1 is 27 [degree/sec] and an angle of the selected reference rotational position RP1 is 230 [degree], the starting rotational position RP2 is calculated as shown in the following formula.

$$RP2 = RP1 - AG1 = 230 - 27 = 203[\text{degree}]$$

Figure 33:
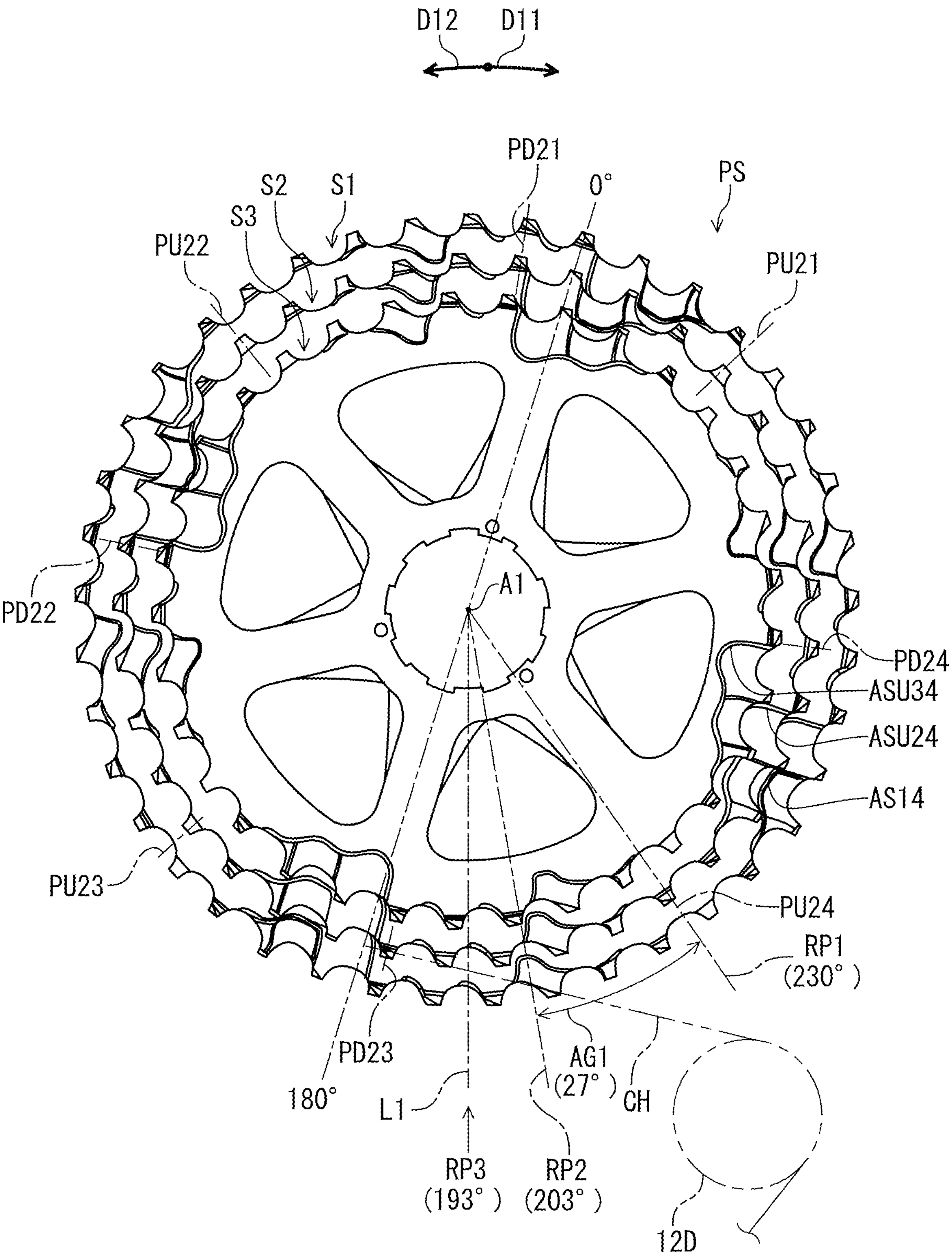
FIG. 33 is a side elevational view of the sprockets of the sprocket assembly illustrated in FIG. 9 for explaining relationship between a reference rotational position, a starting rotational position, and a current rotational position.
Figure 34:
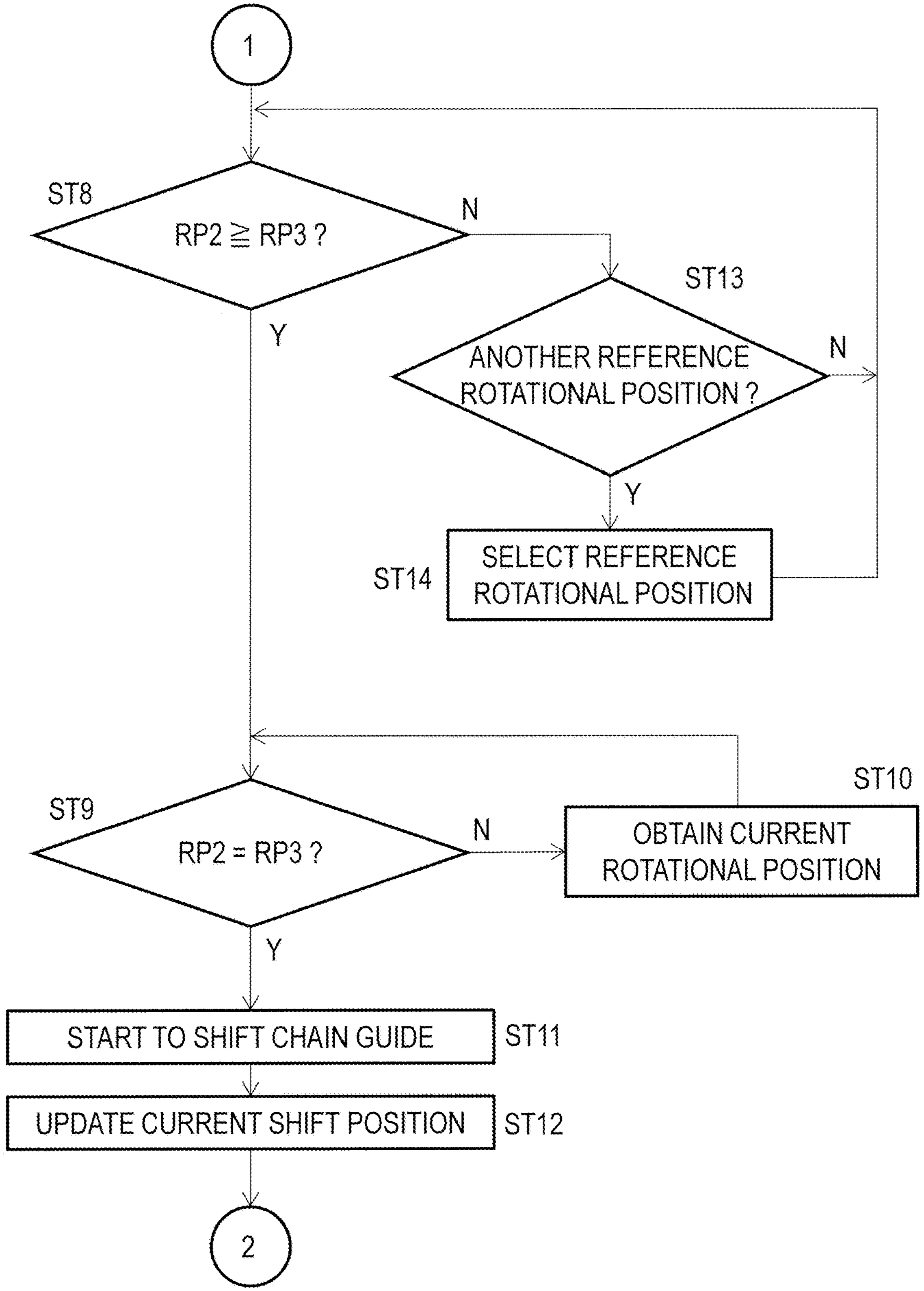
FIG. 34 is a flow chart showing an operation of the human-powered vehicle system illustrated in FIG. 1.

As seen in FIG. 34, in steps ST8 and ST9, it is determined by the electronic controller circuitry EC1 whether the starting rotational position RP2 is equal to or larger than the current rotational position RP3. As seen in FIG. 33, in a case where the starting rotational position RP2 is larger than the current rotational position RP3, the current rotational position RP3 is repeatedly obtained by the rotational-position sensor unit 50 until the current rotational position RP3 is equal to the starting rotational position RP2 (step ST10). Namely, the electronic controller circuitry EC1 controls the gear changer 12 to delay starting to shift the chain CH until the current rotational position RP3 is equal to the starting rotational position RP2.

Figure 35:
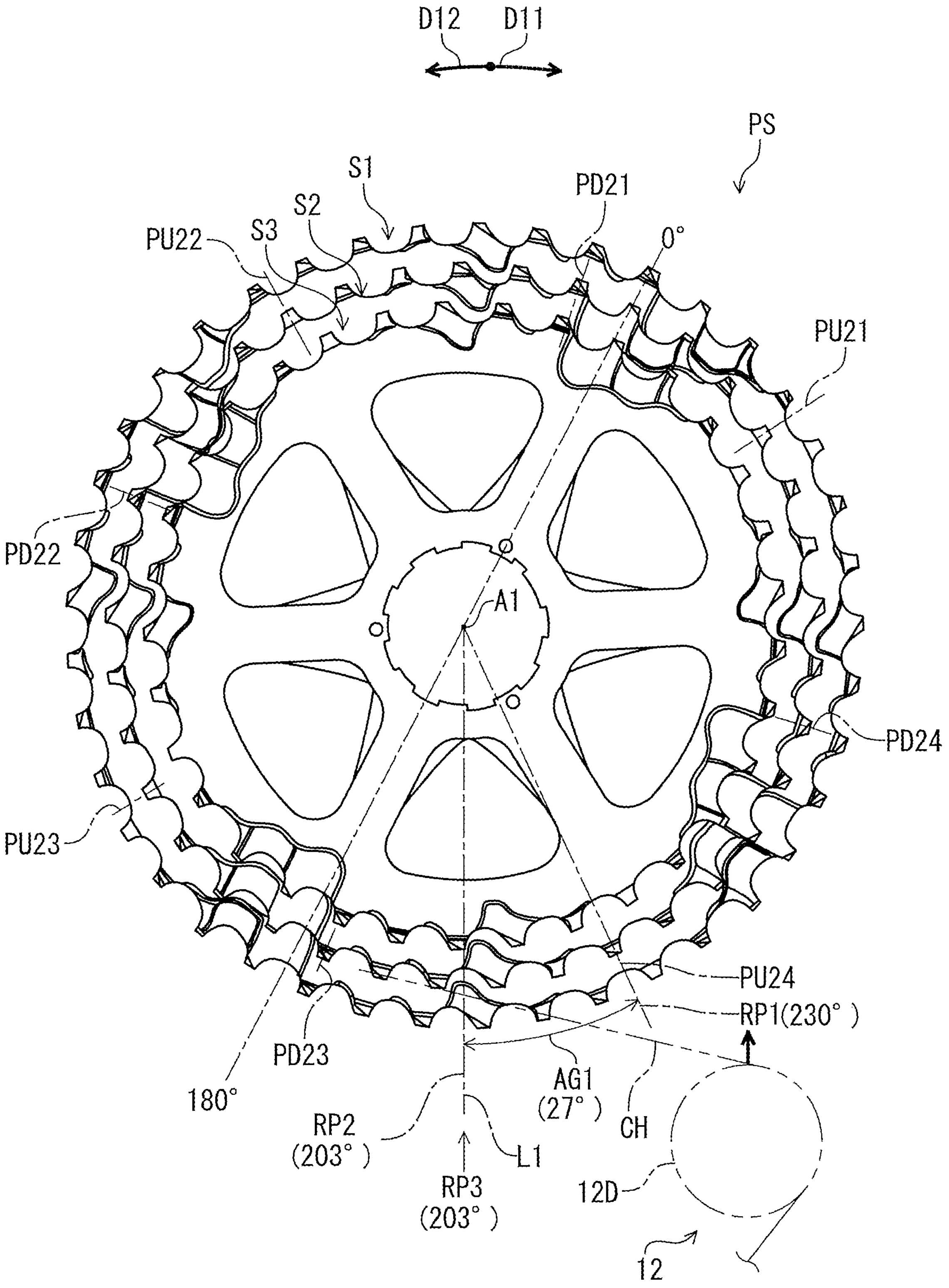
FIG. 35 is a side elevational view of the sprockets of the sprocket assembly illustrated in FIG. 9 for explaining relationship between the reference rotational position, the starting rotational position, and the current rotational position.
Figure 36:
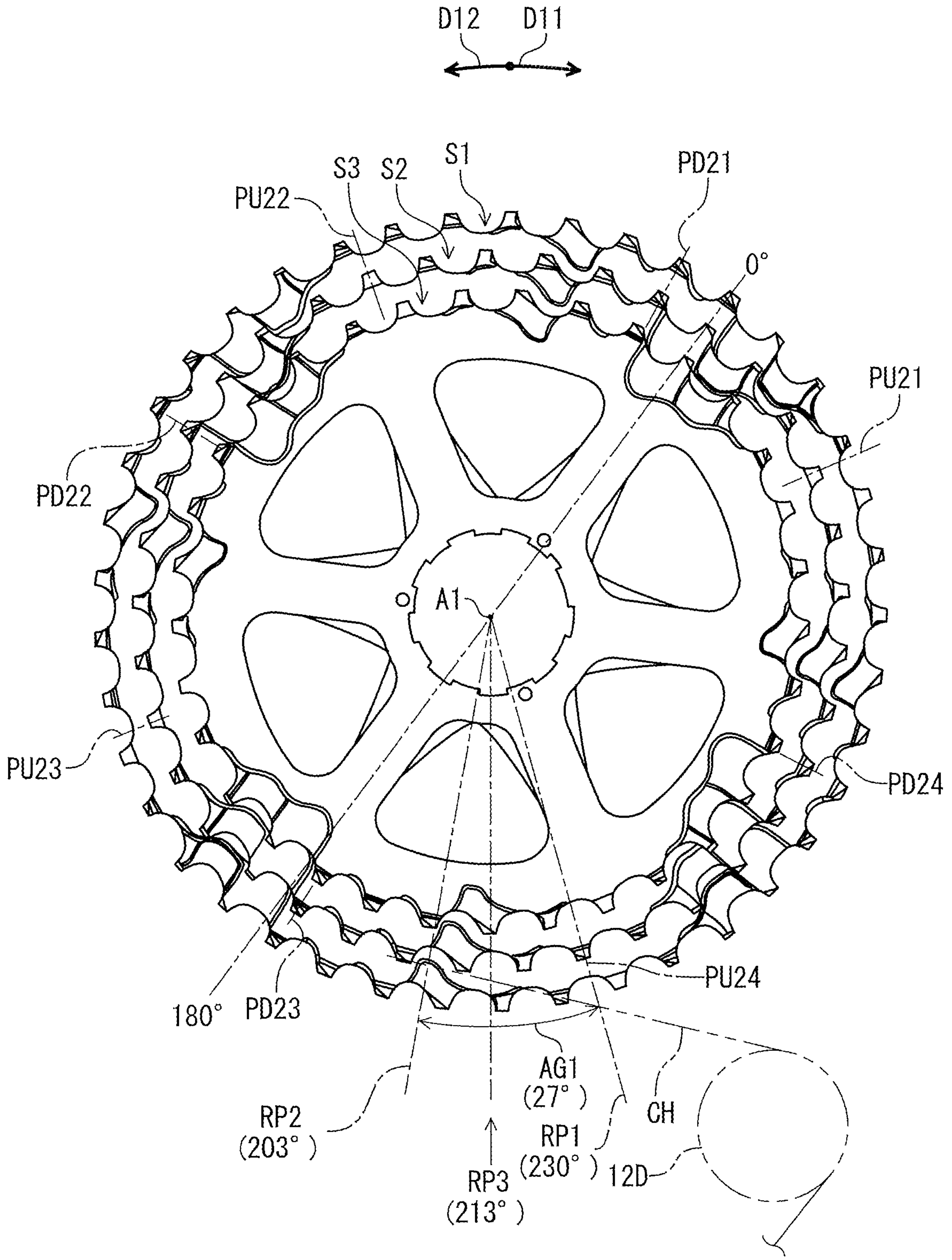
FIG. 36 is a side elevational view of the sprockets of the sprocket assembly illustrated in FIG. 9 for explaining relationship between the reference rotational position, the starting rotational position, and the current rotational position.

As seen in FIGS. 34 and 35, in a case where the starting rotational position RP2 is equal to the current rotational position RP3, the gear changer 12 is controlled by the electronic controller circuitry EC1 to start shifting the chain CH. More specifically, the gear changer 12 is controlled by the electronic controller circuitry EC1 to start to shift the chain guide 12D from the current shift position to the adjacent shift position (step ST11). Thus, the gear changer 12 completes shifting the chain guide 12D from the current shift position to the target shift position when or immediately before the sprocket assembly RS reaches the selected reference rotational position RP1 (FIG. 28). This can shorten time for which the chain CH slides with an axial surface of the sprocket, allowing the shifting of the bicycle chain to be smoother. In step ST12, the current shift position is updated by the electronic controller circuitry EC1, and the process returns to step ST1 (FIG. 32).

In step ST8 of FIG. 34, in a case where the starting rotational position RP2 is smaller than the current rotational position RP3 (FIG. 36), it is determined by the electronic controller circuitry EC1 whether another reference rotational position exists in the sprocket corresponding to the current shift position (step ST13). In a case where another reference rotational position exists, the reference rotational position arranged on a downstream side of the selected reference rotational position is newly selected from the reference position group as the selected reference rotational position (step ST14). For example, the electronic controller circuitry EC1 selects the reference rotational position PU21 arranged on a downstream side of the reference rotational position PU24. In a case where no other reference rotational position exists, step ST8 is repeated.

With the human-powered vehicle system 10, the electronic controller circuitry EC1 is configured to control the gear changer 12 based on the rotational position obtained by the rotational-position sensor unit 50. Accordingly, it is possible to adjust a timing at which the gear changer 12 shifts the chain CH based on the rotational position obtained by the rotational-position sensor unit 50. This allows the shifting of the chain CH to be smoother.

Figure 37:
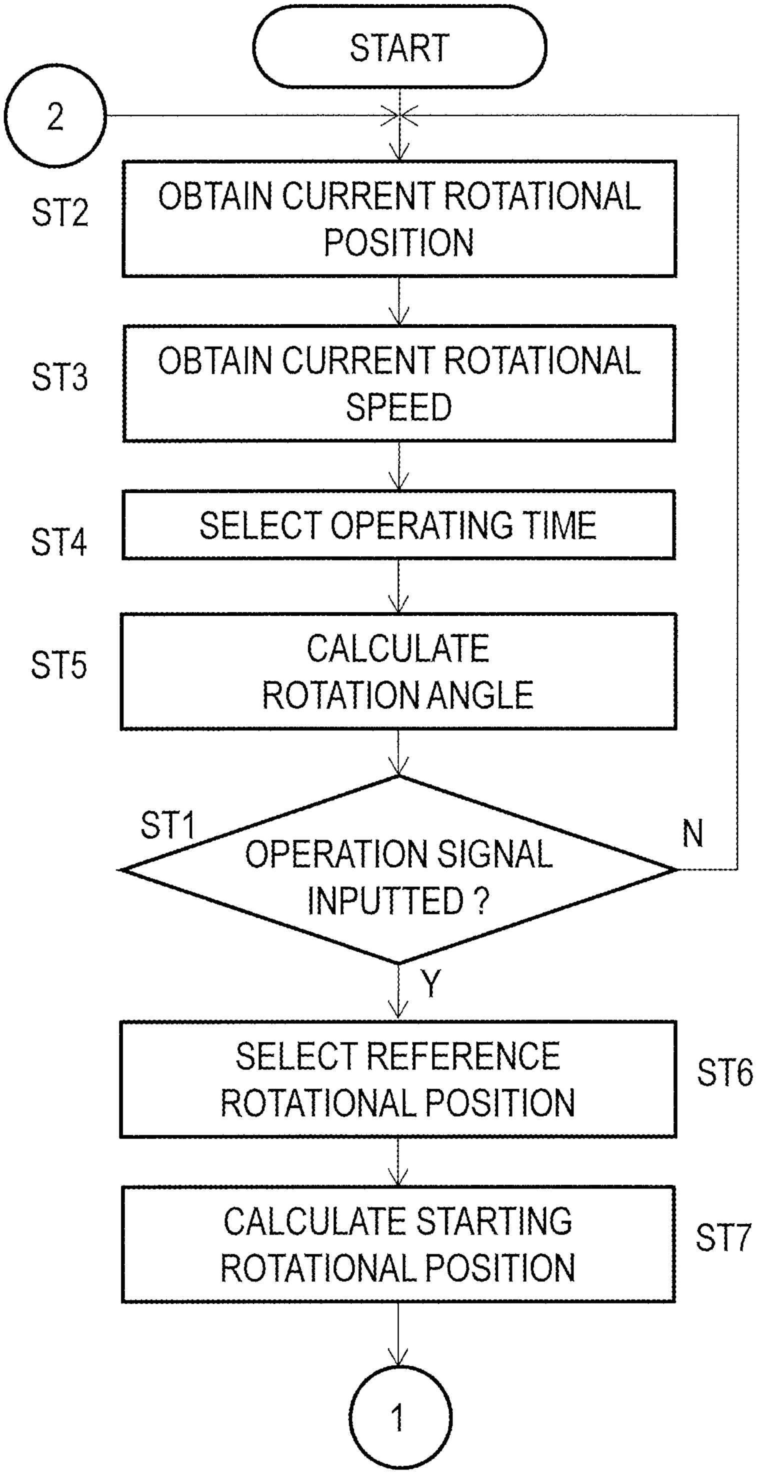
FIG. 37 is a flow chart showing an operation of the human-powered vehicle system in accordance with a first modification.

As seen in FIG. 37, step ST1 can be executed after one of steps ST2 to ST5. In this modification, steps ST2 to ST5 are repeatedly executed until the operation signal SG31 or SG32 is inputted.

Figure 38:
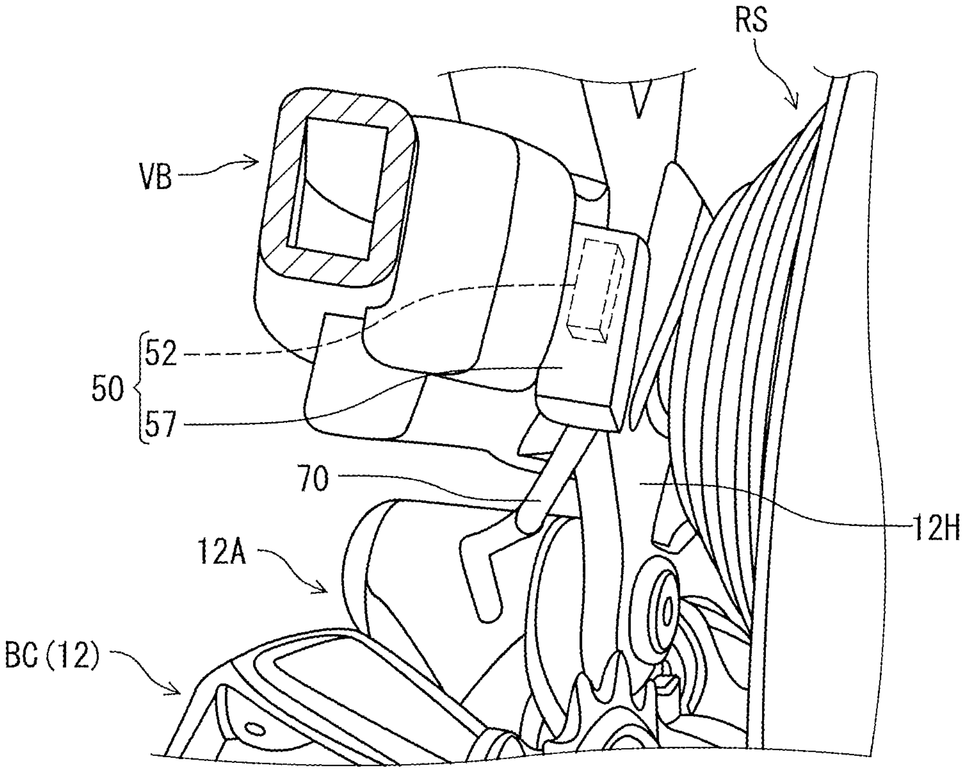
FIG. 38 is a partial perspective view of the human-powered vehicle in accordance with a second modification.

As seen in FIG. 18, the sensor housing 57 of the rotational-position sensor unit 50 is indirectly coupled to the vehicle body VB. As seen in FIG. 38, however, the sensor housing 57 can be configured to be directly mounted to the vehicle body VB. In the modification depicted in FIG. 38, the coupling member 58 is omitted from the rotational-position sensor unit 50.

Figure 39:
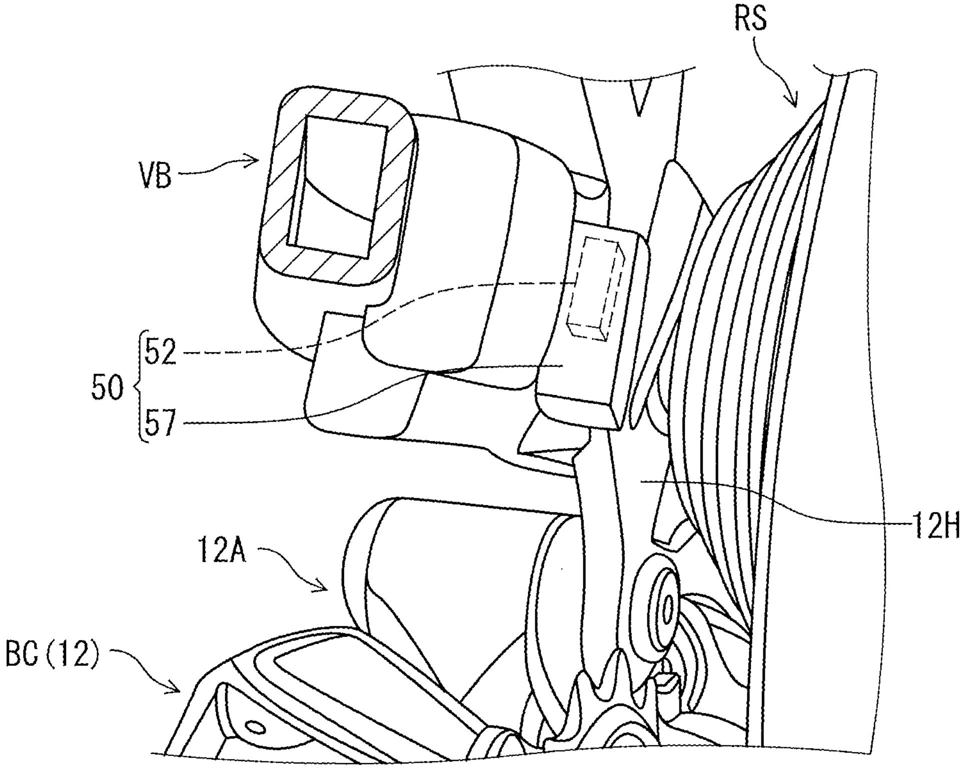
FIG. 39 is a partial perspective view of the human-powered vehicle in accordance with a third modification.
Figure 40:
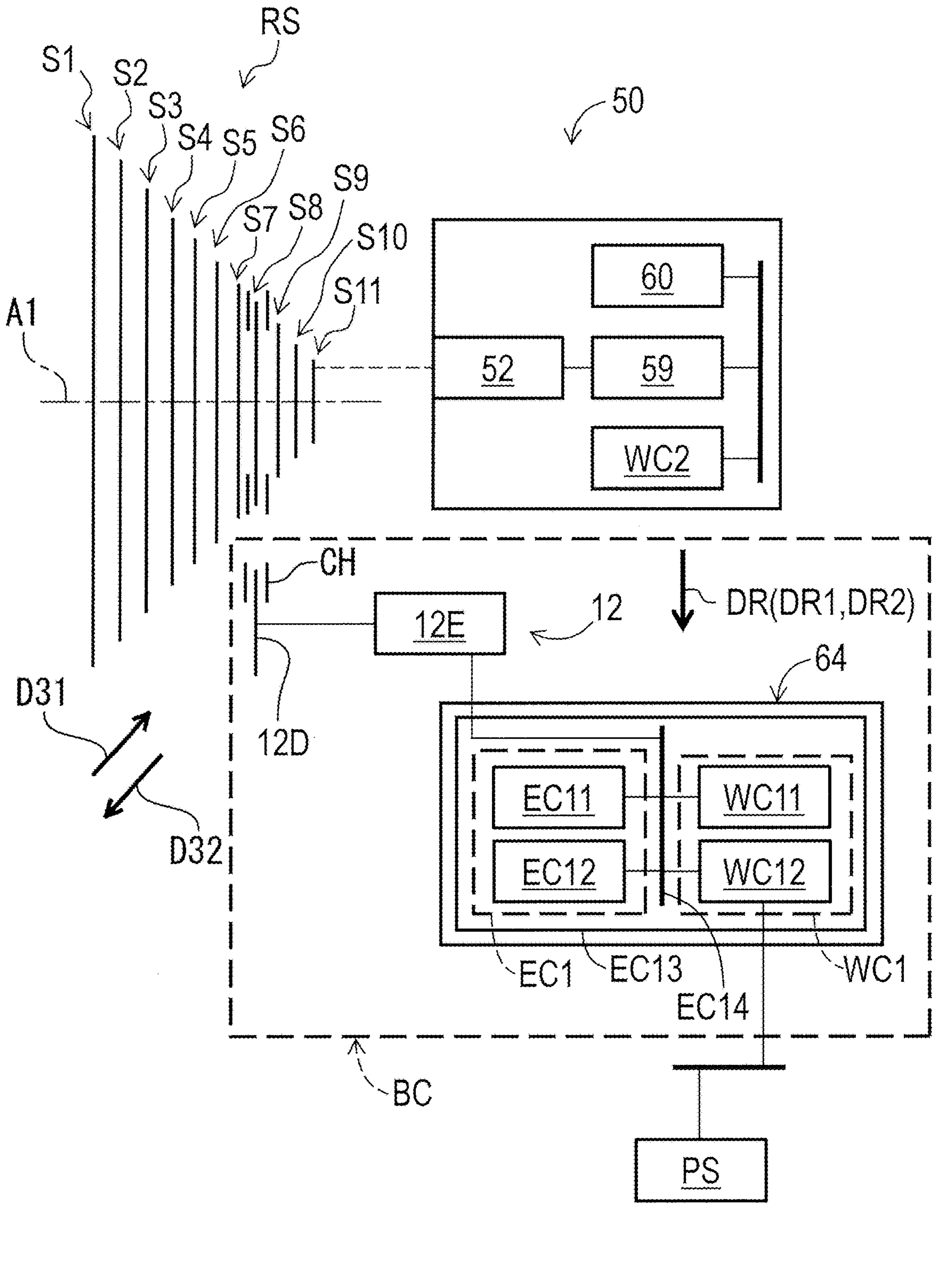
FIG. 40 is an example of a schematic block diagram of the human-powered vehicle system in accordance with the third modification.

As seen in FIGS. 39 and 40, the electric cable 70 can be omitted from the rotational-position sensor unit 50. In this modification, the rotational-position sensor unit 50 includes additional wireless communicator circuitry WC2 configured to wirelessly transmit the detection result DR to the human-powered vehicle controller 64 provided to the human-powered vehicle component BC (e.g., the gear changer 12). The additional wireless communicator circuitry WC2 has substantially the same structure as the structure of the wireless communicator circuitry WC11 of the human-powered vehicle controller 64.

Figure 41:
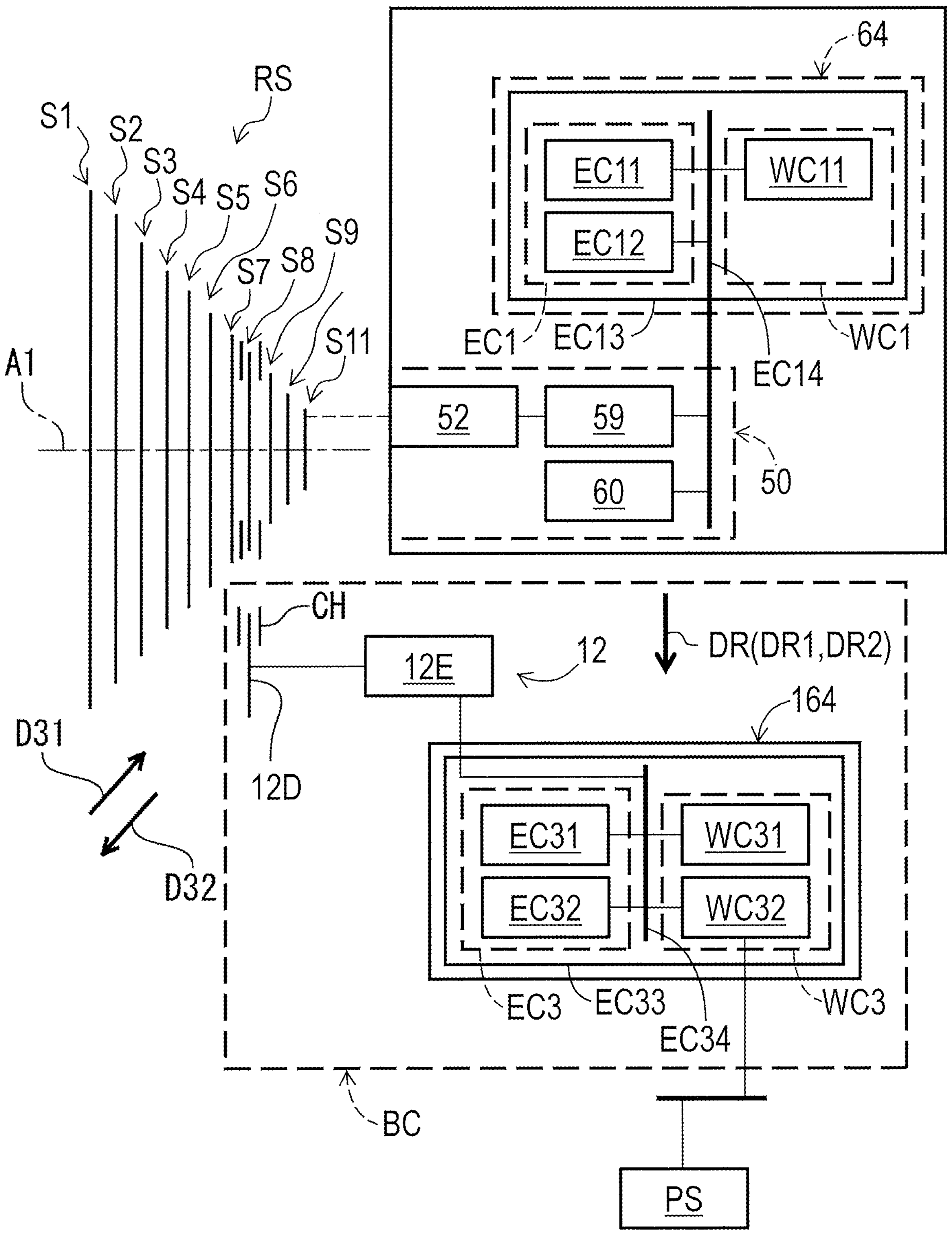
FIG. 41 is another example of the schematic block diagram of the human-powered vehicle system in accordance with the third modification.

As seen in FIG. 41, the human-powered vehicle controller 64 can be provided integrally with the rotational-position sensor unit 50. For example, the human-powered vehicle controller 64 is at least partially provided in the sensor housing 57. In this modification, the wired communicator circuitry WC12 is omitted from the communicator circuitry WC1. The human-powered vehicle component BC includes an additional human-powered vehicle controller 164. The additional human-powered vehicle controller 164 includes additional electronic controller circuitry EC3 and additional communicator circuitry WC3. The additional electronic controller circuitry EC3 has substantially the same structure as the structure of the electronic controller circuitry EC1 of the human-powered vehicle controller 64. The additional communicator circuitry WC3 has substantially the same structure as the structure of the communicator circuitry WC1 of the human-powered vehicle controller 64. The additional electronic controller circuitry EC3 includes at least one processor EC31 and at least one memory EC32. The additional human-powered vehicle controller 164 includes at least one circuit board EC33 and at least one system bus EC34. The additional communicator circuitry WC3 includes additional wireless communicator circuitry WC31 and additional wired communicator circuitry WC32. The additional wireless communicator circuitry WC31 has substantially the same structure as the structure of the wireless communicator circuitry WC11. The additional wired communicator circuitry WC32 has substantially the same structure as the structure of the wired communicator circuitry WC12.

Figure 42:
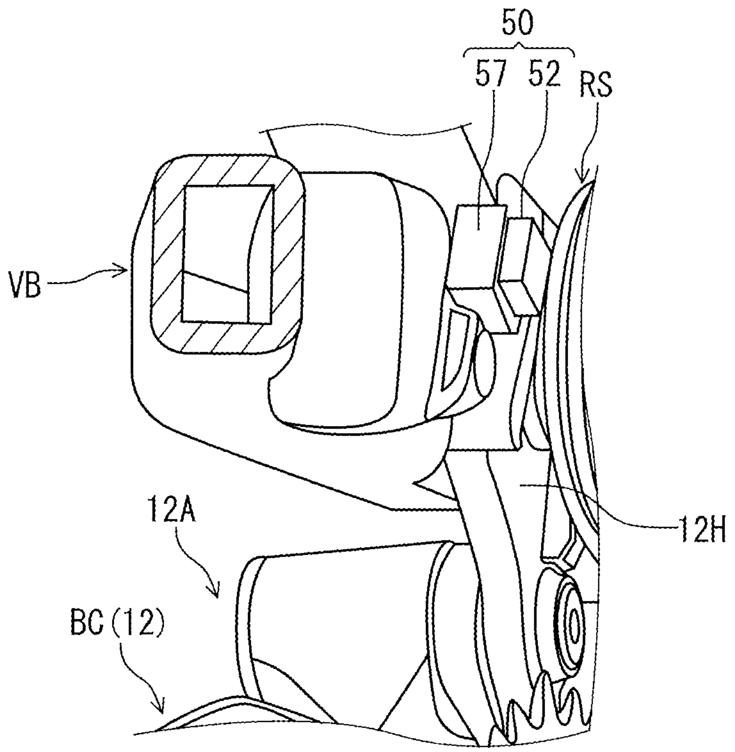
FIG. 42 is a partial perspective view of the human-powered vehicle in accordance with a fourth modification.
Figure 43:
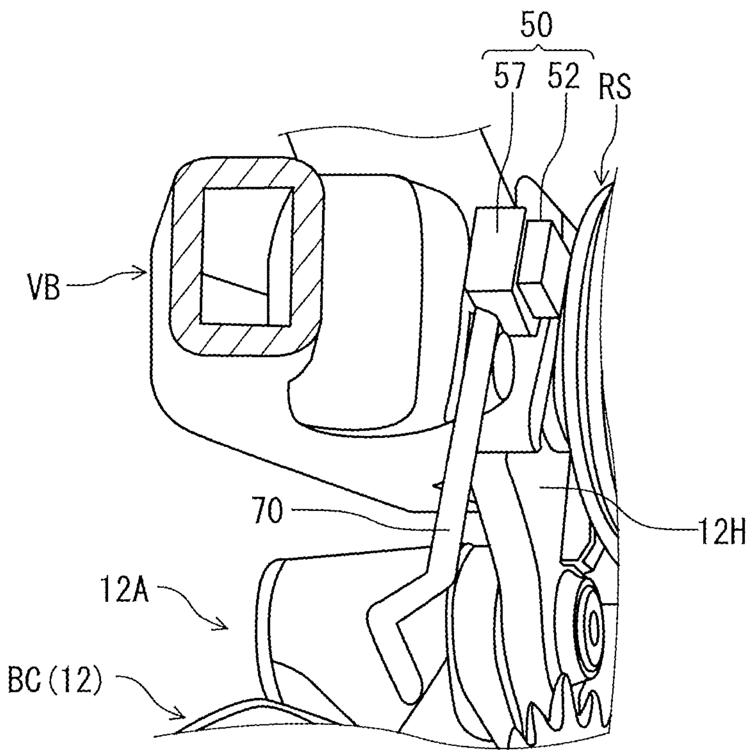
FIG. 43 is a partial perspective view of the human-powered vehicle in accordance with a fifth modification.

As seen in FIG. 42, the rotational-position sensor unit 50 can be directly mounted to a hanger member 12H of the gear changer 12. The hanger member 12H is configured to couple the base member 12A and the vehicle body VB. In the modification illustrated in FIG. 42, the rotational-position sensor unit 50 can include the additional wireless communicator circuitry WC2 depicted in FIG. 40 or the additional human-powered vehicle controller 164 depicted in FIG. 41. As seen in FIG. 43, the rotational-position sensor unit 50 can be electrically connected to the human-powered vehicle controller 64 via the electric cable 70 as with the modification depicted in FIG. 38.

Figure 44:
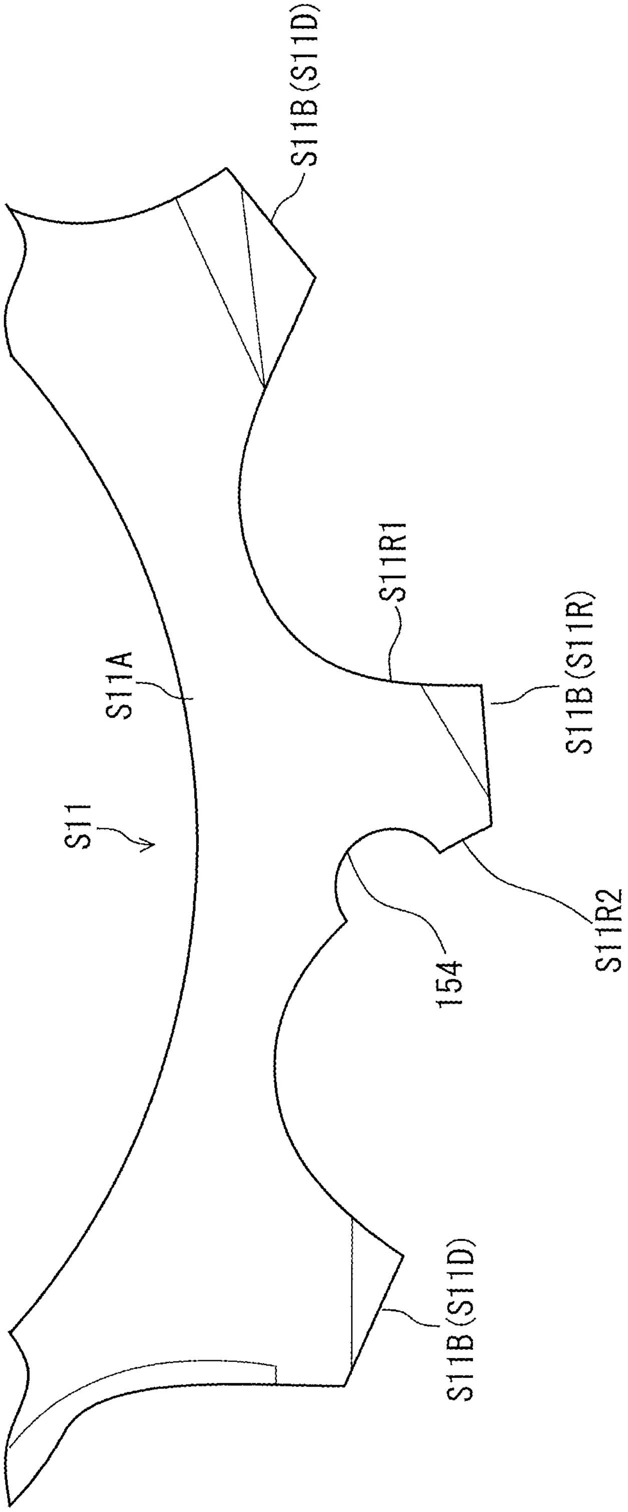
FIG. 44 is a partial side elevational view of the sprocket in accordance with a sixth modification.
Figure 45:
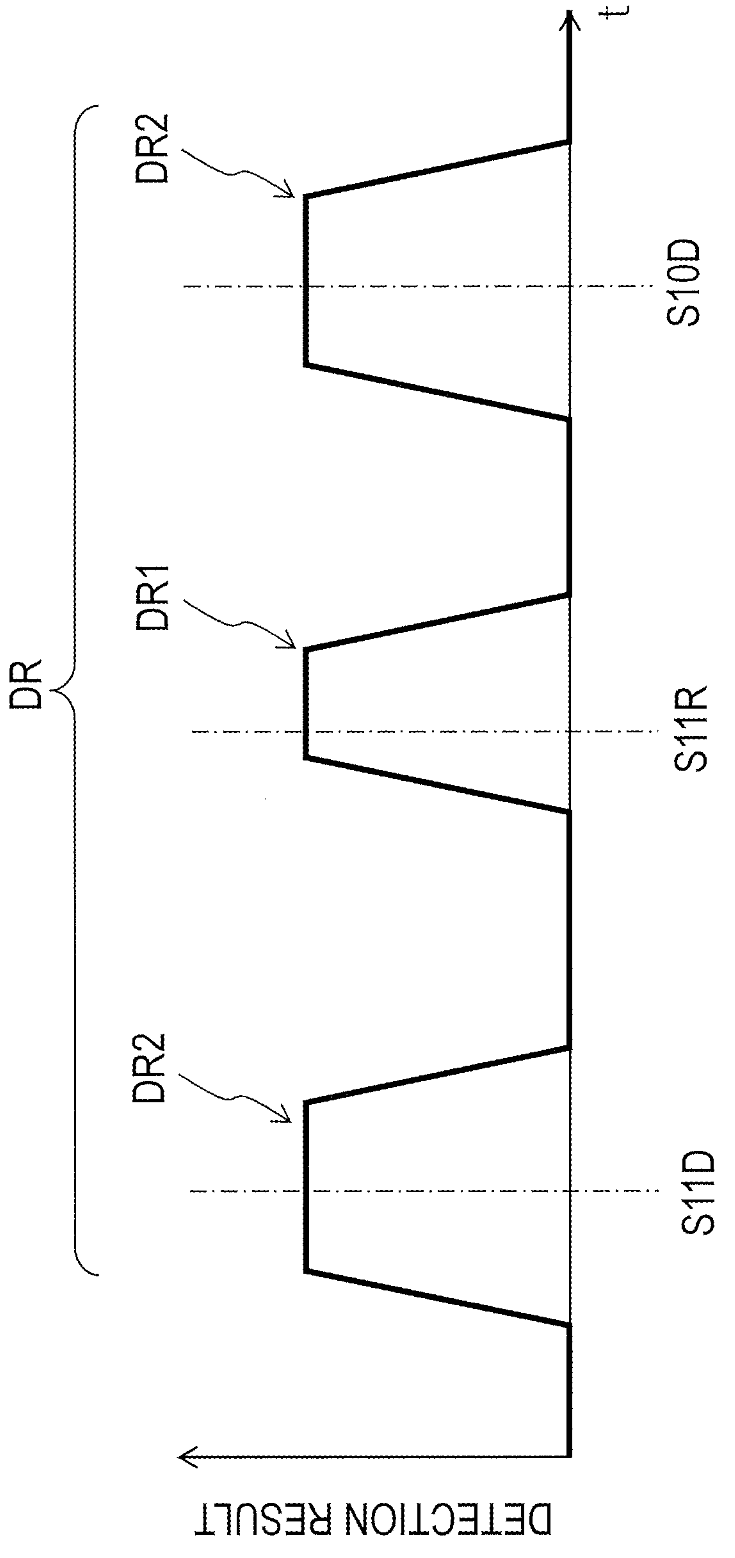
FIG. 45 shows a detection result of the rotational-position sensor unit of the human-powered vehicle system in a case where the sprocket has the structure depicted in FIG. 44.

As seen in FIG. 44, the reference sprocket tooth S11R can have another shape other than the shape depicted in FIG. 16. In the modification depicted in FIG. 44, the reference sprocket tooth S11R includes an opening 154. The first character of the reference sprocket tooth S11R includes the opening 154 so that the first character is different from the second character of the at least one sprocket tooth S11D. The reference portion of the sprocket S11 includes the opening 154. The sensor circuitry 52 is configured to detect a reference shape of a reference portion of at least one of the sprocket S11 and the lock member 28. The reference shape of the reference portion is different from a shape of another portion of the at least one of the sprocket S11 and the lock member 28. The reference sprocket tooth S11R includes a driving surface S11R1 and a non-driving surface S11R2. The driving surface S11R1 is configured to be in contact with a roller of the chain CH during pedaling to receive the pedaling force from the chain CH. The non-driving surface S11R2 is provided on an opposite side of the driving surface S11R1. The opening 154 is provided on the non-driving surface S11R2. In this modification, as seen in FIG. 45, the first detection result DR1 has the waveform different from the waveform of the second detection result DR2.

Figure 46:
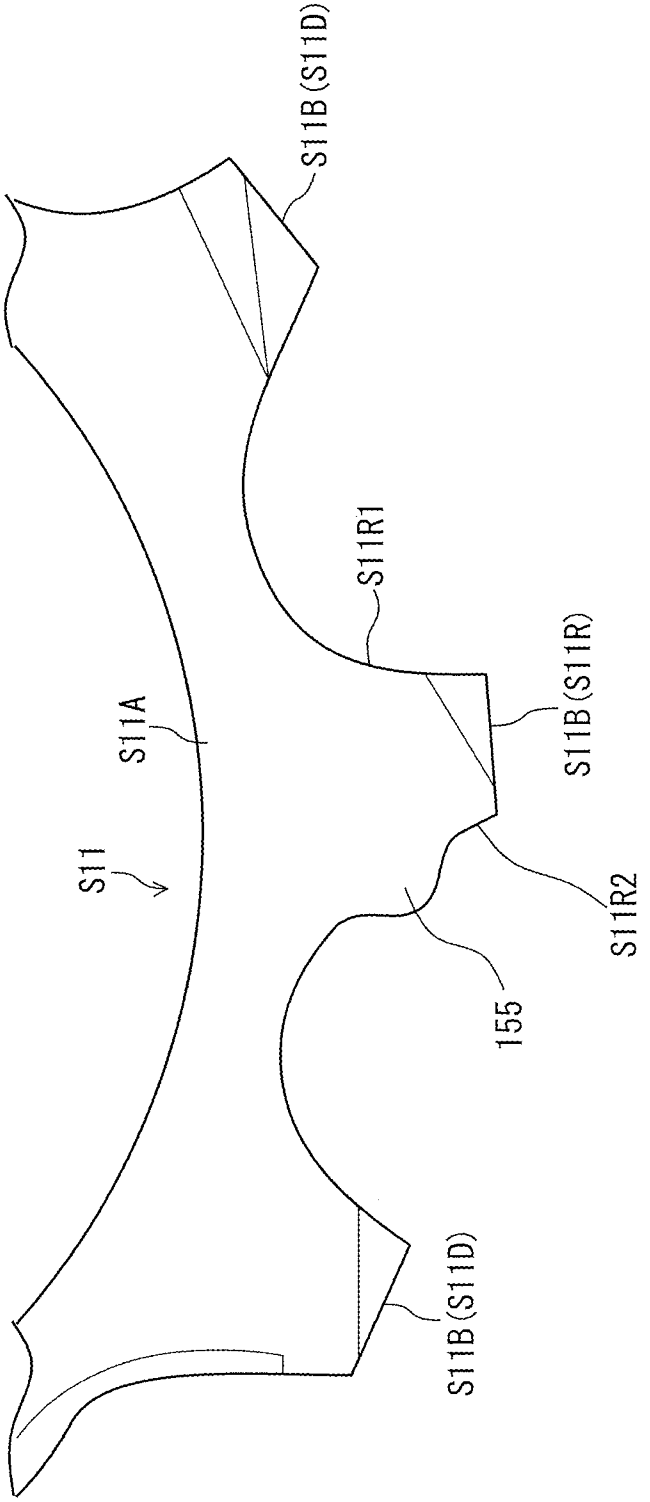
FIG. 46 is a partial side elevational view of the sprocket in accordance with a seventh modification.
Figure 47:
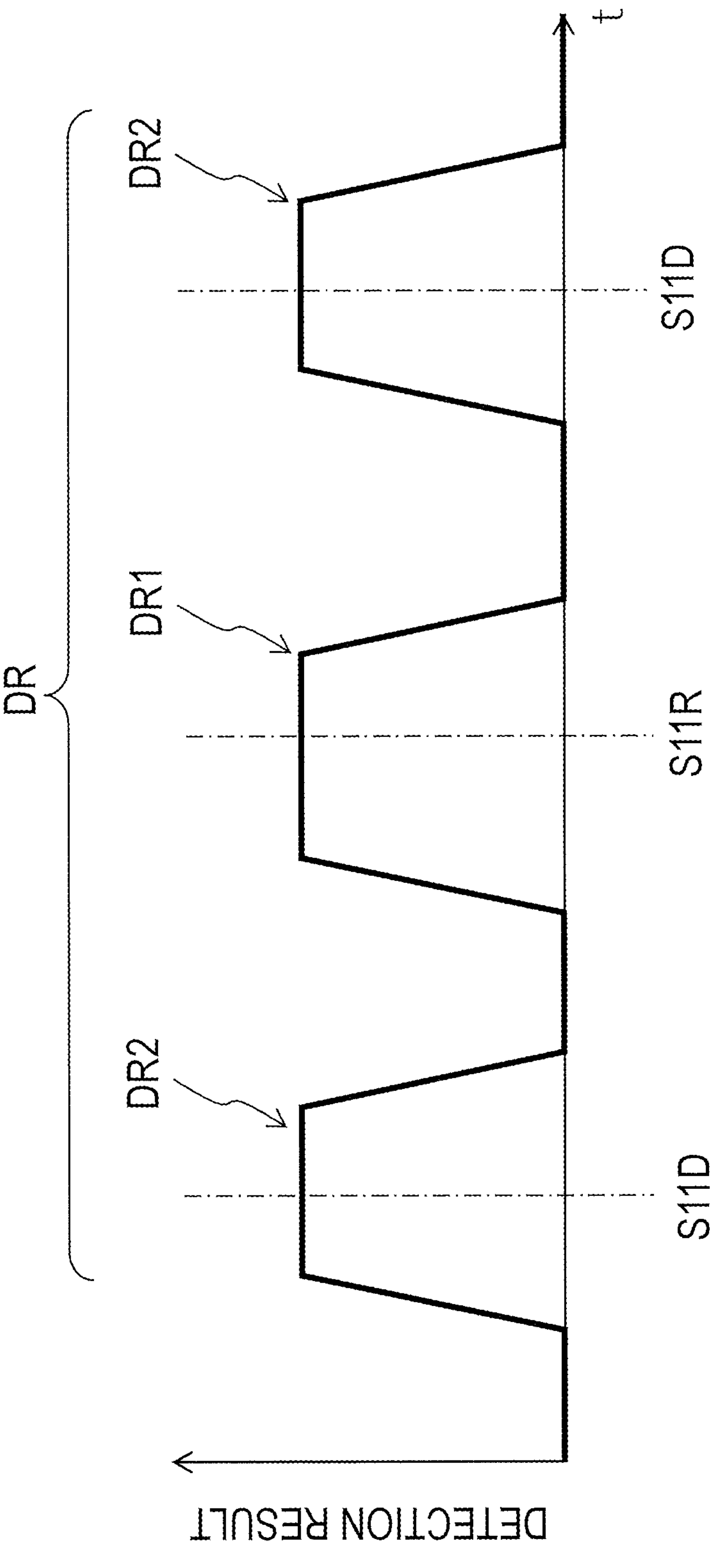
FIG. 47 shows a detection result of the rotational-position sensor unit of the human-powered vehicle system in a case where the sprocket has the structure depicted in FIG. 46.

In the modification depicted in FIG. 46, the reference sprocket tooth S11R includes a protrusion 155. The protrusion 155 is provided on the non-driving surface S11R2. The first character of the reference sprocket tooth S11R includes the protrusion 155 so that the first character is different from the second character of the at least one sprocket tooth S11D. The reference portion of the sprocket S11 includes the protrusion 155. The sensor circuitry 52 is configured to detect a reference shape of a reference portion of at least one of the sprocket S11 and the lock member 28. The reference shape of the reference portion is different from a shape of another portion of the at least one of the sprocket S11 and the lock member 28. In this modification, as seen in FIG. 47, the first detection result DR1 has the waveform different from the waveform of the second detection result DR2.

Figure 48:
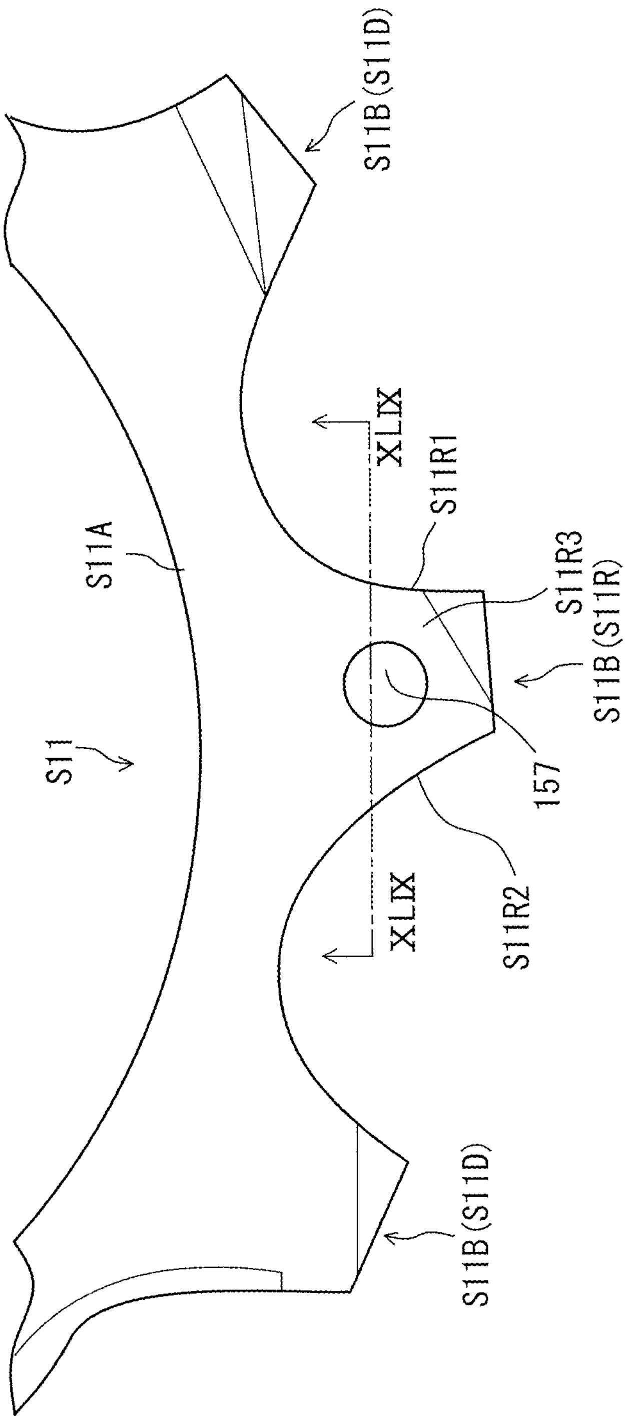
FIG. 48 is a partial side elevational view of the sprocket in accordance with an eighth modification.
Figure 49:
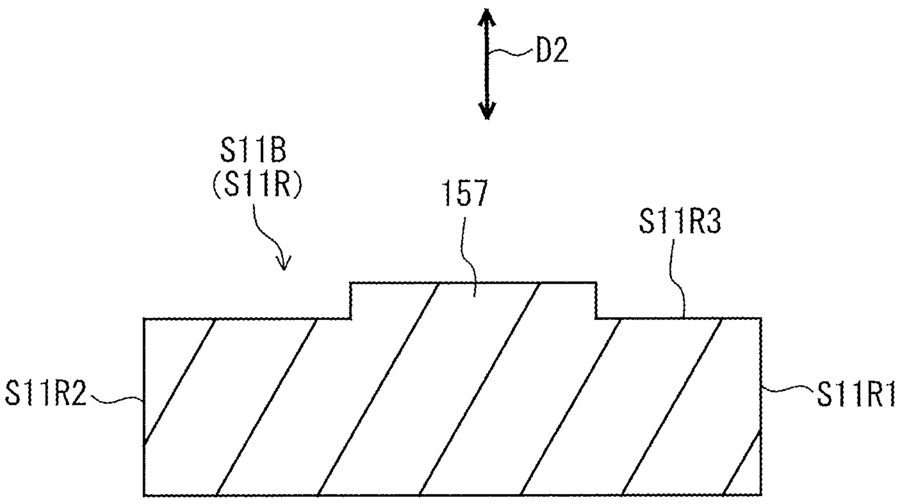
FIG. 49 is a cross-sectional view of the sprocket taken along line XLIX-XLIX of FIG. 48.
Figure 50:
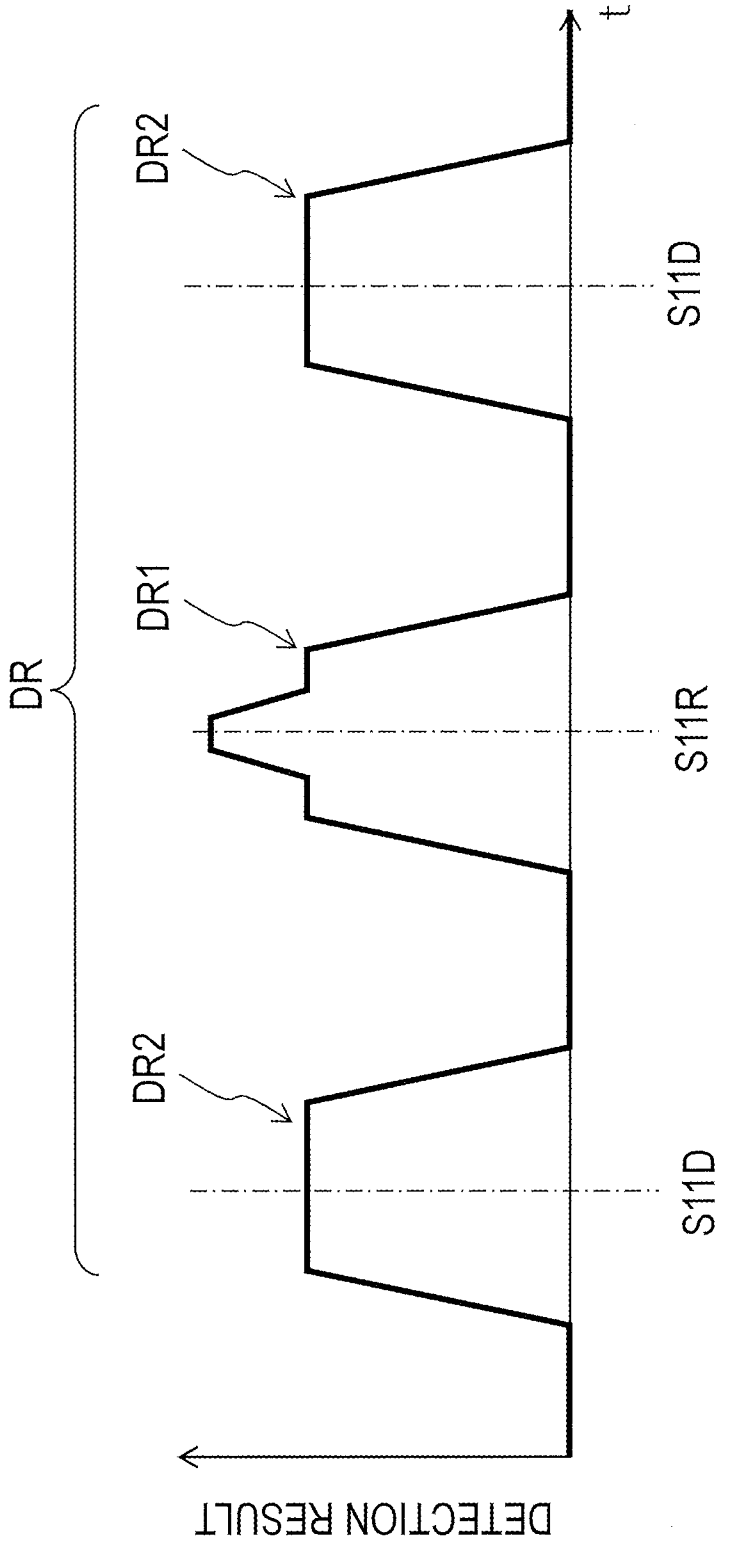
FIG. 50 shows a detection result of the rotational-position sensor unit of the human-powered vehicle system in a case where the sprocket has the structure depicted in FIG. 48.

In the modification depicted in FIGS. 48 and 49, the reference sprocket tooth S11R includes a protrusion 157. The protrusion 157 is provided between the driving surface S11R1 and the non-driving surface S11R2. The protrusion 157 is provided on a surface S11R3 in the axial direction D2. The first character of the reference sprocket tooth S11R includes the protrusion 157 so that the first character is different from the second character of the at least one sprocket tooth S11D. The reference portion of the sprocket S11 includes the protrusion 157. The sensor circuitry 52 is configured to detect a reference shape of a reference portion of at least one of the sprocket S11 and the lock member 28. The reference shape of the reference portion is different from a shape of another portion of the at least one of the sprocket S11 and the lock member 28. In this modification, as seen in FIG. 50, the first detection result DR1 has the waveform different from the waveform of the second detection result DR2.

Figure 51:
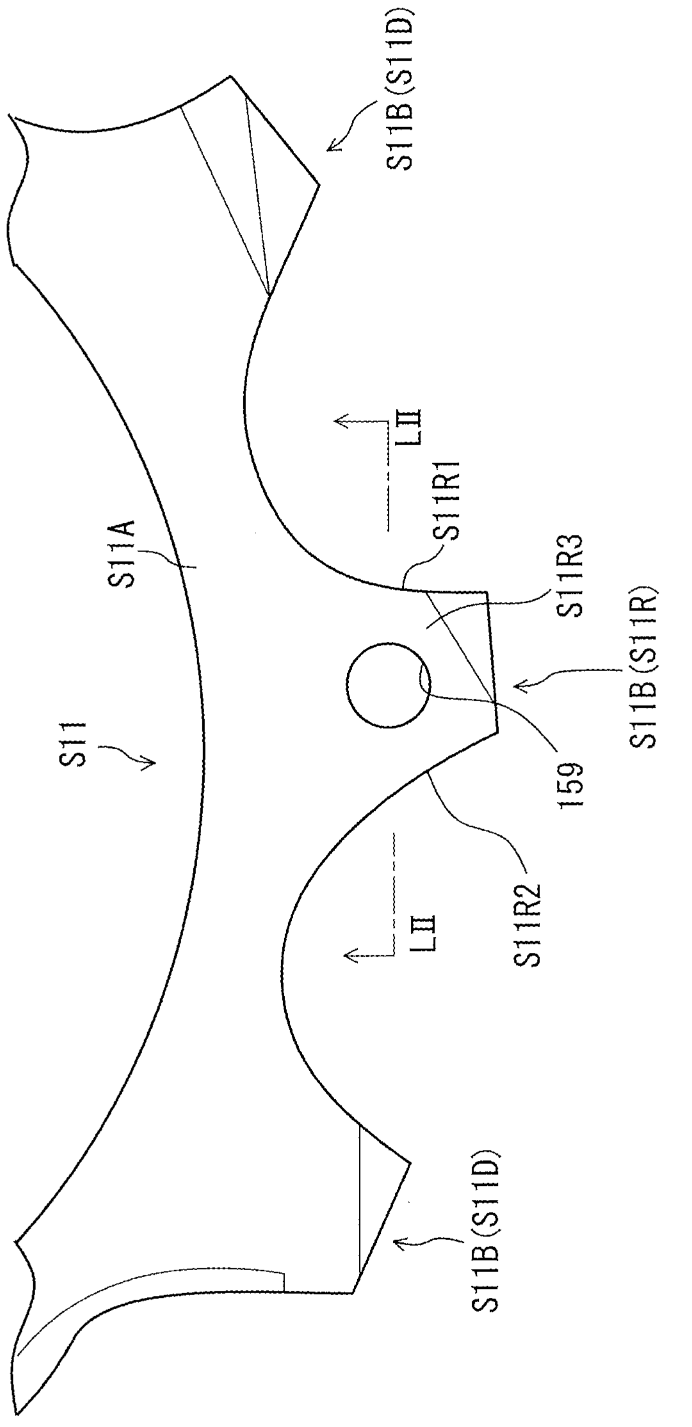
FIG. 51 is a partial side elevational view of the sprocket in accordance with a ninth modification.
Figure 52:
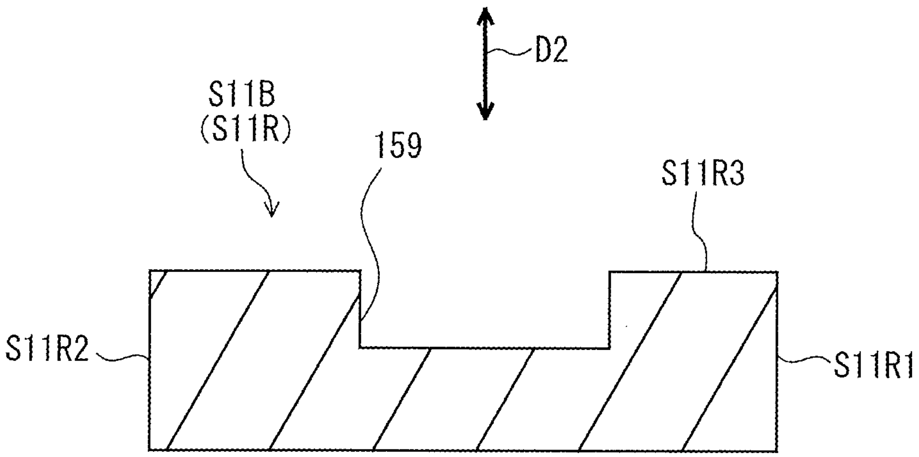
FIG. 52 is a cross-sectional view of the sprocket taken along line LII-LII of FIG. 51.
Figure 53:
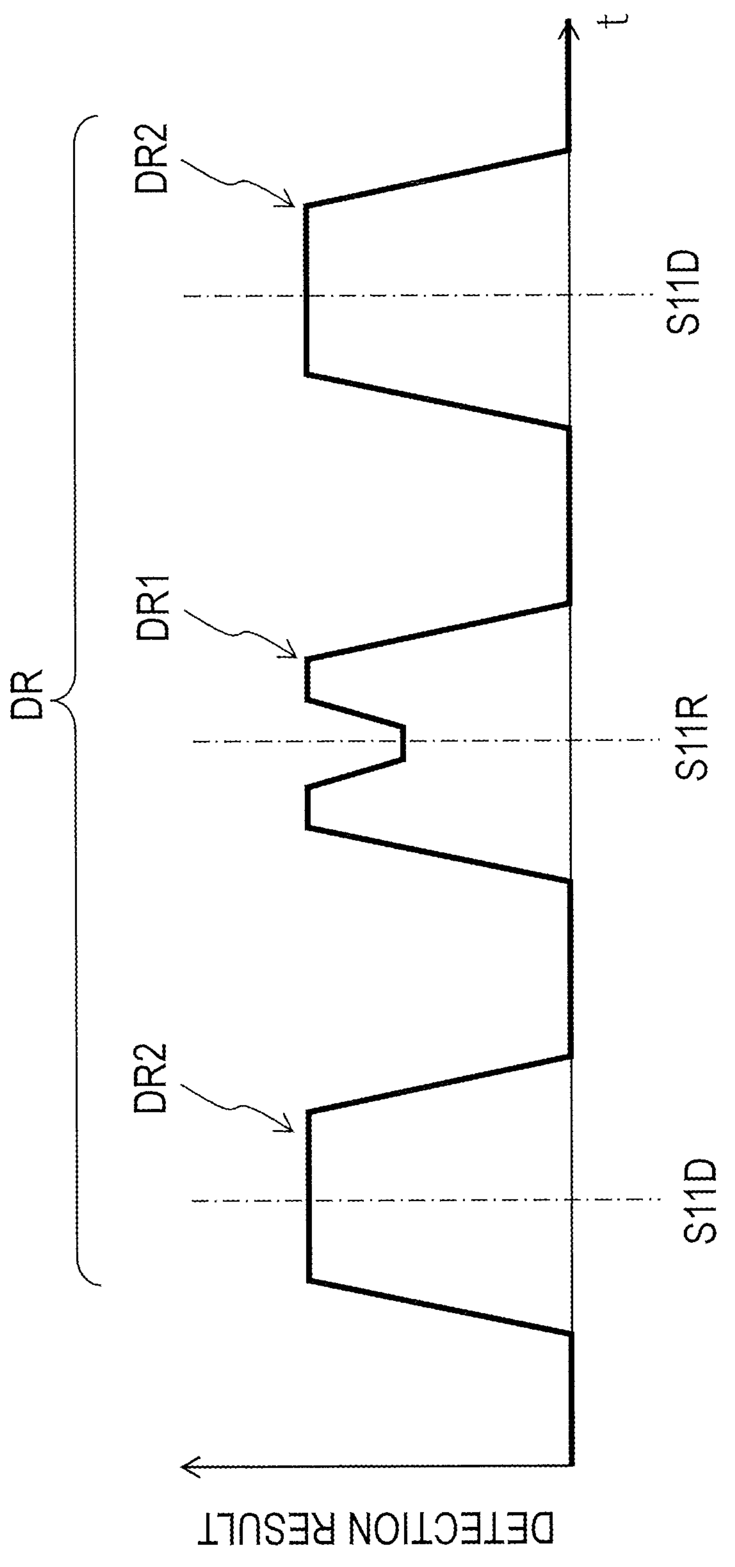
FIG. 53 shows a detection result of the rotational-position sensor unit of the human-powered vehicle system in a case where the sprocket has the structure depicted in FIG. 51.

In the modification depicted in FIGS. 51 and 52, the reference sprocket tooth S11R includes a recess 159. The recess 159 is provided between the driving surface S11R1 and the non-driving surface S11R2. The recess 159 is provided on the surface S11R3 in the axial direction D2. The first member 56 can be provided in the recess 159. The first character of the reference sprocket tooth S11R includes the recess 159 so that the first character is different from the second character of the at least one sprocket tooth S11D. The reference portion of the sprocket S11 includes the recess 159. The sensor circuitry 52 is configured to detect a reference shape of a reference portion of at least one of the sprocket S11 and the lock member 28. The reference shape of the reference portion is different from a shape of another portion of the at least one of the sprocket S11 and the lock member 28. In this modification, as seen in FIG. 53, the first detection result DR1 has the waveform different from the waveform of the second detection result DR2.

Figure 54:
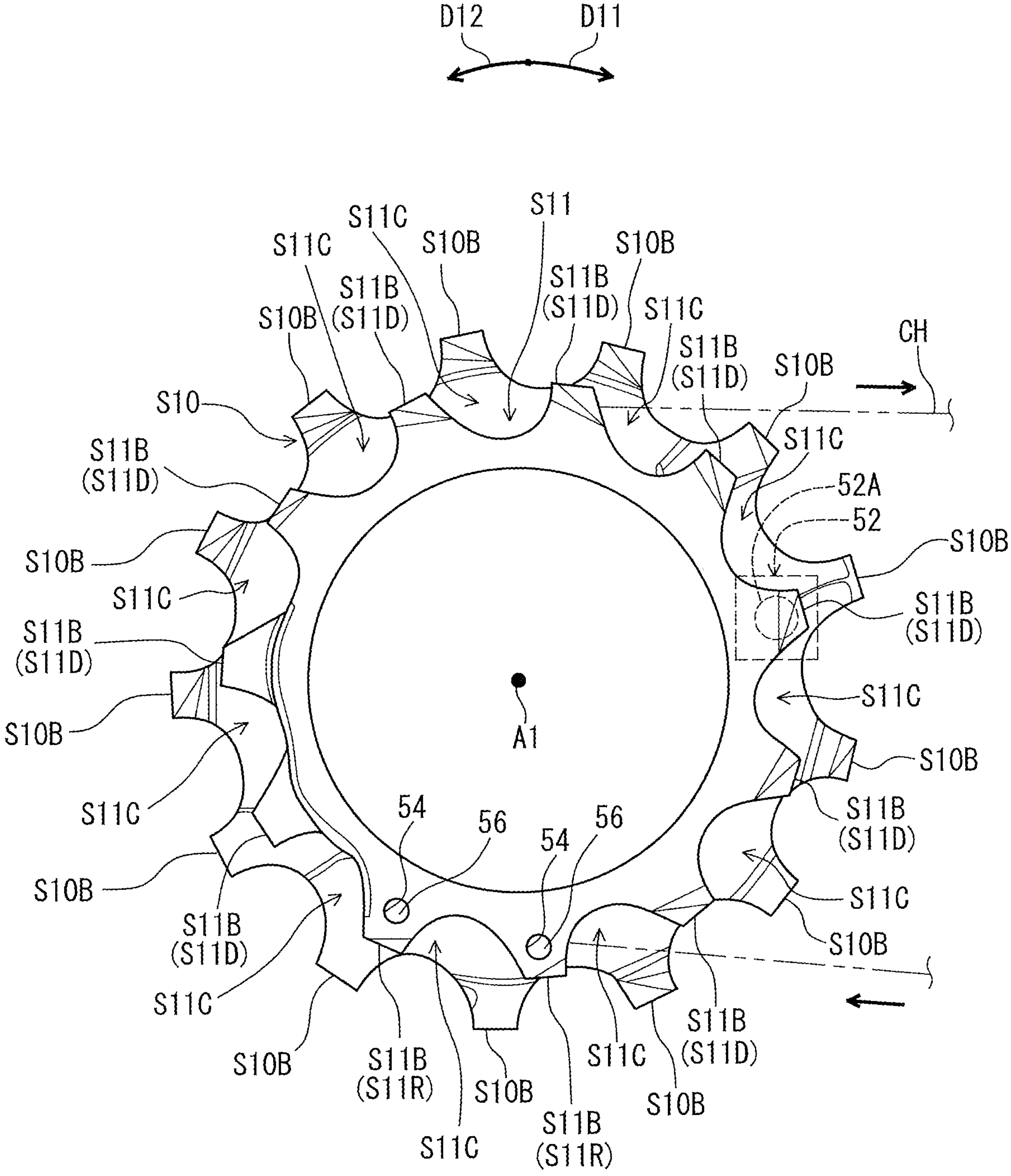
FIG. 54 is a side elevational view of sprockets of a sprocket assembly in accordance with a tenth modification.
Figure 55:
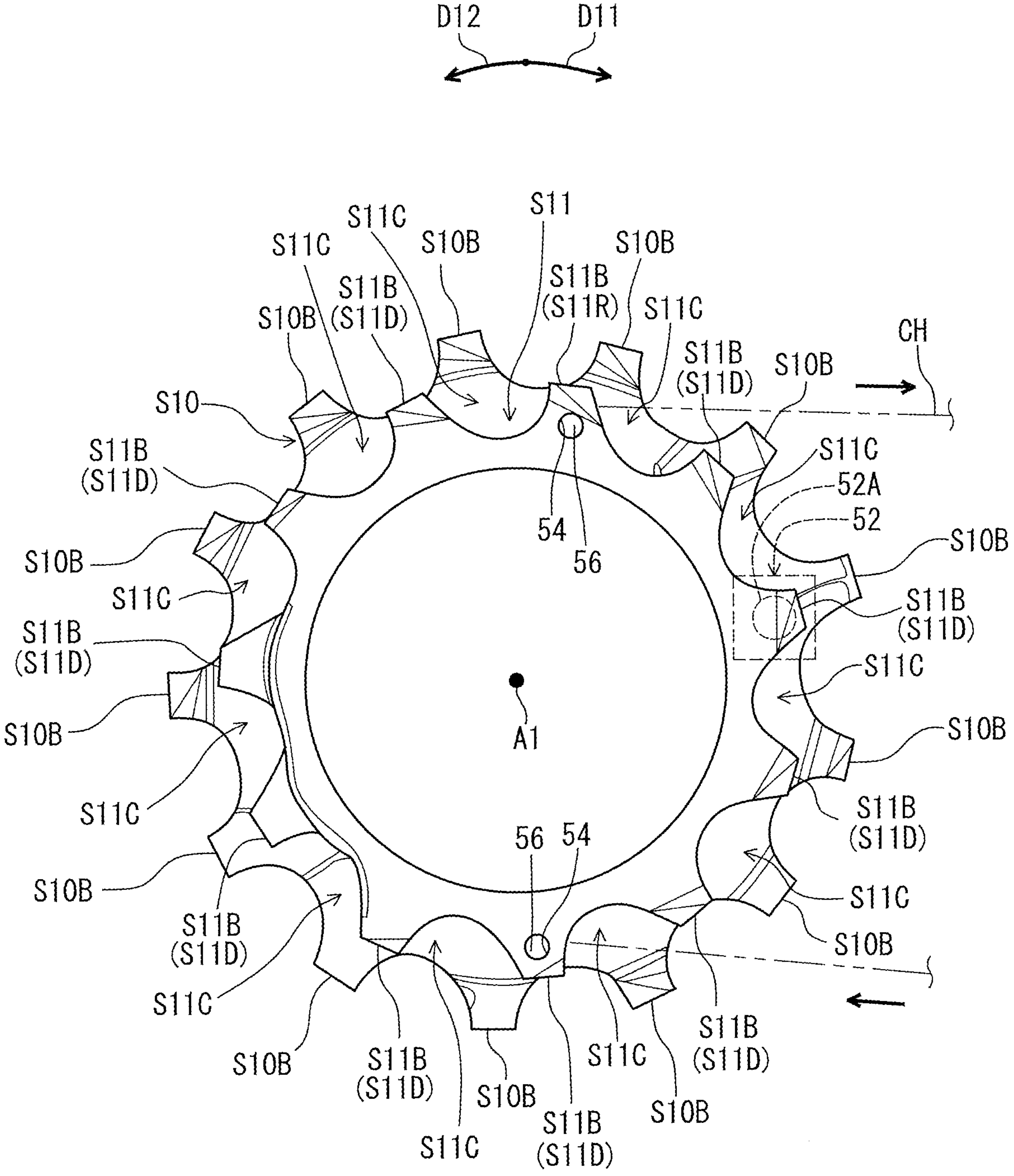
FIG. 55 is a side elevational view of sprockets of a sprocket assembly in accordance with an eleventh modification.

As seen in FIG. 54 or 54, the at least one reference sprocket tooth S11R includes at least two reference sprocket teeth S11R of the sprocket S11. The sensor circuitry 52 is configured to detect the at least two reference sprocket teeth S11R. As seen in FIG. 54, the at least two reference sprocket teeth S11R can be adjacent to each other without another sprocket tooth therebetween. As seen in FIG. 55, the at least two reference sprocket teeth S11R can be provided apart from each other with another sprocket tooth therebetween.

Figure 56:
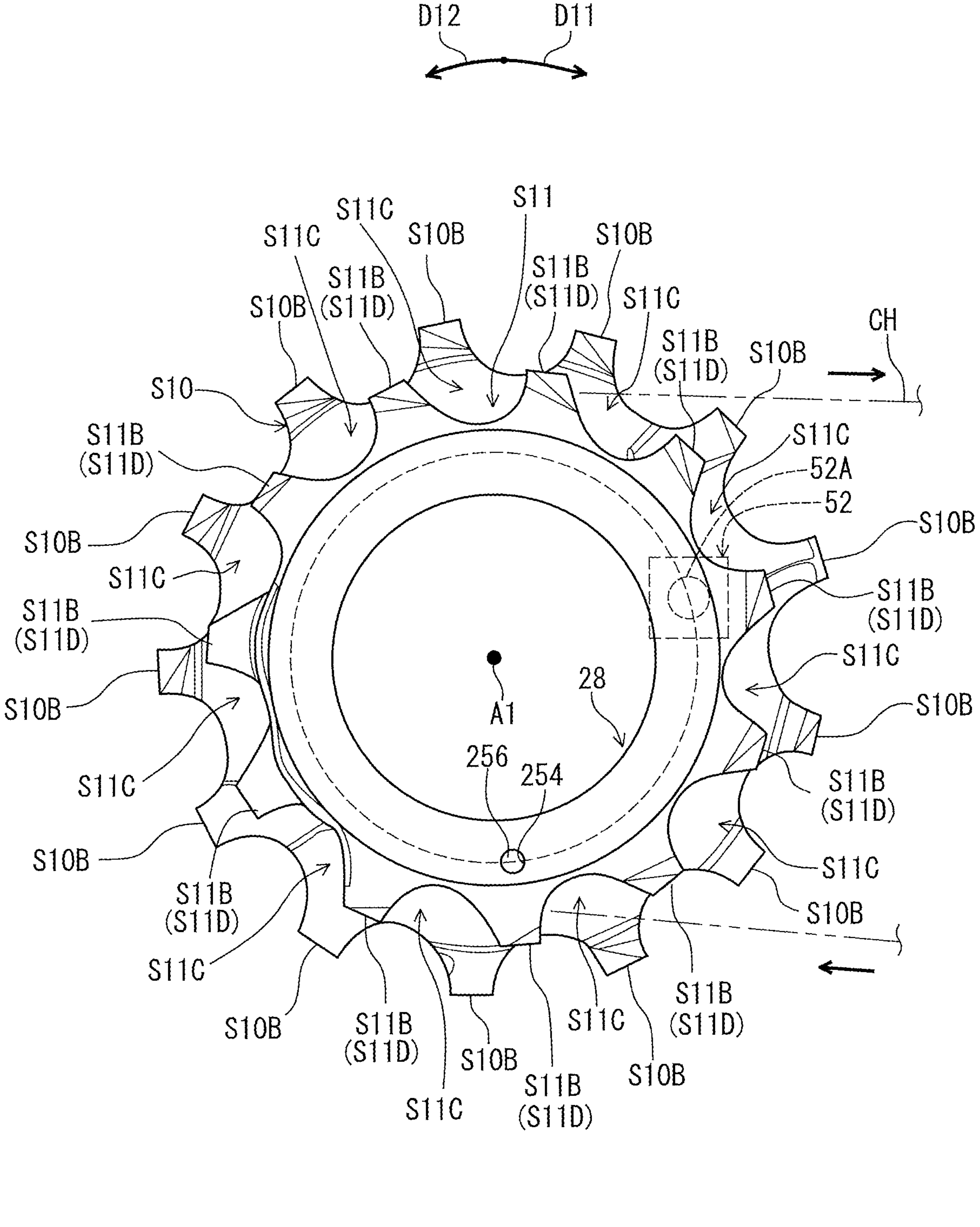
FIG. 56 is a side elevational view of sprockets and a lock member of a sprocket assembly in accordance with a twelfth modification.
Figure 57:
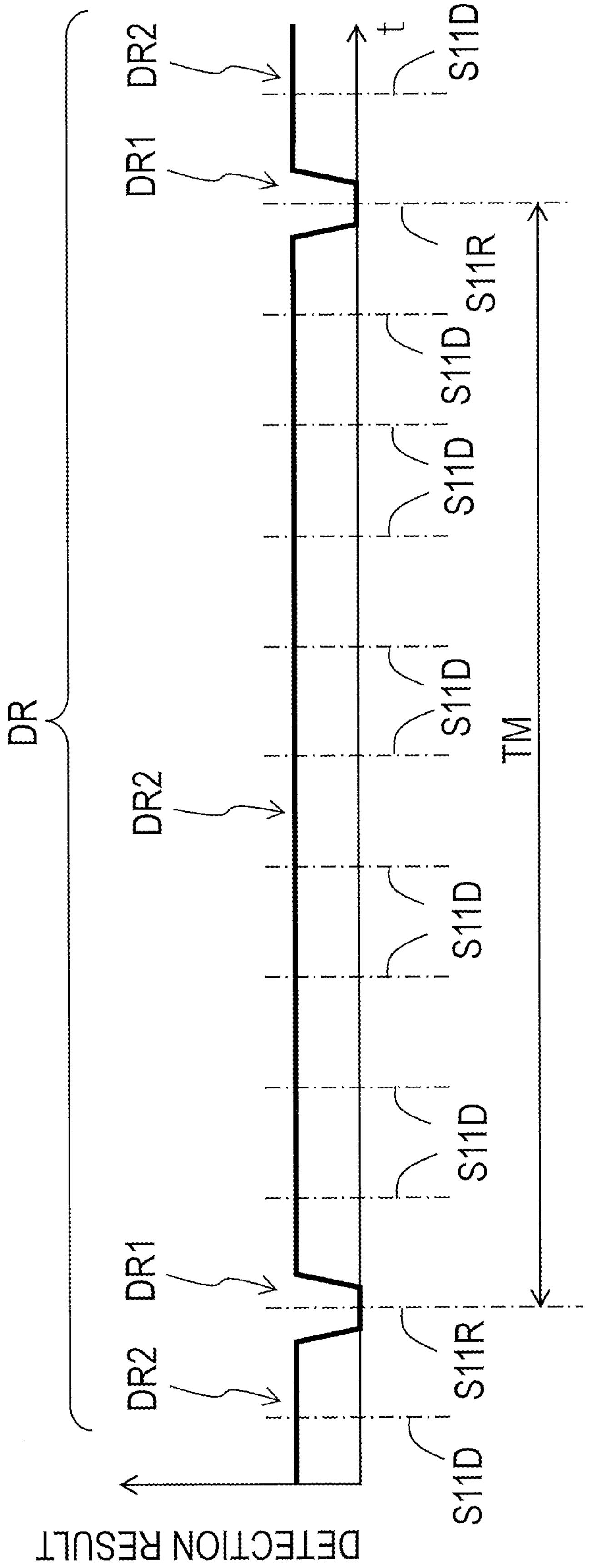
FIG. 57 shows a detection result of the rotational-position sensor unit of the human-powered vehicle system in a case where the lock member has the structure depicted in FIG. 56.

As seen in FIG. 56, the sensor circuitry 52 is configured to detect another part other than the plurality of sprocket teeth S11B. The sensor circuitry 52 is configured to detect a reference shape of a reference portion of at least one of the sprocket S11 and the lock member 28. The reference shape of the reference portion is different from a shape of another portion of the at least one of the sprocket S11 and the lock member 28. In the modification depicted in FIG. 56, the sensor circuitry 52 is configured to detect the reference shape of the reference portion of the lock member 28. The reference shape of the reference portion is different from a shape of another portion of the lock member 28. The lock member 28 includes an opening 254 and a first member 256 provided in the opening 254. The opening 254 and the first member 256 have the same structure as the structure of the opening 54 and the first member 56 depicted in FIG. 16. As seen in FIG. 57, the first detection result DR1 has the waveform different from the waveform of the second detection result DR2.

Figure 58:
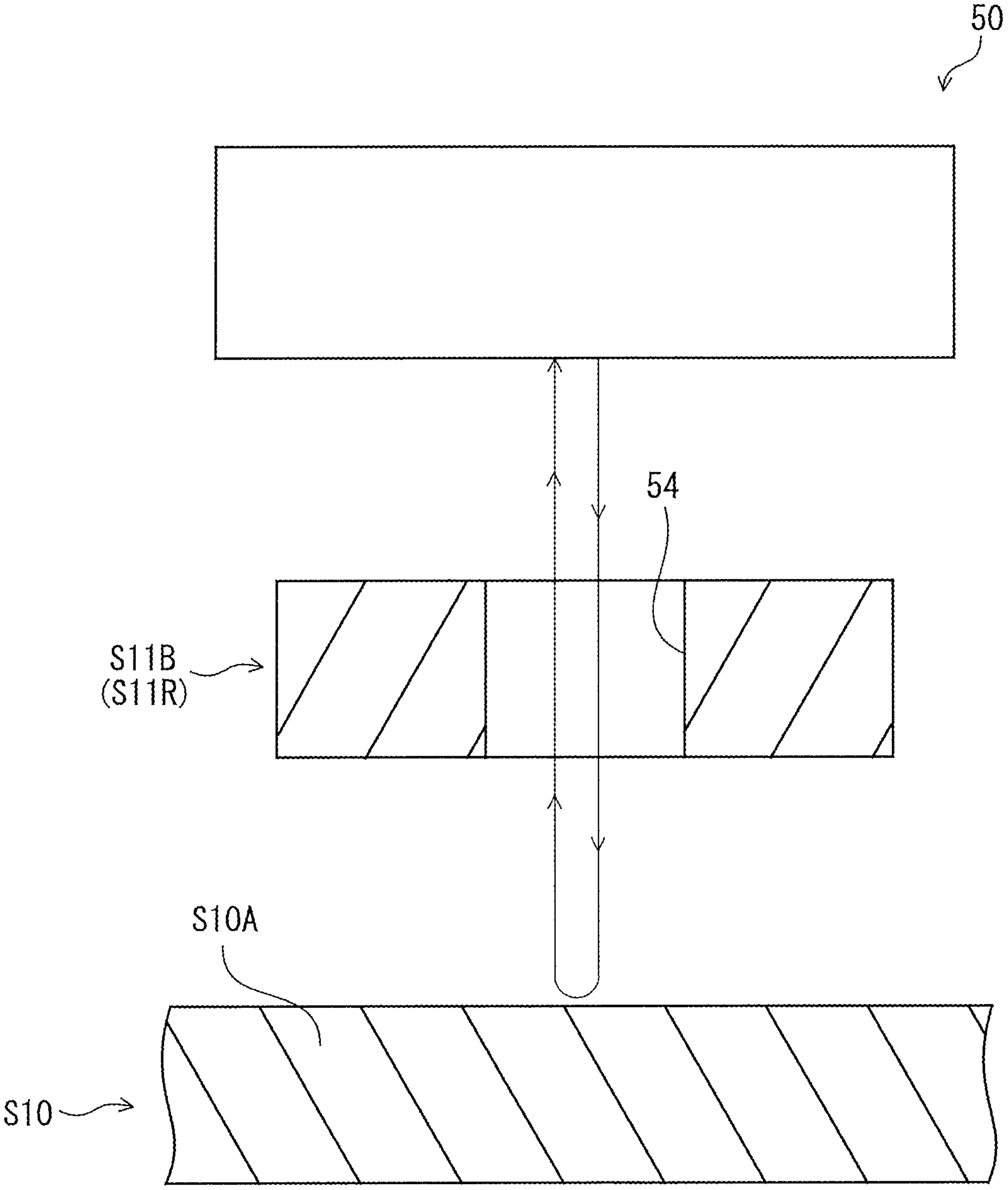
FIG. 58 is a schematic view of the sprockets and the rotational-position sensor unit in accordance with a thirteenth modification.
Figure 59:
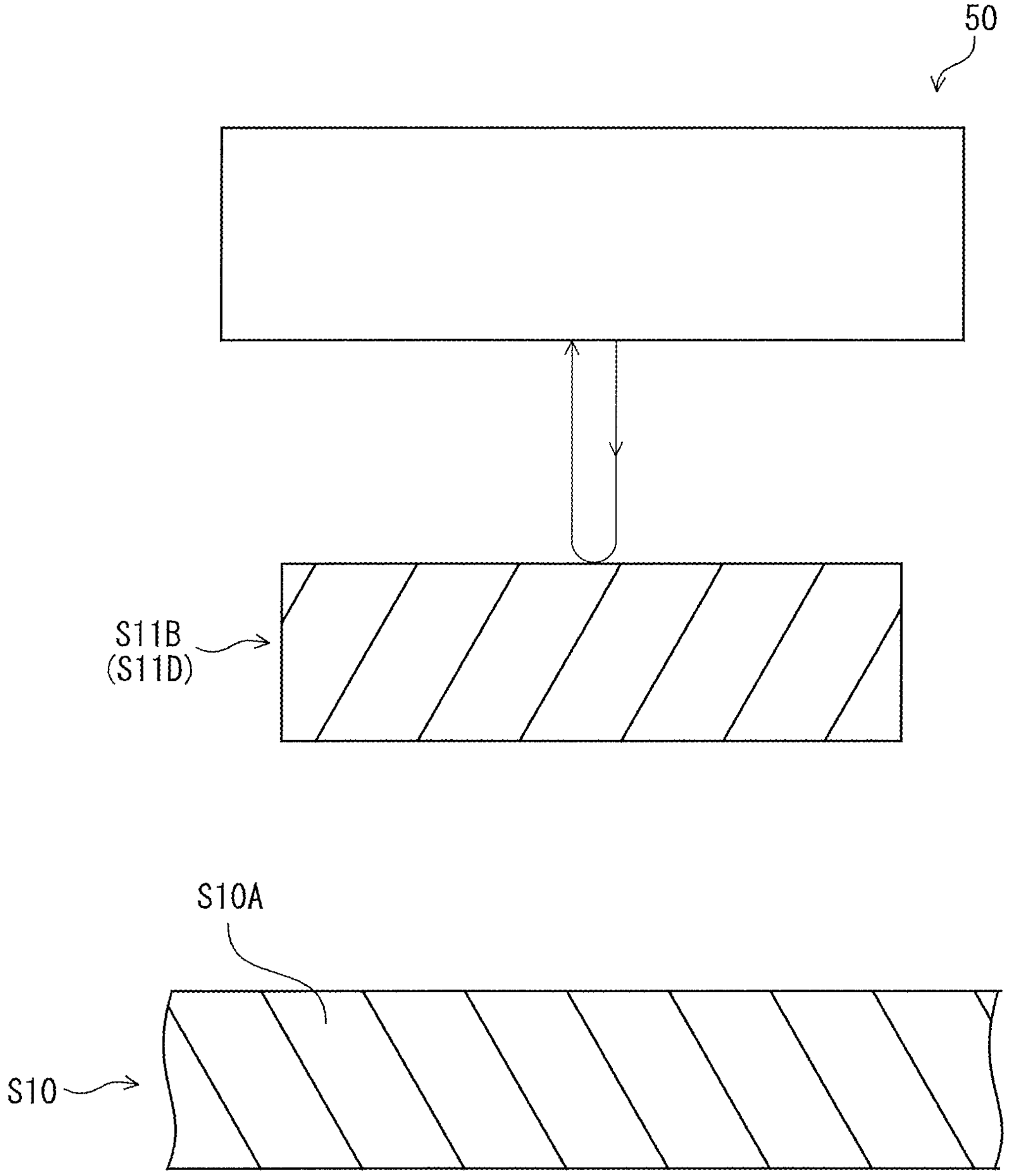
FIG. 59 is another schematic view of the sprockets and the rotational-position sensor unit in accordance with the thirteenth modification.

The rotational-position sensor unit 50 can include another sensor other than the magnetic sensor. As seen in FIGS. 58 and 59, for example, the rotational-position sensor unit 50 can include an optical sensor. In this modification, the reference sprocket tooth S11R includes the opening 54 but does not include the first member 56 provided in the opening 54. The optical sensor is configured to emit light and detect light reflected by the detection object. A first time lag between the emission of light and the receipt of the reflected light in FIG. 58 is different from a second time lag between the emission of light and the receipt of the reflected light in FIG. 59. The first detection result DR1 indicates the first time lag. The second detection result DR2 indicates the second time lag.

Figure 60:
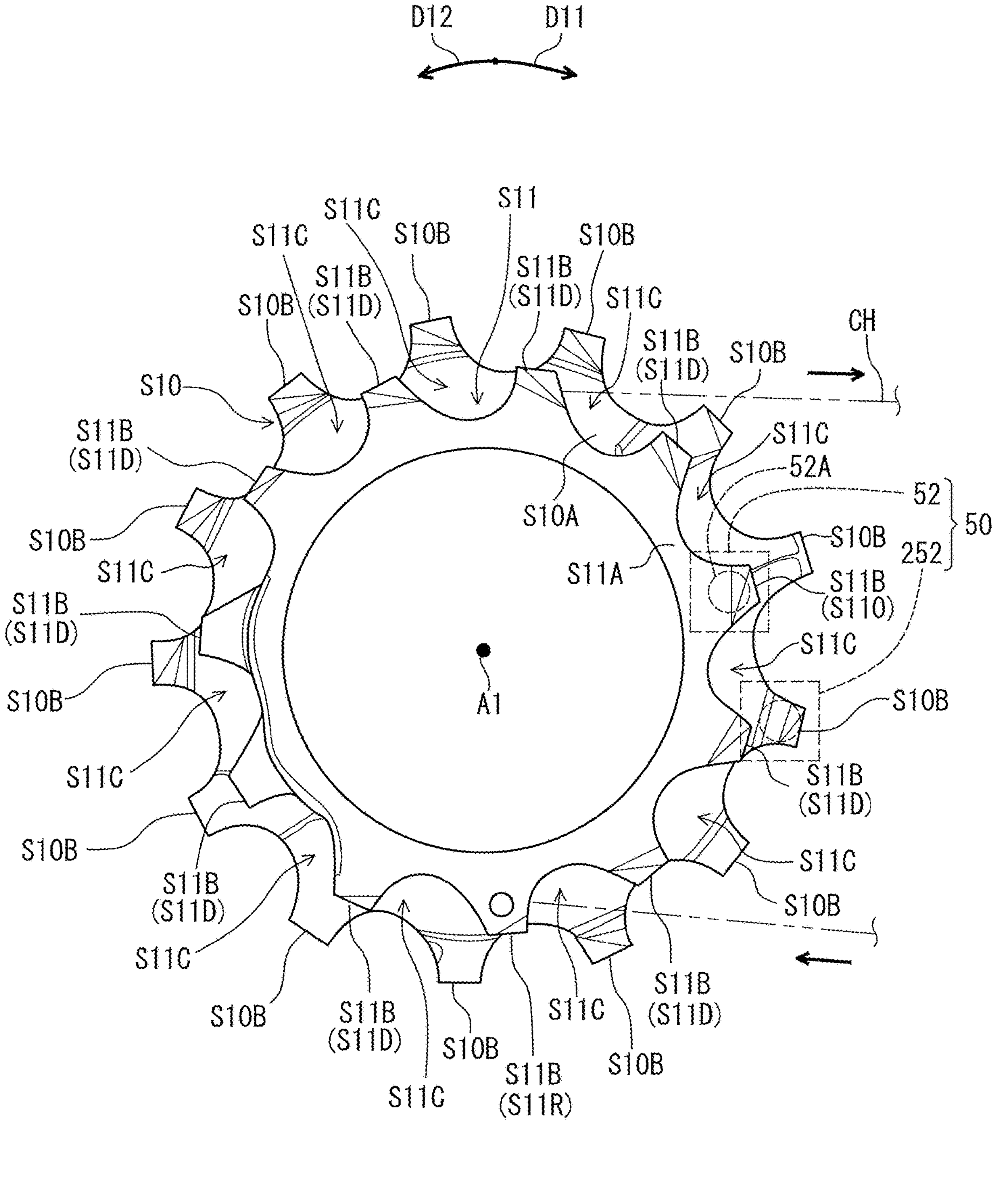
FIG. 60 is a side elevational view of sprockets of a sprocket assembly in accordance with a fourteenth modification.

In the present embodiment and the modifications thereof, the rotational-position sensor unit 50 includes the sensor circuitry 52 including the magnetic sensor. As seen in FIG. 60, the rotational-position sensor unit 50 can include additional sensor circuitry 252 in addition to the sensor circuitry 52. The additional sensor circuitry 252 is configured to detect at least one of: at least one sprocket tooth S10B of the sprocket S10 of the human-powered vehicle B; and a space S10C provided between adjacent two teeth including the at least one sprocket tooth S10B. The electronic controller circuitry EC1 is configured to obtain the rotational position of the sprocket S11 based on the detection result DR of the sensor circuitry 52 and an additional detection result DR3 of the additional sensor circuitry 252. The detection result DR has the waveform depicted in FIG. 21. The additional detection result DR3 has a waveform different from the waveform indicated with the detection result DR. The electronic controller circuitry EC1 is configured to obtain the rotational position of the sprocket S11 based on the difference between the detection result DR and the additional detection result DR3. In this modification, the reference part such as the opening 54 and the first member 56 can be omitted from the sprocket S11.

In the present embodiment and the modifications thereof, the electronic controller circuitry EC1 is configured to control the gear changer 12 in response to the operation signal SG31 or SG32 based on the detection result DR of the sensor circuitry 52 of the rotational-position sensor unit 50. Alternatively, the electronic controller circuitry EC1 can be configured to control the gear changer 12 in response to an automatic control command without the operation signal SG31 or SG32 based on the detection result DR of the sensor circuitry 52 of the rotational-position sensor unit 50. Furthermore, the electronic controller circuitry EC1 can be configured to control a human-powered vehicle component other than the gear changer 12 based on the detection result DR of the sensor circuitry 52. The electronic controller circuitry EC1 can be configured to control the assist drive unit 22 based on the detection result DR of the sensor circuitry 52. For example, the electronic controller circuitry EC1 can be configured to control the assist drive unit 22 to change an assist torque, to change an assist ratio, or to rotate the sprocket assembly RS during coasting based on the detection result DR of the sensor circuitry 52. Furthermore, the detection result DR can be used to determine whether the sprocket assembly RS is worn.

The electronic controller circuitry EC1 can be configured to estimate the positional relationship between the chain guide 12D (e.g., a guide pulley of the chain guide 12D) and a tooth of the sprocket of the sprocket assembly RS based on at least one or two of: the absolute rotational angle or rotational speed of the sprocket assembly RS; the absolute rotational angle or rotational speed of the wheel RW; a distance between the chain guide 12D (e.g., the guide pulley of the chain guide 12D); the current gear position. This can reduce the shock of gear changing, can improve the vibration resistance, can improve the durability of the sprocket assembly RS, and/or can improve the design flexibility of the sprocket assembly RS. The improvement of the design flexibility can the improvement of the response of gear changing because of the increase in the total number of the shift assist structures and/or the reduction of weight of the sprocket assembly RS.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of." For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A rotational-position sensor unit comprising:

sensor circuitry configured to detect at least one of at least one reference sprocket tooth of a sprocket of a human-powered vehicle, and a space provided between adjacent two teeth including the at least one reference sprocket tooth, wherein the sensor circuitry is configured to detect a rotational position of a sprocket assembly including a plurality of sprockets, and the reference tooth is provided on the sprocket having the smallest diameter among the plurality of sprockets.

2. The rotational-position sensor unit according to claim 1, wherein the at least one reference sprocket tooth includes at least two reference sprocket teeth of the sprocket, and the sensor circuitry is configured to detect the at least two reference sprocket teeth.

3. The rotational-position sensor unit according to claim 1, wherein the sensor circuitry has a detection area, and the sensor circuitry is configured to detect whether at least one of the at least one reference sprocket tooth is in the detection area.

4. The rotational-position sensor unit according to claim 3, wherein the sensor circuitry is configured to output a detection result indicating that the at least one reference sprocket tooth is in the detection area.

5. The rotational-position sensor unit according to claim 3, wherein the sensor circuitry is configured to output a detection result indicating that none of the at least one reference sprocket tooth is in the detection area.

6. The rotational-position sensor unit according to claim 3, wherein the sensor circuitry is configured to be disposed in a position in which the at least one reference sprocket tooth passes through the detection area.

7. The rotational-position sensor unit according to claim 1, wherein the sensor circuitry includes a magnetic sensor configured to detect a change in a magnetic field caused by motion of the at least one reference sprocket tooth.

8. The rotational-position sensor unit according to claim 1, wherein the sprocket includes a plurality of sprocket teeth including the at least one reference sprocket tooth and at least one sprocket tooth, the at least one reference sprocket tooth has a first character causing the sensor circuitry to output a first detection result, and at least one of the at least one sprocket tooth has a second character which is different from the first character and which causes the sensor circuitry to output a second detection result different from the first detection result.

9. A rotational-position sensor unit comprising:

sensor circuitry configured to detect at least one of at least one reference sprocket tooth of a sprocket of a human-powered vehicle, and a space provided between adjacent two teeth including the at least one reference sprocket tooth, wherein the sprocket includes a plurality of sprocket teeth including the at least one reference sprocket tooth and at least one sprocket tooth, the at least one reference sprocket tooth has a first character causing the sensor circuitry to output a first detection result, at least one of the at least one sprocket tooth has a second character which is different from the first character and which causes the sensor circuitry to output a second detection result different from the first detection result, and the first character includes one of an opening so that the first character is different from the second character of the at least one sprocket tooth, and an opening and a first member provided in the opening so that the first character is different from the second character of the at least one sprocket tooth.

10. The rotational-position sensor unit according to claim 9, wherein the first member is made of a non-metallic material.

11. The rotational-position sensor unit according to claim 1, further comprising amplifier circuitry configured to amplify an output of the sensor circuitry.

12. The rotational-position sensor unit according to claim 1, wherein the sensor circuitry is configured to be mounted to a vehicle body of the human-powered vehicle.

13. A human-powered vehicle controller comprising:

electronic controller circuitry configured to control a human-powered vehicle based on a detection result of sensor circuitry of a rotational-position sensor unit configured to detect at least one of:

at least one reference sprocket tooth of a sprocket of the human-powered vehicle; and a space provided between adjacent two teeth including the at least one reference sprocket tooth, wherein the electronic controller circuitry is configured to calculate a rotational position of the sprocket based on the detection result of the sensor circuitry.

14. The human-powered vehicle controller according to claim 13, wherein the electronic controller circuitry is configured to control a gear changer of the human-powered vehicle based on the detection result of the sensor circuitry.

15. The human-powered vehicle controller according to claim 14, wherein the electronic controller circuitry is configured to store an operating time for which the gear changer shifts a chain between a sprocket and a neighboring sprocket, the sprocket being adjacent to the neighboring sprocket without another sprocket between the sprocket and the neighboring sprocket, and the electronic controller circuitry is configured to calculate a shift timing at which the gear changer starts to shift the chain based on the operating time stored in the electronic controller circuitry, and the detection result obtained from the sensor circuitry when an operation signal is inputted to actuate the gear changer from an operating device to the electronic controller circuitry.

16. The human-powered vehicle controller according to claim 15, wherein the electronic controller circuitry is configured to control the gear changer to start to shift the chain at the shift timing.

17. A human-powered vehicle system comprising:

a rotational-position sensor unit comprising sensor circuitry configured to detect at least one reference sprocket tooth of a sprocket of a human-powered vehicle; and the human-powered vehicle controller according to claim 13.

18. A human-powered vehicle system comprising:

the rotational-position sensor unit according to claim 1; and electronic controller circuitry configured to control the human-powered vehicle based on a detection result of the rotational-position sensor unit.

19. A rotational-position sensor unit comprising:

sensor circuitry configured to detect a reference shape of a reference portion of at least one of a sprocket and a lock member, the reference shape of the reference portion being different from a shape of another portion of the at least one of the sprocket and the lock member, wherein the reference shape includes an opening provided to the at least one of the sprocket and the lock member, the opening being provided along an axial direction of the sprocket.

20. The rotational-position sensor unit according to claim 1, wherein the sensor circuitry is configured to detect the at least one of the at least one reference sprocket and the space from axially outside of the sprocket.

21. A human-powered vehicle controller comprising:

electronic controller circuitry configured to control a human-powered vehicle based on a detection result of sensor circuitry of a rotational-position sensor unit configured to detect at least one of:

at least one reference sprocket tooth of a sprocket of the human-powered vehicle; and a space provided between adjacent two teeth including the at least one reference sprocket tooth, wherein the electronic controller circuitry is configured to control a gear changer of the human-powered vehicle based on the detection result of the sensor circuitry.

* * * * *